United States Patent
Atarashi et al.

(10) Patent No.: US 12,492,409 B2
(45) Date of Patent: Dec. 9, 2025

(54) **SOLANACEOUS PLANT RESISTANT TO VIRUS OF GENUS *BEGOMOVIRUS* CAUSING TOMATO YELLOW LEAF CURL SYMPTOMS, SOLANACEOUS PLANT CELL, AND METHOD FOR PRODUCING SOLANACEOUS PLANT**

(71) Applicants: KIKKOMAN CORPORATION, Noda (JP); NATIONAL UNIVERSITY CORPORATION HOKKAIDO UNIVERSITY, Sapporo (JP)

(72) Inventors: Hiroki Atarashi, Chiba (JP); Kenji Nakahara, Hokkaido (JP)

(73) Assignees: KIKKOMAN CORPORATION, Noda (JP); NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 673 days.

(21) Appl. No.: 17/297,887

(22) PCT Filed: Nov. 27, 2019

(86) PCT No.: PCT/JP2019/046438
§ 371 (c)(1),
(2) Date: May 27, 2021

(87) PCT Pub. No.: WO2020/111149
PCT Pub. Date: Jun. 4, 2020

(65) Prior Publication Data
US 2022/0033840 A1    Feb. 3, 2022

(30) Foreign Application Priority Data

Nov. 28, 2018 (JP) .............. JP2018-222289
May 21, 2019 (JP) .............. JP2019-095150

(51) Int. Cl.
C12N 15/82    (2006.01)
A01H 1/00     (2006.01)

(52) U.S. Cl.
CPC ......... *C12N 15/8283* (2013.01); *A01H 1/126* (2021.01)

(58) Field of Classification Search
None
See application file for complete search history.

(56) References Cited

U.S. PATENT DOCUMENTS 9,968,044 B2 *   5/2018   Jiang ................ A01H 5/08
2006/0294618 A1  12/2006  Jahn et al.
2014/0298537 A1  10/2014  Mitchum et al.

FOREIGN PATENT DOCUMENTS

WO   2013010064 A1   1/2013
WO   2019151417 A1   8/2019

OTHER PUBLICATIONS

Shah et al. Research Journal of Pharmacy and Technology. 6(2):143-151. (Year: 2013).*
Joshi, et al. BMC Evolutionary Biology. 5(48):1-20. (Year: 2005).*
NCBI Reference Sequence: NM_001247530.2 (Year: 2017).*
Kadirvel et al. Euphytica. 190:297-308. (Year: 2013).*
NCBI Reference Sequence: NM_001287784.1 (Year: 2016).*
Czosnek et al. Viruses. 5(3): 988-1022. (Year: 2013).*
DeYoung. Plant Journal. 45(1). (Year: 2006).*
Piron, et al. "An induced mutation in Tomato eIF4E leads to immunity to two pot viruses". PLoS ONE. 5(6):1-10. (Year: 2010).*
Brown et al. Arch Virol. 160:1593-1619. (Year: 2015).*
Mahatma et al. Epidemiology of Begomoviruses: A Global Perspective. Plant Viruses: Evolution and Management. (Year: 2016).*
Aoki Koh et al: "Large-scale analysis of full-length cDNAs from the tomatocultivar Micro-Tom, a reference system for theSolanaceae genomics",BMC Genomics, Biomed Central Ltd, vol. 11, No. 210, Mar. 30, 2010, pp. 1-16.
C. Qin et al: "Whole-genome sequencing of cultivated and wild peppers provides insights into Capsicum domestication and specialization", Proceedings of the National Academy of Sciences, vol. 111, No. 14, Mar. 3, 2014, pp. 5135-5140.
Carvalho Miguel F. et al : "The Geminivirus Nuclear Shuttle Protein NSP Inhibits the Activity of At NSI, a Vascular-Expressed *Arabidopsis* Acetyltransferase Regulated with the Sink-to-Source Transition", Plant Physiology, vol. 140, No. 4, Apr. 1, 2006, pp. 1317-1330.

(Continued)

*Primary Examiner* — Mykola V. Kovalenko
*Assistant Examiner* — David R Byrnes
(74) *Attorney, Agent, or Firm* — CANTOR COLBURN LLP

(57) ABSTRACT

Present invention relates to a virus resistant solanaceous plant, a solanaceous plant cell, and a method for producing the solanaceous plant, and the solanaceous plant has inhibitory properties against: infection by a virus of genus *Begomovirus* causing tomato yellow leaf curl symptoms, proliferation of the infected virus, and/or expression of infection symptoms. The present invention provides a solanaceous plant having a mutation in at least one gene selected from a group consisting of translation initiation factor eIF4E gene, receptor-like kinase RLK gene, coatomer complex delta-COP gene, nuclear shuttle protein interactor NSI gene, and genes homologous thereto. The mutation in such a solanaceous plant either inhibits the expression of the mutated gene or makes a protein encoded by the mutated gene to be non-functional for the virus, and the solanaceous plant has virus resistance against the above-mentioned virus.

4 Claims, 11 Drawing Sheets
Specification includes a Sequence Listing.

(56) References Cited

OTHER PUBLICATIONS

Database EMBL [Online] Mar. 19, 2009, "Solanum lycopersicum cDNA, clone: LEFL 1008AC04, HTC in leaf." retrieved from EBI accession No. EM_HTC:AK320334 Database accession No. AK320334.
EPO Extended European Search Report for corresponding EP Application No. 19890178.7; Issued on Jan. 11, 2023.
Henryk Czosnek et al., "Discovering Host Genes Involved in the Infection by the Tomato Yellow Leaf Curl Virus Complex and in the Establishment of Resistance to the Virus Using Tobacco Rattle Virus-based Post Transcriptional Gene Silencing", Viruses, vol. 5, No. 3, Mar. 22, 2013, pp. 998-1022.
Lozano-Duran Rosa et al : "Identification of Host Genes Involved in Geminivirus Infection Using a Reverse Genetics Approach", PLOS ONE, vol. 6, No. 7, Jul. 1, 2011, p. e22383.
Nicolas Sierro et al: "The tobacco genome sequence and its comparison with those of tomato and potato", Nature Communications, vol. 5, May 8, 2014, 2 pages.
Rosas-Diaz Tabata et al., "A virus-targeted plant receptor-like kinase promotes cell-to-cell spread of RNAi", Proceedings of the National Academy of Sciences, vol. 115, No. 6, Feb. 6, 2018, pp. 1388-1393.
Tetsu Sakamoto et al., "The tomato RLK superfamily: phylogeny and functional predictions about the role of the LRRII-RLK subfamily in antiviral defense", BMC Plant Biology, Biomed Central, vol. 12, No. 1, Dec. 2, 2012, p. 229.
Xun Xu et al: "Genome sequence and analysis of the tuber crop potato", Nature, vol. 475, No. 7355, Jul. 10, 2011, pp. 189-195.
Zhao Tongmin et al: "Genome-Wide Analysis of Lectin Receptor-Like Kinases in Tomato (*Solanum lycopersicum*) and Its Association with the Infection of Tomato Yellow Leaf Curl Virus", Plant Molecular Biology Reporter, Springer Science+Business Media B.V, NL, vol. 36, No. 3, Jun. 13, 2018, pp. 429-438.
Solanum lycopersicum coatomer subunit delta (LOC101266270), transcript variant X1, mRNA, NCBI Reference Sequence: XM_004230399.4, Aug. 8, 2018, 2 pages.
Bastet et al., "eIF4E Resistance Natural Variation Should Guide Gene Editing", Trends in Plant Science, vol. 22, No. 5, May 31, 2017; pp. 411-419.

EPO Partial Supplemental European Search Report for corresponding EP Application No. 19890178.7; Issued on Jul. 22, 2022.
Hwang et al., "Double Mutations in eIF4E and eIFiso4E Confer Recessive Resistance to Chilli Veinai Mottle Virus in Pepper", Molecules and Cells, vol. 27, No. 3, Mar. 31, 2009; pp. 329-336.
Lapidot et al., "A Novel Route Controlling Begomovirus Resistance by the Messenger RNA Surveillance Factor Pelota", PLOS Genetics, vol. 11, No. 10, Oct. 8, 2015; p. 1-19.
Verlaan et al., "The Tomato Yellow Leaf Curl Virus Resistance Genes Ty-1 and Ty-3 Are Allelic and Code for DFDGD-Class RNA-Dependent RNA Polymerases", PLOS Genetics, vol. 9, Issue 3, Mar. 28, 2013, 11 pages.
EFSA Panel on Plant Health (PLH), "Scientific Opinion on the risks to plant health posed by *Bemisia tabaci* species complex and viruses it transmits for the EU territory", EFSA Journal, Dated Apr. 15, 2013; vol. 11, No. 4; 302 pages.
B. Mabvakure et al., "Ongoing geographical spread of Tomato yellow leaf curl virus", Virology, Dated Nov. 1, 2016; vol. 498; 8 pages.
Jolly Basak, "Tomato Yellow Leaf Curl Virus: A Serious Threat to Tomato Plants World Wide", Journal of Plant Pathology & Microbiology, Dated: Jan. 2016; vol. 7, No. 4; 5 pages.
H. Czosnek et al., "Discovering Host Genes Involved in the Infection by the Tomato Yellow Leaf Curl Virus Complex and in the Establishment of Resistance to the Virus Using Tobacco Rattle Virus-based Post Transcriptional Gene Silencing", Viruses, Dated: Mar. 22, 2013; vol. 5; 25 pages.
F. Piron et al., "An Induced Mutation in Tomato eIF4E leads to Immunity to Two Potyviruses", PLoS ONE, Dated Jun. 25, 2010; vol. 5, No. 6; 10 pages.
P. Kadirvel et al., "Mapping of QTLs in tomato line FLA456 associated with resistance to a virus causing tomato yellow leaf curl disease", Euphytica, Dated: Dec. 5, 2012; vol. 190; 12 pages.
M. Abhary et al., "Molecular Biodiversity, Taxonomy, and Nomenclature of Tomato Yellow Leaf Curl-like Viruses", Springer, Dated: 2007; 34 pages.
International Search Report for corresponding International Application No. PCT/JP2019/046438; Dated Mar. 3, 2020.

* cited by examiner

AGTGCTCCACAGTCGACAGAGCAGCAAAAATGGCAGCAGCTGAAATGGAGAGAACGATGTCGTTTGATGCAGCTGAGAAGT
TGAAGGCCGCCGATGGAGGAGGAGGAGAGGTAGACGATGAACTTGAAGAAGGTGAAATTGTTGAAGAATCAAATGATACGG
CATCGTATTTAGGGAAAGAAATCACAGTGAAGCATCCATTGGAGCATTCATGGACTTTTTGGTTTGATAACCCTACCACTA
AATCTCGACAAACTGCTTGGGGAAGCTCACTTCGAAATGTCTACACTTTCTGCACTGTTGAAGATTTTTGGGGTGGTTACA
ATAATATCCATCACCCAAGCAAGTTAATTATGGGAGCAGACTTTCATTGTTTTAAGCACAAAATTGAGCCAAAGTGGGAAG
ATCCTGTATGTGCCAATGGAGGGACGTGGAAAATGAGTTTTTCGAAGGGTAAATCTGATACCAGCTGGCTGTATACGCTGC
TGGCAATGATTGGACATCAATTCGATCATGGAGATGAAATTTGTGGAGCAGTTGTTAGTGTCCGGGCTAAGGGAGAAAAAA
TAGCTTTGTGGACCAAGAATGCTGCAAATGAAACAGCTCAGGTTAGCATTGGTAAGCAATGGAAGCAGTTTCTAGATTACA
GTGATTCGGTTGGCTTCATATTTCACGACGATGCAAAGAGGCTCGACAGAAATGCCAAGAATCGTTACACCGTATAGTTCT
TGATGCAGTGTGGGATTGCAAGAAACACAATTCGTACTGGAAAGGTTGGTAGGTACTAGTTTAGTTTCTCATTTGATAAGC
TTCTGGTTTGAGTAACTCGTGTGTTGGTGTTTACACTTTCTAATCGTGGAAAATTGTTTGATTTGAATCCATGCCTCTATG
TTTCGTCACATAACAAAACACAAAT

FIG. 1

```
GTTACAAAAAAGAGTTGGGGCCTCCTCTACTTGTACAATCTCACAATTCAAATTTTATTTCTTTATAATAATCAATCCCTTC
GTATTATATTTATTTACTGAAAAGAAAAGAATATAGACACCAAACGGATTAGCCAGCCTCAAACGAAATCCTCATTTTTGCC
TTTGTCACTCTAACTGAGTGAAACTGCAAAGCAAACAGTAGGTGGGCGTTAGATTAACGAAGCAAAAATGCGTCTTCTTTTT
TTTCTTCTTCTTCTTATGCATTTTACTGACTTTTCTGCCGGTAAACAACCAGGCTTACCGGAATACCAGGCTTTGCTTGCCC
TGAAAACTGCCATTACCGATGACCCGCAGTTAACTCTTGCCTCATGGAACATCTCCACCAGTCACTGTACGTGGAATGGTGT
CACGTGCGACACGCATCGTCACGTGACCTCTCTTGATATTTGTGGGTTTAATCTTACCGGTACTCTTCCGCCGGAAGTTGGA
AATCTTCGTTTGTTACAAAATTTGTCTGTTGCTGTTAACCAGTTTACTGGACCTGTACCTGTTGAAATCTCCTTTATTCCAA
ATCTGAGTTACCTTAATCTTTCTAATAACATATTCGGGATGGAATTCCCTTCGCAGTTAACACGTCTGCGTAACCTCCAAGT
CCTTGACCTTTACAACAACAATATGACCGGTGAACTTCCCGTTGAGGTGTATCAGATGACTAAACTTCGACATCTACACCTA
GGCGGGAACTTTTTCAGTGGCCGCATTCCTCGGGAGTATGGAAGATTCCCGTCTCTAGAGTACCTTGCAGTTTCAGGCAATG
CATTGGTAGGAGAGATACCACCGGAGATTGGAAACATCGCTACACTTCAGCAGTTGTATGTAGGATACTACAATACCTTCAC
CGGTGGGATTCCACCGGCAATAGGGAACTTATCGCAGCTCCTTCGGTTTGATGCTGCTAACTGTGGACTTTCGGGGAAGATT
CCACCGGAGATTGGGAAGCTTCAGAACCTTGATACCCTCTTCCTGCAAGTGAATTCTCTATCTGGATCTTTAACTCCGGAGA
TAGGTTATCTGAAGAGCTTGAAATCTTTGGATCTGTCGAATAACATGTTCTCTGGCGAGATACCGCCGACATTTGCGGAGCT
TAAGAATATCACTCTTGTTAATCTTTTCCGGAATAAGCTTTATGGGTCAATACCAGAGTTCATAGAGGACTTGCCGGAACTA
GAGGTGTTGCAACTTTGGGAAAATAACTTTACTGGAAGCATTCCTCAGGGGTTAGGCACAAAGAGCAAGCTCAAAACTCTTG
ATCTCAGTTCGAATAAATTAACGGGAAATTTAGCCCCAAACATGTGCTCGGTAACAATCTGCAGACAATTATGACTCTAGG
GAACTTCTTGTTTGGCCCAATTCCTGAATCTTTGGGTAGGTGTGAATCACTTAATCGTATTAGAATGGGAGAAAATTATCTG
AATGGGTCTATTCCAAAAGGGCTCTTAAGCTTGCCACATCTGTCACAAGTTGAACTTCAGAATAATATTCTCACTGGTACAT
TTCCTGATATTTCTTCCAAATGTAACAGTCTTGGCCAGATTATCGTTTCAAATAATCGCTTAACTGGACCTTTGCCACCAAG
CATTGGAAACTTTGCTGTAGCCCAAAAATTGCTTCTTGATGGGAACAAATTTCGGGACGAATTCCAGCTGAAATAGGAAAG
CTTCAACAGCTATCCAAAATTGATTTCAGTCATAACAACTTGTCTGGACCCATTGCTGCGGAGATTAGCCAGTGCAAGTTGC
TGACTTATGTTGATCTCAGCAGGAACCAACTTTCGGGTGAGATTCCTACTGAGATCACAGGTATGAGAATACTCAACTACTT
GAATTTATCGCGAAACCACTTAGTTGGGAGTATTGCTGCCCCTATTTCTAGTATGCAGAGTTTAAGTTCTGTTGATTTCTGG
TATAACAACTTTCTGGTTTAGTTCCTGGAACGGGCAATTTAGTTATTTCAATTACACCTCATTTCTAGGCAATCCAGATC
TTTGCGGACCCTATTTGGGCCCTTGCAAAGAGGGCGTTGTTGATGGGGTTAGTCAACCTCACCAACGAGGAGCCTTAACGCC
TTCGATGAAGCTTTTACTTGTTATAGGTTTGCTTGTCTGTTCTATTGTGTTTGCTGTTGCTGCAATTATAAAGGCCCGATCT
TTAAAGAAGGCAAGTGAAGCTCGTGCCTGGAAGCTAACTGCTTTTCAGCGCCTGGATTTTACTTGTGATGATATTTTGGATA
GCTTGAAGGAGGATAACGTTATTGGAAAAGGAGGTGCTGGTATTGTGTACAAGGGGTAATGCCTAGCGGGGAACATGTAGC
GGTTAAGAGGTTGCCAGCTATGAGCAGGGGTTCCTCTCATGATCATGGGTTCAATGCAGAGATACAGACTCTTGGGAGGATC
CGACACAGGGCACATTGTTAGATTATTAGGGTTTTGCTCGAATCATGAGACAAATCTTTTGGTTTACGAGTACATGCCTAATG
GAAGTCTTGGGGAAATGCTTCATGGCAAGAAAGGCGGTCATTTACATTGGGATACCAGGTATAAGATTGCCTTGGAGTCTGC
TAAGGGTCTTTGCTATCTCCATCACGATTGCTCTCGTTTGATCCTCCATCGTGATGTGAAATCAAACAACATTCTGCTGGAC
TCCAGCTTTGAAGCTCATGTTGCTGATTTTGGACTTGCTAAGTTCTTGCAAGATTCAGGGACATGAGAATGCATGTCTGCTA
TTGCTGGTTCTTATGGGTACATTGCTCCAGAATATGCTTACACACTTAAGGTTGATGAGAAGAGTGATGTATATAGCTTCGG
TGTGGTGCTACTAGAACTGGTAAGTGGCAAAAAACCAGTTGGAGAATTTGGTGATGGTGTTGACATAGTCCAATGGGTTAGG
AAAATGACTGATGGGAAAAAGGATGGAGTTCTCAAGATCCTTGACCCAAGACTCTCAACGGTTCCCCTTAATGAGGTGATGC
ATGTCTTCTATGTCGCATTGTTGTGTGTCGAAGAGCAGGCTGTGGAACGTCCCACCATGCGAGAGGTAGTGCAAATACTAAC
GGAACTTCCCAAGCCACCAGGTGCAAAATCAGATGACTCAACCGTCACTGATCAGTCGCCCCATCAGCCTCTGCATTAGAG
TCCCCAACCTCAATTCCCGGGGACACAAAAGACCATGATCAACCAACACCTCAATCACCTCCACGTGACCTACTCAGTATCT
AATTTGCAATGTTCTTGAAGTAGGAGTGTTTTATTTAGTTTGATTCTCTAGTTCTATTATGATCAATTGTGCTAAGCTTTAT
TCCTTTGTTTTAAAAAAATTGGGTCTTTCTAGGCTGGGGGTTTATTCTAACTCTAAGATGGGTTTAATGCTCAGAAGTTTT
CCTCTTGTACAGTAAGATTGGTAGGGTTTTCAAGTGTATTATTAAATGGAAAAAAATTGCCCTTCATTTGCT
```

FIG. 2

| | | | |
|---|---|---|---|
| Wild Type: | AGGGTAAATCTGATA·CCAGC | | (SEQ ID NO:3) |
| Mutation I1: | AGGGTAAATCTGATACCCAGC | (1 nt insertion) | (SEQ ID NO:13) |
| Mutation I2: | AGGGTAAATCTGATA····GC | (3 nt deletion) | (SEQ ID NO:14) |
| Mutation I3: | AGGGTAA··C··A······GC | (9 nt deletion) | (SEQ ID NO:15) |
| Mutation I4: | AGGGTAAATGTATA····GC | (3 nt deletion, replacement) | (SEQ ID NO:16) |
| Mutation I5: | AGTGTAA··C··A······GC | (9 nt deletion, replacement) | (SEQ ID NO:17) |
| Mutation I6: | AGGGTAAATGTAACA····GC | (3 nt deletion, replacement) | (SEQ ID NO:18) |

FIG. 11

| | | | |
|---|---|---|---|
| Wild Type: | TCTCTAGAGTACCTTGCAGT | | (SEQ ID NO:6) |
| Mutation R1: | TCT·····GTACCTTGCAGT | (5 nt deletion) | (SEQ ID NO:19) |
| Mutation R2: | TC········TACCTTGCAGT | (7 nt deletion) | (SEQ ID NO:20) |
| Mutation R3: | TCTACTAGAGTACCTTGCAGT | (1 nt insertion) | (SEQ ID NO:21) |
| Mutation R4: | TCT·····GTACCTTGACCT | (5 nt deletion, replacement) | (SEQ ID NO:22) |

FIG. 12

```
GCAAATTGGTTGGTATAGGAAAGCAGCATACATATATTGAGACTGAAAATGTGCGATATGTTTATCAGCCGATAGA
ATCTCTGTACTTGCTCCTTGTGACCAACAAACAGAGCAACATTCTTGAAGATTTGGAGACACTGAGGCTGCTGTCT
AAACTAGTGCCTGAATATTCTTATTCACTAGATGAGGAAGGAATTGGCAGGACGGCTTTTGAGCTTATTTTTGCAT
TTGATGAAGTGATCTCTCTTGGGCACAAGGAAAATGTTACAGTTACACAAGTCAAGCAGTACTGTGAAATGGAGAG
TCACGAGGAGAGATTACACAAGTTAGTCTTACAGAACAAGATAAATGAAACTAAGGATGTCATGAAGCGTAAAGCC
AGTGAAATTGACAAAAGCAAGATTGAGAGGAATAGAGGTGACAAAGGAGGTTTCATGTCACTGCAATCCATGAGTT
CTGGAAGAATTGATACTGGCTTTGGCAGCGACTCAGGCATATCCAACATAGGAGGCAATGGTTCTGGTGGATTTGC
TCTACCCCCTGATGTGGACACATTTTCCACCAAATCCAAGGGTCGTCCAGCTGCATCTGCTACTGCTCCACCGAAA
GGTCTTGGTATGCAACTGGGTAAAACACAGAAGACCAACCAATTTCTGGAATCCCTAAAAGCTGAGGGTGAGGTAA
TTGTCGAGGATGTGAGGCCAAGCGTTGGTCAGGCCAAACCAGCTGCTGCTCCACTAACTGATCCCGTCACGTTGAC
TGTTGAAGAGAAGATAAATGTAACACTAAAGCGTGATGGTGGTCTCAGCAATTTTGTCGTCGAGGGTACTTTGTCT
CTCCAAATTCTGAAGGAAGAAGATGCTTTTATCCAAGTGCAGATTGAAACCAGTGGTAATCCAGCAATCCTCTTCA
AAGCACACGCAAACATGAACAAGGAGTTGTTTGCAAATGAAAATATTCTTGGCCTTAAAGATCCAATAGGTCATT
TCCCACAGGGCAAGGTGGTGATGGTGTTAGTCTTTTGAGGTGGAGAATGCAAAGCACAGATGAGTCAATTTTGCCT
TTGACAATTAACTGCTGGCCTTCAGTTTCTGGAAGTGAAACCTATGTGAATATCGAGTATGAAACCCCGCGCAGA
TTGATTTACAAAATGTTGTAATTTCTGTACCCCTTCCAGCTCTCAGGGAGGCTCCAAATGTACAACAGATTGATGG
AGAGTGGAGGTACGATTCCAGAAATTCTGTTTTGGAGTGGTCTGTTCTTCTCATTGACAATTGGAACGGCAGTGGA
TCACTAGAGTTTGTTGTTGCCAGCTGCTGATCCATGAGCATTCTTTCCAATTTCTGCACAGTTTACTTCTTCGAGAA
CCTTCAGTGATGTGAAGGTTGTCAACGTGCTGCCTCTAAAAGGTGGGGCCACTCCCAAGCATTCTCAAAGAACACT
GCTGGCCACGGAGAGTTACCAGGTTGTGTGACCACAAGGACATTATAAAATTGTGCCGTTAGAGCAAACATTATAG
GGCTTGTTTTATTTCATTTTTGTTCAGACTTTTGTTTGCCCTTTTCCTTGTTATCCTTTCCCAAAGTTCTTTCATG
TACGGAGATGGAATAACTTTGTTAGGTTGAACTTAGAAAGTCTTGTGCATTTATAGCGTACGCCGATCAACTTACT
TTTGCGCAATTGAATTGAACCAAAATTTGAAGCTTCACTGTTTTCTTTATTTGTTCTATTATTTC
```

FIG. 13

```
ATGGAGAGGCATGAAGAGAAAGTGCATAAGTTAGTCTTACAAAGCAAGATTAATGAAACTAAGGATGTCATGAAGC
GCAAAGCCAGTGAGATTGATAAAAGCAAGATTGAGAGGAATAGAGGTGAAAAAGGAGGTTTCATGTCTCTGCAATC
CATGGGTTCTGGAAGAATGGATACCGGCTTTGGCAGTGATACAAACTTATCTAGTTTAGGAGGCAGTGGTTCTGGA
TTTGGACCAAGCACTGATGTGGATTCATTTTCCACCAAGTCCAAGGGTCGTCCAGTTGCATCTGCTACAGGCCCCC
CAAAAGGTCTTGGTATGCAGCTAGGTAAAACACAAAGGACCAACCAGTTTTTGCAATCCCTGAAAGCTGAGGGTGA
AGTCATTGTCGAAGATGTCAGACCAAGCATTGGTCCGTCCAAGCCACCTGCTCCACCACCAACTGACCCTGTCACC
CTTACTATTGAAGAGAAAATTAATGTAACATTAAAGCGTGATGGAGGTATCAGCAACTTCAATGTCCAGGGTACCT
TATCTCTCCAAATTCTGAACCAAGAAGATGGGCTTATCCAAGTTCAGATTGAAACCAGTGGTAATCCAGCGATCCA
CTTCAACACACACCCAAATATCAATAAGGAGTTGTTTTCTAATGAAAATATTCTAGGCCTCAAAGAACCTAGTAGG
CCTTTTCCTGCTAATCAATCTGGTGATGGAGTTAGTCTCTTGAGATGGAGAATGCAAAGTGCAGATGAGTCGATTT
TACCTTTAACTATTAACTGCTGGCCTTCAGTTTCTGGGAATGAAACCTATGTGAATATTGAGTATGAAACACCAGC
ACAAACTGATCTACAGAATGTTGTGATTTTTGTACCTCTCCCAGCTCTCAGGGATGCCCCACGTATACAGCAAATT
GATGGAGAGTGGAGGTATGATTCCAGAAATTCTGTTCTGGAGTGGTCTGTAGTTCTCATCGACAATTCTAATCGCA
GTGGATCACTGGAATTTGTGGTTCCGGCAGCAGATCCTGATGTGTTGTTCCCGATTTCTGCCCGTTTTACCGCCTC
AAGAACGTTCAGTGACCTGAAGGTTGCCAATATTCTGCCATTGAAAGGTGGGTCTCCACCCAAGTTCTCTCAAAGA
ACGGCTGCTGGCTTCCGAGAACTACCAAGTCGTGTAA
```

FIG. 14

```
ATGCAAACTCTCCACTTAGTATCCACTTCTACTGTTGCTTCTTCTTGTTCTTCTTCTTCCCTACCCAGTATTGTTT
CTCTTAATTGCTGCCGTTGTCAACCTTCAAATCAGTTGCCATTTCCCAATTCTAATTTGGGTTTTCTGAAAGTTAA
GAGGCAACCAAAAGTTTCTAACTTGAAGGCTAGCTTTTGGGATTCCATCAGATCCGGGTTTGGCAAGAATAACATA
ATACAGGTTATAGATACACCATCCAGTGAAGAAGAAGAGGAAGAACCTTTGCCTGAGGAATTTGTTCTAGTTGAAA
AGACTCAACCTGATGGAACAGTTGAACAGATTATATTCTCTTCTGGAGGAGATGTTGATGTGTATGATCTCCAAGA
TTTATGTGATAAGGTTGGTTGGCCTCGAAGACCACTGTCTAAGCTAGCTGCAGCTCTGAAAAATAGCTATATAGTT
GCAACTTTGCATTCTAGGAAATTCTCATCAGGAGAAGAGGGGAGTGGAGAAAAGAAGCTGATAGGCATGGCCCGTG
CAACATCAGATCATGCATTCAATGCAACAATTTGGGATGTTCTTGTTGATCCTTCCTATCAGGGACAAGGACTTGG
AAAAGTTCTTATCGAGAAACTGATACGAACCCTTCTCCAAAGGGACATCGGAAATATTTCACTGTTTGCAGATAGT
AAAGTTGTGGAATTTTACAGGAATCTTGGTTTTGAACCTGATCCAGAGGGAATTAAGGGAATGTTCTGGTACCCCA
TGTATTAG
```

FIG. 15

```
Wild Type:      ACTGGCTTTGGCAGCGACTC                              (SEQ ID NO:35)

Mutation D011:  ACTGGCTTTGGCAGC--CTC    (2 nt deletion)           (SEQ ID NO:48)

Mutation D012:  ACTGGCTTTGGCAG---CTC    (3 nt deletion)           (SEQ ID NO:49)

Mutation D013:  ACTGGCTTTGA------CTC    (6 nt deletion,           (SEQ ID NO:50)
                                         replacement)
```

FIG. 19A

```
Wild Type:      TTCATGTCTCTGCAATCCAT                              (SEQ ID NO:38)

Mutation D101:  TTCATGTCTCTGCAAT_CAT    (1 nt deletion)           (SEQ ID NO:51)

Mutation D102:  TTCATGTCTCTGC----CAT    (4 nt deletion)           (SEQ ID NO:52)
```

FIG. 19B

```
Wild Type:      GAG-GAATTTGTTCTAGTTGA                             (SEQ ID NO:41)

Mutation N1:    GAGTGAATTTGTTCTAGTTGA   (1 nt insertion)          (SEQ ID NO:53)

Mutation N2:    GAG---------CTAGTTGA    (9 nt deletion)           (SEQ ID NO:54)
```

FIG. 20

SOLANACEOUS PLANT RESISTANT TO VIRUS OF GENUS *BEGOMOVIRUS* CAUSING TOMATO YELLOW LEAF CURL SYMPTOMS, SOLANACEOUS PLANT CELL, AND METHOD FOR PRODUCING SOLANACEOUS PLANT

CROSS REFERENCE TO RELATED APPLICATIONS

This is the U.S. national stage of application No. PCT/JP2019/046438 filed Nov. 27, 2019. Priorities under 35 U.S.C. § 119(a) and 35 U.S.C. § 365(b) are claimed from Japanese Application No. 2018-222289 filed Nov. 28, 2018 and Japanese Application No. 2019-095150 filed May 21, 2019, the disclosures of which are also incorporated herein by reference.

TECHNICAL FIELD

The present invention relates to a solanaceous plant resistant to a virus of genus *Begomovirus* causing tomato yellow leaf curl symptoms, a solanaceous plant cell, and a method for producing the solanaceous plant.

BACKGROUND ART

Tomato yellow leaf curl virus (Tomato Yellow Leaf Curl Virus; hereinafter, may be abbreviated to "TYLCV"), a representative virus causing tomato yellow leaf curl disease, is one of a relatively new plant virus found in Israel in 1964. TYLCV and other viruses of genus *Begomovirus* (the genus where TYLCV belongs) are found worldwide and are causing damages to various plants and farm products mainly in tropical, subtropical and temperate regions. Begomoviruses can be either a single-segmented type or a double-segmented type (i.e., monopartite or bipartite, respectively), and TYLCV is a monopartite virus. Distribution of TYLCV-related viruses is diverse and occurrence of the viruses are found worldwide. For example, tomato yellow leaf curl Sardinia virus (tomato yellow leaf curl Sardinia virus), a related species of TYLCV, is found only in Mediterranean regions. On the other hand, TYLCV is prevailing worldwide mainly in tomato-producing areas (see NPL 1).

In Japan, tomato yellow leaf curl disease caused by TYLCV were found simultaneously in Nagasaki, Aichi and Shizuoka prefectures in 1996 and, thereafter, occurrence of the disease is spreading rapidly in green house tomato producing areas. Especially from year 2000 onwards, occurrence of the disease is enormous in Kyushu area which is a major production area for raw eating tomatoes, and there is a continuous increase in number of farmers in which all of their cultivated tomatoes suffer from TYLCV damage. Each prefecture is giving strict alerts to the farmers and conducting thorough TYLCV prevention by pesticide spray, etc., but the occurrence of TYLCV damage is still continuing and spreading throughout the country. Even in 2016, TYLCV was a disease causing largest financial damage in tomato production.

Symptoms of the tomato yellow leaf curl disease start with yellowing of tomato leaves and, then, edges of the leaves gradually curl downwards and end in deformation (see, for example, FIG. 3(b)). When the symptoms become severe, a whole plant looks as if it has been permed. Although fruits show no symptoms, when a tomato plant gets infected with TYLCV at an early stage of cultivation, only up to about 2 rows of fruits develop in each fruit cluster and this results in a very large damage of 70 to 80% loss of harvested fruit yield.

Tomato yellow leaf curl disease is transmitted by silverleaf whitefly (*Bemisia tabaci* (*Gennadius*)), an insect vector for TYLCV, which spreads the disease permanently.

Further, there is no effective anti-viral drug against the plant viruses per se. Central methods used so far for preventing plant viruses in general are spraying of an insecticide against an insect vector transmitting the viruses, use of insect proof nets or insect repellent materials for physically avoiding an entrance of the insect vector, soil disinfestation, removal of infected plants, sterilization of cultivation and management instruments, use of barrier crops, and cultivation of virus resistant crops.

The same applies to the prevention of TYLCV. Major countermeasure is breakage of TYLCV infection cycle by, for example, control of silverleaf whitefly which is, an insect vector for TYLCV, and early removal of infected plants.

An insect proof net with a mesh size of 0.4 mm or less is effective for preventing the entrance of silverleaf whitefly, but use of such an insect proof net for prevention may cause a temperature elevation inside a cultivation facility. Therefore, actual use of the insect proof net is difficult at the cultivation spots.

In addition, in major tomato production areas, such as Kyushu area, tomatoes of various cultivation types with different cultivation seasons are being cultivated and, therefore, tomatoes are being cultivated somewhere throughout the year. Silverleaf whitefly carrying TYLCV moves between fields and cultivation facilities while adapting to different cultivation types of tomatoes and does not perish even during cold winter. Such lack of breakage in the TYLCV infection cycle makes TYLCV prevention difficult.

Recently, an insecticide resistant silverleaf whitefly, *Bemisia tabaci*-Biotype Q, is beginning to prevail and the prevention by insecticides is facing a limit.

In connection with a TYLCV resistant tomato, genes such as Ty-1, Ty-2, and Ty-3 which are so-called resistance genes have been found in wild type tomato. However, presence of these genes suppress disease symptoms, but cannot prevent TYLCV infection per se.

Tomato varieties carrying TYLCV resistance genes, which have been incorporated therein by breeding, are already available in the market. However, due to the properties of such genes, all varieties are known to be infected by TYLCV and the virus is known to proliferate in vivo in tomatoes. Accordingly, failure to control silverleaf whitefly during the cultivation of the tomatoes carrying an introduced TYLCV resistance gene results in the tomatoes carrying TYLCV. Such tomatoes will be a source of infection even when the disease symptoms are suppressed in the tomatoes, and cause surrounding TYLCV sensitive tomato varieties to be exposed to the danger of infection (see, for example, NPLs 2 to 4).

The above-mentioned problems are not peculiar to TYLCV, and are common to all viruses of the genus *Begomovirus* which are transmitted by silverleaf whitefly cause tomato yellow leaf curl symptoms.

CITATION LIST

Non-Patent Literature

NPL 1
European Food Safety Authority, "EFSA Journal," 2013, 11(4):3162
NPL 2
B. Mabvakure et al., "Virology," 2016, 498: 257-264
NPL 3
J. Basak, "Journal of Plant Pathology & Microbiology," 2016, 7: 346
NPL 4
H. Czosnek ed., "Tomato Yellow Leaf Curl Virus Disease", Springer, 2007, pp. 85-118

SUMMARY OF INVENTION

Technical Problem

Satisfactory prevention of the prevalence of viruses belonging to the genus *Begomovirus* which cause tomato yellow leaf curl symptom, such as TYLCV, was difficult by conventional methods for preventing plant viruses. Further, even when the symptoms of TYLCV infection are suppressed in solanaceous plant varieties by the introduced TYLCV resistance genes, TYLCV still proliferates in the plant body and, therefore, the TYLCV infection cycle could not be broken completely.

Under the above-mentioned circumstances, task of the present invention is to provide a virus resistant solanaceous plant, a solanaceous plant cell, and a method for producing the solanaceous plant, in which the solanaceous plant has inhibitory properties against: infection by a virus of the genus *Begomovirus* causing tomato yellow leaf curl symptoms, proliferation of the infected virus, and/or expression of infection symptoms.

Solution to Problem

The present invention relates to the following solanaceous plant, parts of the plant, and processed material thereof.

[1] A solanaceous plant having a mutation in at least one gene selected from a group consisting of translation initiation factor eIF4E gene and a gene homologous thereto, receptor-like kinase RLK gene and a gene homologous thereto, coatomer complex deltaCOP gene and a gene homologous thereto, and nuclear shuttle protein interactor NSI gene and a gene homologous thereto, wherein the mutation either inhibits expression of the mutated gene or makes a protein encoded by the mutated gene to be nonfunctional for a virus of genus *Begomovirus* causing tomato yellow leaf curl symptoms, and wherein the solanaceous plant has virus resistance against the virus.

[2] The solanaceous plant according to [1], wherein the virus of the genus *Begomovirus* causing tomato yellow leaf curl symptoms is tomato yellow leaf curl virus.

[3] The solanaceous plant according to [1] or [2], wherein the mutation is a genomic gene mutation introduced by genome editing techniques.

[4] The solanaceous plant according to any one of [1] to [3], wherein the mutation is at least one type of mutation selected from (a) to (d) below:
 (a) a frameshift mutation,
 (b) a nonsense mutation,
 (c) a loss of continuous or non-continuous 3n nucleotides (wherein n=1 to 7), and
 (d) a replacement, deletion, addition, and/or insertion of 1 or more nucleotides.

[5] The solanaceous plant according to any one of [1] to [4], wherein the mutation is in the translation initiation factor eIF4E gene or the gene homologous thereto.

[6] The solanaceous plant according to any one of [1] to [4], wherein the mutation is in the receptor-like kinase RLK gene or the gene homologous thereto.

[7] The solanaceous plant according to any one of [1] to [4], wherein the mutation is in the coatomer complex deltaCOP gene or the gene homologous thereto.

[8] The solanaceous plant according to any one of [1] to [4], wherein the mutation is in the nuclear shuttle protein interactor NSI gene or the gene homologous thereto.

[9] The solanaceous plant according to [5], wherein the translation initiation factor eIF4E gene has a cDNA sequence comprising a nucleotide sequence as set forth in SEQ ID NO:1, and the gene homologous to the translation initiation factor eIF4E gene has a cDNA sequence comprising a nucleotide sequence which has at least 85% homology to the nucleotide sequence as set forth in SEQ ID NO:1.

[10] The solanaceous plant according to [9], wherein the translation initiation factor eIF4E gene or the gene homologous thereto has the mutation in a region corresponding to a nucleotide sequence as set forth in SEQ ID NO:3.

[11] The solanaceous plant according to [10], wherein the region corresponding to the nucleotide sequence as set forth in SEQ ID NO:3 is mutated to a nucleotide sequence selected from those as set forth in SEQ ID NOs:13 to 18.

[12] The solanaceous plant according to [6], wherein the receptor-like kinase RLK gene has a cDNA sequence comprising a nucleotide sequence as set forth in SEQ ID NO:4, and the gene homologous to the receptor-like kinase RLK gene has a cDNA sequence comprising a nucleotide sequence which has at least 85% homology to the nucleotide sequence as set forth in SEQ ID NO:4.

[13] The solanaceous plant according to [12], wherein the receptor-like kinase RLK gene or the gene homologous thereto has the mutation in a region corresponding to a nucleotide sequence as set forth in SEQ ID NO:6.

[14] The solanaceous plant according to [13], wherein the region corresponding to the nucleotide sequence as set forth in SEQ ID NO:6 is mutated to a nucleotide sequence selected from those as set forth in SEQ ID NOs:19 to 22.

[15] The solanaceous plant according to [7], wherein the coatomer complex deltaCOP gene has a cDNA sequence comprising a nucleotide sequence as set forth in SEQ ID NO:33 or 36, and the gene homologous to the coatomer complex deltaCOP gene has a cDNA sequence comprising a nucleotide sequence which has at least 85% homology to the nucleotide sequence as set forth in SEQ ID NO:33 or 36.

[16] The solanaceous plant according to [15], wherein the coatomer complex deltaCOP gene or the gene homologous thereto has the mutation in a region corresponding to a nucleotide sequence as set forth in SEQ ID NO: 35 or 38.

[17] The solanaceous plant according to [16], wherein the region corresponding to the nucleotide sequence as set forth in SEQ ID NO:35 is mutated to a nucleotide sequence selected from those as set forth in SEQ ID NOs:48 to 50, and/or the region corresponding to the nucleotide sequence as set forth in SEQ ID NO:38 is mutated to a nucleotide sequence as set forth in SEQ ID NO:51 or 52.

[18] The solanaceous plant according to [8], wherein the nuclear shuttle protein interactor NSI gene has a cDNA sequence comprising a nucleotide sequence as set forth in SEQ ID NO:39, and the gene homologous to the nuclear shuttle protein interactor NSI gene has a cDNA sequence comprising a nucleotide sequence which has at least 85% homology to the nucleotide sequence as set forth in SEQ ID NO:39.

[19] The solanaceous plant according to [18], wherein the nuclear shuttle protein interactor NSI gene or the gene homologous thereto has the mutation in a region corresponding to a nucleotide sequence as set forth in SEQ ID NO:41.

[20] The solanaceous plant according to [19], wherein the region corresponding to the nucleotide sequence as set forth in SEQ ID NO:41 is mutated to a nucleotide sequence as set forth in SEQ ID NO:53 or 54.

[21] The solanaceous plant according to any one of [1] to [20] which is a tomato.

[22] A part of the solanaceous plant according to any one of [1] to [21].

[23] The part of the solanaceous plant according to [22] which is a fruit.

[24] The part of the solanaceous plant according to [22] which is a seed.

[25] A processed material of the solanaceous plant or the part thereof according to any one of [1] to [24].

[26] The processed material according to [25] which is edible.

Further, the present invention relates to the following solanaceous plant cell, and a plant and a part thereof comprising the cell.

[27] A solanaceous plant cell having a mutation in at least one gene selected from a group consisting of translation initiation factor eIF4E gene and a gene homologous thereto, receptor-like kinase RLK gene and a gene homologous thereto, coatomer complex deltaCOP gene and a gene homologous thereto, and nuclear shuttle protein interactor NSI gene and a gene homologous thereto, wherein the mutation either inhibits expression of the mutated gene or makes a protein encoded by the mutated gene to be non-functional for a virus of genus Begomovirus causing tomato yellow leaf curl symptoms, and wherein the solanaceous plant has virus resistance against the virus.

[28] The solanaceous plant cell according to [27], wherein the virus of the genus Begomovirus causing tomato yellow leaf curl symptoms is tomato yellow leaf curl virus.

[29] The solanaceous plant cell according to [27] or [28], wherein the mutation is a genomic gene mutation introduced by genome editing techniques.

[30] The solanaceous plant cell according to any one of [27] to [29], wherein the mutation is at least one type of mutation selected from (a) to (d) below:
  (a) a frameshift mutation,
  (b) a nonsense mutation,
  (c) a loss of continuous or non-continuous 3n nucleotides (wherein n=1 to 7), and
  (d) a replacement, deletion, addition, and/or insertion of 1 or more nucleotides.

[31] The solanaceous plant cell according to any one of [27] to [30], wherein the mutation is in the translation initiation factor eIF4E gene or the gene homologous thereto.

[32] The solanaceous plant cell according to any one of [27] to [30], wherein the mutation is in the receptor-like kinase RLK gene or the gene homologous thereto.

[33] The solanaceous plant cell according to any one of [27] to [30], wherein the mutation is in the coatomer complex deltaCOP gene or the gene homologous thereto.

[34] The solanaceous plant cell according to any one of [27] to [30], wherein the mutation is in the nuclear shuttle protein interactor NSI gene or the gene homologous thereto.

[35] The solanaceous plant cell according to [31], wherein the translation initiation factor eIF4E gene has a cDNA sequence comprising a nucleotide sequence as set forth in SEQ ID NO:1, and the gene homologous to the translation initiation factor eIF4E gene has a cDNA sequence comprising a nucleotide sequence which has at least 85% homology to the nucleotide sequence as set forth in SEQ ID NO:1.

[36] The solanaceous plant cell according to [35], wherein the translation initiation factor eIF4E gene or the gene homologous thereto has the mutation in a region corresponding to a nucleotide sequence as set forth in SEQ ID NO:3.

[37] The solanaceous plant cell according to [36], wherein the region corresponding to the nucleotide sequence as set forth in SEQ ID NO:3 is mutated to a nucleotide sequence selected from those as set forth in SEQ ID NOs:13 to 18.

[38] The solanaceous plant cell according to [32], wherein the receptor-like kinase RLK gene has a cDNA sequence comprising a nucleotide sequence as set forth in SEQ ID NO:4, and the gene homologous to the receptor-like kinase RLK gene has a cDNA sequence comprising a nucleotide sequence which has at least 85% homology to the nucleotide sequence as set forth in SEQ ID NO:4.

[39] The solanaceous plant cell according to [38], wherein the receptor-like kinase RLK gene or the gene homologous thereto has the mutation in a region corresponding to a nucleotide sequence as set forth in SEQ ID NO:6.

[40] The solanaceous plant cell according to [39], wherein the region corresponding to the nucleotide sequence as set forth in SEQ ID NO:6 is mutated to a nucleotide sequence selected from those as set forth in SEQ ID NOs:19 to 22.

[41] The solanaceous plant cell according to [33], wherein the coatomer complex deltaCOP gene has a cDNA sequence comprising a nucleotide sequence as set forth in SEQ ID NO:33 or 36, and the gene homologous to the coatomer complex deltaCOP gene has a cDNA sequence comprising a nucleotide sequence which has at least 85% homology to the nucleotide sequence as set forth in SEQ ID NO:33 or 36.

[42] The solanaceous plant cell according to [41], wherein the coatomer complex deltaCOP gene or the gene homologous thereto has the mutation in a region corresponding to a nucleotide sequence as set forth in SEQ ID NO: 35 or 38.

[43] The solanaceous plant cell according to [42], wherein the region corresponding to the nucleotide sequence as set forth in SEQ ID NO:35 is mutated to a nucleotide sequence selected from those as set forth in SEQ ID NOs:48 to 50, and/or the region corresponding to the nucleotide sequence as set forth in SEQ ID NO:38 is mutated to a nucleotide sequence as set forth in SEQ ID NO:51 or 52.

[44] The solanaceous plant cell according to [34], wherein the nuclear shuttle protein interactor NSI gene has a cDNA sequence comprising a nucleotide sequence as set forth in SEQ ID NO:39, and the gene homologous to the nuclear shuttle protein interactor NSI gene has a cDNA sequence comprising a nucleotide sequence which has at least 85% homology to the nucleotide sequence as set forth in SEQ ID NO:39.

[45] The solanaceous plant cell according to [44], wherein the nuclear shuttle protein interactor NSI gene or the gene homologous thereto has the mutation in a region corresponding to a nucleotide sequence as set forth in SEQ ID NO:41.

[46] The solanaceous plant cell according to [45], wherein the region corresponding to the nucleotide sequence as set forth in SEQ ID NO:41 is mutated to a nucleotide sequence as set forth in SEQ ID NO:53 or 54.

[47] The solanaceous plant cell according to any one of [27] to [46], wherein the solanaceous plant is a tomato.

[48] A solanaceous plant and a part thereof comprising the solanaceous plant cell according to any one of [27] to [47], and having virus resistance against tomato yellow leaf curl virus.

[49] The part of the solanaceous plant according to [48] which is a fruit.

[50] The part of the solanaceous plant according to [48] which is a seed.

[51] A processed material of the solanaceous plant or the part thereof according to any one of [48] to [50].

[52] The processed material according to [51] which is edible.

Further the present invention provides the following method for producing a solanaceous plant and a solanaceous plant produced by the method.

[53] A method for producing a virus resistant solanaceous plant which is resistant to a virus of genus *Begomovirus* causing tomato yellow leaf curl symptoms, the method comprising: selecting at least one gene from a group consisting of translation initiation factor eIF4E gene and a gene homologous thereto, receptor-like kinase RLK gene and a gene homologous thereto, coatomer complex deltaCOP gene and a gene homologous thereto, and nuclear shuttle protein interactor NSI gene and a gene homologous thereto; introducing a mutation into the selected gene in a genome, wherein the introduced mutation is either a mutation inhibiting an expression of the mutated gene or a mutation making a protein encoded by the mutated gene to be non-functional for the virus of the genus *Begomovirus* causing tomato yellow leaf curl symptoms; and selecting a solanaceous plant having resistance to the virus.

[54] The method for producing a virus resistant solanaceous plant according to [53], wherein the virus of the genus *Begomovirus* causing tomato yellow leaf curl symptoms is tomato yellow leaf curl virus.

[55] The method for producing a virus resistant solanaceous plant according to [53] or [54], wherein the mutation is introduced into the gene in the genome by genome editing techniques.

[56] The method for producing a virus resistant solanaceous plant according to any one of [53] to [55], wherein the mutation is at least one type of mutation selected from (a) to (d) below:
 (a) a frameshift mutation,
 (b) a nonsense mutation,
 (c) a loss of continuous or non-continuous 3n nucleotides (wherein n=1 to 7), and
 (d) a replacement, deletion, addition, and/or insertion of 1 or more nucleotides.

[57] The method for producing a virus resistant solanaceous plant according to any one of [53] to [56], wherein the mutation is introduced into the translation initiation factor eIF4E gene or the gene homologous thereto.

[58] The method for producing a virus resistant solanaceous plant according to any one of [53] to [56], wherein the mutation is introduced into the receptor-like kinase RLK gene or the gene homologous thereto.

[59] The method for producing a virus resistant solanaceous plant according to any one of [53] to [56], wherein the mutation is introduced into the coatomer complex deltaCOP gene or the gene homologous thereto.

[60] The method for producing a virus resistant solanaceous plant according to any one of [53] to [56], wherein the mutation is introduced into the nuclear shuttle protein interactor NSI gene or the gene homologous thereto.

[61] The method for producing a virus resistant solanaceous plant according to [57], wherein the translation initiation factor eIF4E gene has a cDNA sequence comprising a nucleotide sequence as set forth in SEQ ID NO:1, and the gene homologous to the translation initiation factor eIF4E gene has a cDNA sequence comprising a nucleotide sequence which has at least 85% homology to the nucleotide sequence as set forth in SEQ ID NO:1.

[62] The method for producing a virus resistant solanaceous plant according to [61], wherein the mutation is introduced into the translation initiation factor eIF4E gene or the gene homologous thereto at a region corresponding to a nucleotide sequence as set forth in SEQ ID NO:3.

[63] The method for producing a virus resistant solanaceous plant according to [62], wherein the mutation is introduced so that the region corresponding to the nucleotide sequence as set forth in SEQ ID NO:3 is changed to a nucleotide sequence selected from those as set forth in SEQ ID NOs:13 to 18.

[64] The method for producing a virus resistant solanaceous plant according to [58], wherein the receptor-like kinase RLK gene has a cDNA sequence comprising a nucleotide sequence as set forth in SEQ ID NO:4, and the gene homologous to the receptor-like kinase RLK gene has a cDNA sequence comprising a nucleotide sequence which has at least 85% homology to the nucleotide sequence as set forth in SEQ ID NO:4.

[65] The method for producing a virus resistant solanaceous plant according to [64], wherein the mutation is introduced into the receptor-like kinase RLK gene or the gene homologous thereto at a region corresponding to a nucleotide sequence as set forth in SEQ ID NO:6.

[66] The method for producing a virus resistant solanaceous plant according to [65], wherein the mutation is introduced so that the region corresponding to the nucleotide sequence as set forth in SEQ ID NO:6 is changed to a nucleotide sequence selected from those as set forth in SEQ ID NOs:19 to 22.

[67] The method for producing a virus resistant solanaceous plant according to [59], wherein the coatomer complex deltaCOP gene has a cDNA sequence comprising a nucleotide sequence as set forth in SEQ ID NO:33 or 36, and the gene homologous to the coatomer complex deltaCOP gene has a cDNA sequence comprising a nucleotide sequence which has at least 85% homology to the nucleotide sequence as set forth in SEQ ID NO:33 or 36.

[68] The method for producing a virus resistant solanaceous plant according to [67], wherein the mutation is introduced into the coatomer complex deltaCOP gene or the gene homologous thereto at a region corresponding to a nucleotide sequence as set forth in SEQ ID NO: 35 or 38.

[69] The method for producing a virus resistant solanaceous plant according to [68], wherein the mutation is introduced so that the region corresponding to the nucleotide sequence as set forth in SEQ ID NO:35 is changed to a nucleotide sequence selected from those as set forth in SEQ ID NOs:48 to 50, and/or the mutation is introduced so that the region corresponding to the nucleotide sequence as set forth in SEQ ID NO:38 is changed to a nucleotide sequence as set forth in SEQ ID NO:51 or 52.

[70] The method for producing a virus resistant solanaceous plant according to [60], wherein the nuclear shuttle protein interactor NSI gene has a cDNA sequence comprising a nucleotide sequence as set forth in SEQ ID NO:39, and the gene homologous to the nuclear shuttle protein interactor NSI gene has a cDNA sequence comprising a nucleotide sequence which has at least 85% homology to the nucleotide sequence as set forth in SEQ ID NO:39.

[71] The method for producing a virus resistant solanaceous plant according to [70], wherein the mutation is introduced into the nuclear shuttle protein interactor NSI gene or the gene homologous thereto at a region corresponding to a nucleotide sequence as set forth in SEQ ID NO:41.

[72] The method for producing a virus resistant solanaceous plant according to [71], wherein the mutation is introduced so that the region corresponding to the nucleotide sequence as set forth in SEQ ID NO:41 is changed to a nucleotide sequence as set forth in SEQ ID NO:53 or 54.

[73] The method for producing a virus resistant solanaceous plant according to any one of [53] to [72], wherein the solanaceous plant is a tomato.

[74] A virus resistant solanaceous plant obtained by the production method according to any one of [53] to [73].

In addition, the present invention provides the following method for producing a bred progeny of a solanaceous plant and a solanaceous plant obtained by the production method.

[75] A method for producing a bred progeny of a virus resistant solanaceous plant which is resistant to a virus of genus *Begomovirus* which causes tomato yellow leaf curl symptoms, the method comprising: self-pollination or cross-pollination of either a virus resistant solanaceous plant obtained by the production method according to any one of [53] to [73] or a progeny of the virus resistant solanaceous plant.

[76] A virus resistant solanaceous plant resistant to a virus of genus *Begomovirus* which causes tomato yellow leaf curl symptoms, the solanaceous plant being obtained by the production method of [75].

Advantageous Effects of Invention

According to the present invention, there is provided a virus resistant solanaceous plant, a solanaceous plant cell, and a method for producing the solanaceous plant, in which the solanaceous plant has inhibitory properties against: infection by a virus of genus *Begomovirus* causing tomato yellow leaf curl symptoms, proliferation of the infected virus, and/or expression of infection symptoms.

BRIEF DESCRIPTION OF DRAWINGS

FIG. 1 is tomato translation initiation factor eIF4E gene (solyc03g005870) in which a single underlined portion is exon 2, a double underlined portion is a guide RNA recognition site (135th nucleotide to 154th nucleotide of exon 2), and a portion enclosed in box is PAM sequence;

FIG. 2 is tomato receptor-like kinase RLK gene (solyc02g091840) in which a single underlined portion is exon 1, a double underlined portion is a guide RNA recognition site (790th nucleotide to 809th nucleotide of exon 1), and a portion enclosed in box is PAM sequence;

FIG. 11 is a drawing showing mutation patterns in the tomato translation initiation factor eIF4E gene, in which underlining indicates the mutated portion and "•" represents absence (loss) of a nucleotide;

FIG. 12 is a drawing showing mutation patterns in the tomato receptor-like kinase RLK gene, in which underlining indicates the mutated portion and "•" represents absence (loss) of a nucleotide;

FIG. 13 is deltaCOP gene (Solyc01g103480) present on tomato chromosome 1 which encodes a component of coatomer complex COPI, in which a single underlined portion is exon 6, a double underlined portion is a guide RNA recognition site (70th nucleotide to 89th nucleotide of exon 6), and a portion enclosed in box is PAM sequence;

FIG. 14 is deltaCOP gene (Solyc10g038120) present on tomato chromosome 10 which encodes a component of coatomer complex COPI, in which a single underlined portion is exon 2, a double underlined portion is a guide RNA recognition site (31st nucleotide to 50th nucleotide of exon 2), and a portion enclosed in box is PAM sequence;

FIG. 15 is tomato nuclear shuttle protein interactor NSI gene (Solyc10g074910) in which a double underlined portion is a guide RNA recognition site (74th nucleotide to 93th nucleotide of exon 4), and a portion enclosed in box is PAM sequence;

FIG. 19A is a drawing showing mutation patterns in the deltaCOP gene present on tomato chromosome 1, and FIG. 19B is a drawing showing mutation patterns in the deltaCOP gene present on tomato chromosome 10, and in both drawings, underlining indicates the mutated portion and "•" represents absence (loss) of a nucleotide; and FIG. 20 is a drawing showing mutation patterns in the tomato nuclear shuttle protein interactor NSI gene, in which underlining indicates the mutated portion and "•" represents absence (loss) of a nucleotide.

DESCRIPTION OF EMBODIMENTS

Figure 3A:
FIG. 3A and FIG. 3B shows a T1 plant of eIF4E gene-edited line A132 without any symptoms of TYLCV infection in FIG. 1A), and a control tomato plant free of introduced mutation and showing symptoms of TYLCV infection in FIG. 1B), both on day 42 from TYLCV inoculation.

Present inventors have conducted extensive and intensive studies for solving the above-mentioned problems, and found that, when solanaceous plants have a mutation in translation initiation factor eIF4E gene or a gene homologous thereto, receptor-like kinase RLK gene or a gene homologous thereto, coatomer complex deltaCOP gene or a gene homologous thereto, and/or nuclear shuttle protein interactor NSI gene or a gene homologous thereto, and the mutation either inhibits expression of the mutated gene (the eIF4E gene, RLK gene, deltaCOP gene, NSI gene, or genes homologous thereto) or makes a protein encoded by the mutated gene to be non-functional for a virus of genus *Begomovirus* causing tomato yellow leaf curl symptoms (e.g., TYLCV), the solanaceous plants have virus resistance against the virus. This is a first report on a solanaceous plant which is resistant to the virus of the genus *Begomovirus* causing tomato yellow leaf curl symptoms.

Embodiments of the present invention (hereinafter, may be referred to as "present embodiment") are explained in detail below. The present invention is not limited to the present embodiments and the drawings, and may be practiced with various changes within the scope of the gist of the present invention.

In the present invention, there is no specific limitation with respect to the virus of genus *Begomovirus* causing tomato yellow leaf curl symptoms, but the virus is preferably tomato yellow leaf curl virus (TYLCV). Hereinbelow, the present invention is explained using TYLCV as a specific example of the virus of the genus *Begomovirus* causing tomato yellow leaf curl symptoms, but the explanation should not be construed as limiting the virus mentioned in the present invention to TYLCV. It should be understood that the term "TYLCV" in the explanation below may be read as "a virus of the genus *Begomovirus* causing tomato yellow leaf curl symptoms."

[I] TYLCV Resistant Solanaceous Plant

In one aspect, the present embodiment relates to a TYLCV resistant solanaceous plant. In the present embodiment, the TYLCV resistant solanaceous plant is a plant having the properties of inhibiting the infection by TYLCV, suppressing the proliferation of TYLCV when infected, and/or suppressing the expression of TYLCV infection symptoms. The TYLCV resistant solanaceous plant is preferably a plant having a property of inhibiting the TYLCV infection, or when infected, inhibiting the proliferation of TYLCV.

In the present embodiment, the "tomato yellow leaf curl virus (TYLCV)" refers to viruses classified under the family Geminiviridae (Geminiviridae) and genus *Begomovirus* (Begomoviruses), which have a circular single DNA as a monopartite genome and a diplococcal morphology in which two spherical virions, each having a diameter of about 20 nm, are linked together.

TYLCV is occurring mainly in Middle East, North and Central America, Southeast Asia, East Asia (Japan, China) and the like. There are two TYLCV strains occurring in Japan: TYLCV Israel strain which includes an isolated strain found in Nagasaki and which is occurring in Kyushu area, Kanto area, etc., and Israel Mild strain which is occurring in Tokai area, Kanto area, etc.

In the present embodiment, there is no particular limitation with respect to the solanaceous plants as long as the plants belongs to the family Solanaceae, and such plants include those belonging to the genus *Solanum*, genus *Nicotiana*, genus *Capsicum* or the like. Specific examples of such plants include tomato (*Solanum lycopersicum*), eggplant (*Solanum melongena*), tobacco (*Nicotiana tabacum*), hot pepper (*Capsicum annuum*), potato (*Solanum tuberosum*) and the like, and the plants are preferably tomato, eggplant or potato, and more preferably tomato.

In one aspect, the TYLCV resistant solanaceous plants of the present embodiment have a mutation in at least one gene selected from the group consisting of translation initiation factor eIF4E gene and a gene homologous thereto, receptor-like kinase RLK gene and a gene homologous thereto, coatomer complex deltaCOP gene and a gene homologous thereto, and nuclear shuttle protein interactor NSI gene and a gene homologous thereto.

(eiF4E Gene)

The eIF4E gene is a gene encoding "eukaryotic translation Initiation Factor 4E," that is the translation initiation factor 4E of eukaryotes. The eIF4E is one type of translation initiation factors in eukaryotes, and has an important role in initiating protein synthesis. eIF4E, together with eIF(iso)4E, constitutes eIF4E family Solanaceous plants may have plurality of isoforms of eIF4E. For example, in tomatoes, eIF4E is known to have two isoforms which exist on chromosome 2 and chromosome 3, respectively. Further, one type of eIF(iso)4E is known to exist in tomatoes and is on chromosome 9.

Genes homologous to the tomato eIF4E are known to exist in other solanaceous plants too. For example, in hot peppers, genes pvr1 and pvr2 on chromosome 4 are known as genes homologous to the tomato eIF4E (furthermore, pvr1 and pvr2 are in a relation of an allele). In addition, pvr6 on chromosome 3 is known as a gene homologous to the tomato IF(iso)4E.

All of the members constituting the eIF4E family (such as the above-mentioned eIF4E isoforms) and other eIF4E homologous genes known from other solanaceous plants are the homologous genes of the eIF4E gene which are used in the present invention.

In the present embodiment, the "eIF4E gene" is preferably a gene having a cDNA sequence which either comprises the nucleotide sequence as set forth in SEQ ID NO:1, or consists of the nucleotide sequence as set forth in SEQ ID NO:1. Herein, the "cDNA sequence" is a DNA sequence synthesized by reverse transcription from an mRNA transcribed from a gene, and is a DNA sequence without introns found in the gene and consisting only of protein coding regions.

In addition, in the present embodiment, the "gene homologous to the eIF4E gene" is preferably a gene having a cDNA sequence which either comprises a nucleotide sequence having sequence homology to the nucleotide sequence as set forth in SEQ ID NO:1, or consists of a nucleotide sequence having sequence homology to the nucleotide sequence as set forth in SEQ ID NO:1. There is no particular limitation on the degree of sequence homology with the nucleotide sequence as set forth in SEQ ID NO:1, but the sequence homology is preferably at least 85% and less than 100%. Minimum sequence homology may be any value, such as at least 87%, at least 90%, at least 93%, at least 95%, at least 97%, at least 99%, and at least 99.5%. Homology between the nucleotide sequence as set forth in SEQ ID NO:1 and the cDNA sequence of the homologous gene may be determined by conventional methods. For example, homology between nucleotide sequences may be determined using conventional homology search programs, such as BLAST.

(RLK Gene)

The RLK gene is a tomato gene encoding "Receptor-Like Kinase," that is a kinase resembling a receptor. RLK is called BAM1 (Barely Any Meristem 1) in *Arabidopsis* and the gene encodes CLAVATA1 related receptor-like kinase protein necessary for meristematic functions of shoots and flowers which are related to the formation of leaves and gametes. Further, in *Arabidopsis*, presence of BAM2 which is highly homologous to BAM1 has been recognized, and from recent studies, presence of a highly homologous homologue in tomato is beginning to be understood. When the RLK used in the present embodiment is the "RLK1" (Solyc02g091840 on chromosome 2), such a homologue is a protein known as "RLK2." Regarding BAM1 of *Arabidopsis*, although relationship with C4 protein of a close relative to TYLCV and involvement in replication of a closely related virus have been suggested, till now, there is no report on a relationship between tomato RLK and TYLCV.

In the present embodiment, the "RLK gene" is preferably a gene having a cDNA sequence which either comprises the nucleotide sequence as set forth in SEQ ID NO:4, or consists of the nucleotide sequence as set forth in SEQ ID NO:4.

In the present embodiment, the "gene homologous to the RLK gene" is preferably a gene having a cDNA sequence which either comprises a nucleotide sequence which has sequence homology to the nucleotide sequence as set forth in SEQ ID NO:4, or consists of a nucleotide sequence which has sequence homology to the nucleotide sequence as set forth in SEQ ID NO:4. There is no particular limitation on the degree of sequence homology with the nucleotide sequence as set forth in SEQ ID NO:4, but the sequence homology is preferably at least 85% and less than 100%. Minimum sequence homology may be any value, such as at least 87%, at least 90%, at least 93%, at least 95%, at least 97%, at least 99%, and at least 99.5%. Homology between the nucleotide sequence as set forth in SEQ ID NO:4 and the cDNA sequence of the homologous gene may be determined by conventional methods. For example, homology between nucleotide sequences may be determined using conventional homology search programs, such as BLAST.

(deltaCOP Gene)

The deltaCOP gene is a gene encoding a component of coatomer complex COPI. Although details on exact role of COPI are unknown, relations with golgi bodies and with vesicle transport to the golgi bodies are known. In the studies on *Arabidopsis*, the vesicle transport is related to the transport of a movement protein in a virus of genus *Geminivirus* and, therefore, relation between the COPI and virus infection has been suggested.

In tomatoes, presence of 2 types of deltaCOP genes, one on chromosome 1 and the other on chromosome 10 (Solyc01g103480, Solyc10g038120) have been recognized. In the present specification, the deltaCOP gene on chromosome 1 may be abbreviated to "delta01 gene" and the deltaCOP gene on chromosome 10 may be abbreviated to "delta10 gene," and the description "deltaCOP gene" refers either collectively to the above-mentioned 2 types of genes or to one of the 2 types of genes.

Although participation of the deltaCOP gene in an infection of TYLCSV (a relative to TYLCV) to tobacco has been suggested, till now, there is no report on an relationship between the tomato deltaCOP and TYLCV.

In the present embodiment, the deltaCOP gene is preferably a gene having a cDNA sequence which either comprises the nucleotide sequence as set forth in SEQ ID NO:33 or 36, or consists of the nucleotide sequence as set forth in SEQ ID NO:33 or 36. The cDNA sequence as set forth in SEQ ID NO:33 corresponds to the sequence of the delta01 gene present on chromosome 1, and the cDNA sequence as set forth in SEQ ID NO: 36 corresponds to the sequence of the delta10 gene present on chromosome 10.

In the present embodiment, the "gene homologous to the deltaCOP gene" is preferably a gene having a cDNA sequence which either comprises a nucleotide sequence having sequence homology to the nucleotide sequence as set forth in SEQ ID NO:33 or SEQ ID NO:36, or consists of a nucleotide sequence having sequence homology to the nucleotide sequence as set forth in SEQ ID NO:33 or SEQ ID NO:36. There is no particular limitation on the degree of sequence homology with the nucleotide sequence as set forth in SEQ ID NO:33 or SEQ ID NO:36, but the sequence homology is preferably at least 85% and less than 100%. Minimum sequence homology may be any value, such as at least 87%, at least 90%, at least 93%, at least 95%, at least 97%, at least 99%, and at least 99.5%. Homology between the nucleotide sequence as set forth in SEQ ID NO:33 or SEQ ID NO:36 and the cDNA sequence of the homologous gene may be determined by conventional methods. For example, homology between nucleotide sequences may be determined using conventional homology search programs, such as BLAST.

(NSI Gene)

The NSI gene is considered a gene for a nuclear shuttle protein interactor. In the studies on *Arabidopsis*, the NSI gene has been shown to interact with a movement protein (NSP; nuclear shuttle protein) of Cabbage leaf curl virus (CaLCuV) belonging to the genus *Begomovirus*. Therefore, the NSI gene is suspected to participate in virus infection and replication of the CaLCuV. In tomatoes, the NSI gene is present on chromosome 10 as acetyltransferase-like protein gene (Solyc10g074910). Another acetyltransferase-like protein gene (Solyc05g010250) is present on chromosome 5, and the homology between the two is not high. Till now, there is no report on an relationship between the tomato NSI gene and TYLCV.

In the present embodiment, the NSI gene is preferably a gene having a cDNA sequence which either comprises the nucleotide sequence as set forth in SEQ ID NO:39, or consists of the nucleotide sequence as set forth in SEQ ID NO:39.

In the present embodiment, the "gene homologous to the NSI gene" is preferably a gene having a cDNA sequence which either comprises a nucleotide sequence having sequence homology to the nucleotide sequence as set forth in SEQ ID NO:39, or consists of a nucleotide sequence having sequence homology to the nucleotide sequence as set forth in SEQ ID NO:39. There is no particular limitation on the degree of sequence homology with the nucleotide sequence as set forth in SEQ ID NO:39, but the sequence homology is preferably at least 85% and less than 100%. Minimum sequence homology may be any value, such as at least 87%, at least 90%, at least 93%, at least 95%, at least 97%, at least 99%, and at least 99.5%. Homology between the nucleotide sequence as set forth in SEQ ID NO:39 and the cDNA sequence of the homologous gene may be determined by conventional methods. For example, homology between nucleotide sequences may be determined using conventional homology search programs, such as BLAST.

(TYLCV Resistance Gene)

In the present embodiment, the solanaceous plants have a mutation in at least one gene selected from the group consisting of the translation initiation factor eIF4E gene and a gene homologous thereto, the receptor-like kinase RLK gene and a gene homologous thereto, the coatomer complex deltaCOP gene and a gene homologous thereto, and the nuclear shuttle protein interactor NSI gene and a gene homologous thereto (hereinafter, a gene having a mutation is also referred to as a "TYLCV resistance gene"). The mutation either inhibits the expression of the mutated gene or makes a protein encoded by the mutated gene to be non-functional for TYLCV. The protein which is non-functional for TYLCV refers to either a protein which cannot be used by TYLCV during its infection and replication, or a protein which reduces the infection and replication of TYLCV. In one aspect, the TYLCV resistance gene may be a gene which has be mutated to no longer encode a protein.

Although not bound by any theory, during plant infection, TYLCV is considered to use a specific eIF4E isoform among the plurality of eIF4E isoforms present in a solanaceous plant. When a gene encoding the specific isoform used by TYLCV (i.e., eIF4E functional for TYLCV) has a mutation, and the mutation either prevents the production of the specific eIF4E protein used by the TYLCV or causes the produced eIF4E protein to be non-functional for TYLCV, progression of translation of proteins necessary for virus infection and proliferation which are encoded by the viral genome is likely to be blocked. Alternatively, the infection and proliferation of TYLCV may be inhibited due to incomplete function of a TYLCV protein which needs an interaction with the eIF4E protein. Solanaceous plants are considered to acquire TYLCV resistance in these manner.

On the other hand, even when one of the plurality of eIF4E homologues present in the solanaceous plant becomes mutated, either the plant itself is capable of using other homologues. Alternatively, the plant itself is capable of using the eIF4E protein non-functional for TYLCV. Accordingly, TYLCV resistance can be given to the plant without causing adverse effects on the growth of host solanaceous plant.

Regarding RLK, as explained above, the presence of RLK2 highly homologous to RLK1 (Solyc02g091840 on chromosome 2) is known, and the two RLKs are considered to exist in plants while assisting each other.

As explained above, two types of homologues exist for the deltaCOP gene, and the two homologues are considered to exist while assisting each other.

In addition, the NSI gene is understood to be an acetyl-transferase-like gene, and there are 2 types of such genes in tomato.

As explained above, the solanaceous plants having the TYLCV resistance gene acquire TYLCV resistance. For example, a plant may be judged as having the "TYLCV resistance" when the amount of accumulated TYLCV in a plant body is the same or less than the amount in a plant without TYLCV inoculation on day 20 or more post TYLCV inoculation, and/or when symptoms of TYLCV infection cannot be observed visually on day 20 or more post TYLCV inoculation. Specifically, as shown in the below-mentioned Examples, TYLCV resistance of plants may be judged by: infecting plants with TYLCV using a routine procedure, and determining the amount of accumulated TYLCV in plant bodies by conventional methods, such as ELISA, PCR, and the like. In addition, TYLCV resistance of plants may be judged by determining the presence or absence of TYLCV infection symptoms (mosaic pattern and yellowing of leaves, fern leaves, dwarfing, necrosis, etc.) in the TYLCV infected plants.

As long as the solanaceous plants have the above-mentioned TYLCV resistance, the gene mutation may be present in at least one gene selected from a group consisting of the translation initiation factor eIF4E gene and a gene homologous thereto, the receptor-like kinase RLK gene and a gene homologous thereto, the coatomer complex deltaCOP gene and a gene homologous thereto, and the nuclear shuttle protein interactor NSI gene and a gene homologous thereto. Therefore, the present embodiment includes: solanaceous plants having a mutation in the translation initiation factor eIF4E gene and and/or the gene homologous thereto; solanaceous plants having a mutation in the receptor-like kinase RLK gene and/or the gene homologous thereto; solanaceous plants having a mutation in the coatomer complex deltaCOP gene and/or the gene homologous thereto; solanaceous plants having a mutation in the nuclear shuttle protein interactor NSI gene and/or the gene homologous thereto; and solanaceous plants having mutations in at least two genes selected from a group consisting of the translation initiation factor eIF4E gene or the gene homologous thereto, the receptor-like kinase RLK gene or the gene homologous thereto, the coatomer complex deltaCOP gene or the gene homologous thereto, and the nuclear shuttle protein interactor NSI gene or the gene homologous thereto.

Further, when the TYLCV resistant solanaceous plants of the present embodiment have a mutation in the eIF4E gene, the plants may have mutations in all of the genes each encoding the eIF4E protein which is functional for TYLCV. For example, in the case of diploid plants, such as amphidiploid plants, each of the plurality of genes encoding the eIF4E protein functional for TYLCV preferably has a mutation therein. As long as the TYLCV resistant solanaceous plants have a mutation in a gene encoding the eIF4E protein functional for TYLCV, the TYLCV resistant solanaceous plants may have other normal eIF4E gene(s). Further, the TYLCV resistant solanaceous plants may be plants in which endogenous gene(s) encoding the eIF4E protein functional for TYLCV have been made non-functional due to complete loss, damage or the like, but instead, containing an introduced exogenous eIF4E gene.

The same applies to the case where a TYLCV resistant solanaceous plants have the mutation in the RLK gene, deltaCOP gene, and/or NSI gene. In other words, all of the genes encoding any one of the proteins which are functional for TYLCV may have the mutation and, preferably, all of the genes encoding the proteins functional for TYLCV have the mutation. As long as such TYLCV resistant solanaceous plants have a mutation in a gene encoding any one of the proteins which are functional for TYLCV, the TYLCV resistant solanaceous plants may have other normal gene(s). Further, the TYLCV resistant solanaceous plants may be plants in which the endogenous gene(s) encoding the protein functional for TYLCV have been made unfunctional due to complete loss, damage or the like, but instead, containing an introduced exogenous homologous gene(s).

In one aspect of the present embodiment, the TYLCV resistant solanaceous plants have a mutation in their genomic gene. Specific examples of such a gene mutation include mutations (a) to (d) below:
(a) a frameshift mutation,
(b) a nonsense mutation,
(c) a loss of continuous or non-continuous 3n nucleotides (wherein n=1 to 7), and
(d) a replacement, deletion, addition, and/or insertion of 1 or more nucleotides.

(a) The frameshift mutation is a mutation where a loss or addition of a nucleotide causes a shift in a reading frame of a codon and the mutated gene encodes a different amino acid sequence. Due to the change in the encoded amino acid sequence, the mutated gene becomes a TYLCV resistance gene.

(b) The nonsense mutation is a mutation where a codon intrinsically encoding an amino acid is changed to a termination codon, and due to this change, the mutated gene becomes a TYLCV resistance gene.

(c) The loss of continuous or non-continuous 3n nucleotides (wherein n=1 to 7, preferably n=1 to 3, for example, the 3n nucleotides are 3, 6 or 9 nucleotides) results in a change in the amino acid sequence encoded downstream of this lost region. Due to the occurrence of such a change, the mutated gene becomes a TYLCV resistance gene.

(d) The replacement, deletion, addition, and/or insertion of 1 or more nucleotides results in a change in a reading frame of an amino acid sequence encoded by a nucleotide sequence downstream of the mutated region. The change in the reading frame results in a change in intrinsically encoded amino acid sequence, and this causes a conformational change and the like of the encoded protein and the mutated gene becomes a TYLCV resistance gene. In one aspect, this mutation is preferably a mutation of a nucleotide other than the 3rd nucleotide of a codon. There is no particular limitation on the number of replaced, deleted, added, and/or inserted nucleotides as long as the TYLCV resistance gene is obtained. For example, the number of nucleotides may be 1 to 5, 1 to 3, or 1 to 2.

The mutation of the TYLCV resistance gene is preferably at least one mutation selected from (a) to (d) above. The above-mentioned mutations (a) to (d) are not alternatives; for example, there are cases where the mutation (a) or (b) occurs as a result of the mutation (c) or (d).

There is no particular limitation with respect to the mutation in the genome of the solanaceous plants as long as the mutation inhibits the gene expression of the mutated gene or makes the protein encoded by the mutated gene to be non-functional for TYLCV, and imparts TYLCV resistance to the plants and also causes no considerable damage to the life or growth of the plants.

Next, the mutations are explained in detail.

In one aspect, when the solanaceous plants have a mutation in the eIF4E gene, the mutation is preferably in exon 2 (SEQ ID NO:2) of the eIF4E gene, and more preferably in a region comprising the 135th to 154th nucleotides in exon 2, that is, the region comprising AGGGTAAATCTGATACCAGC as set forth in SEQ ID NO:3. When the solanaceous plants have mutation in the gene homologous to the eIF4E gene, the mutation is preferably in a region of the homologous gene which corresponds to the nucleotide sequence as set forth in SEQ ID NO:2, and more preferably in a part of the above region which corresponds to the nucleotide sequence as set forth in SEQ ID NO:3.

When the solanaceous plants have a mutation in the sequence AGGGTAAATCTGATACCAGC as set forth in SEQ ID NO:3 or a region corresponding to the sequence, the mutation is preferably an insertion of 1 nucleotide, deletion of 3 nucleotides, or deletion or replacement of 9 nucleotides. Specific examples of such mutations are: insertion of 1 nucleotide between the 15th and 16th nucleotides (e.g., insertion of C (cytosine)), deletion of 3 nucleotides which are the 16th to 18th nucleotides, deletion of any 9 nucleotides from the 8th to 18th nucleotides (preferably the deletion is 9 nucleotides exclusive of the 10th and 13th nucleotides). Nucleotide sequences of regions with such mutations are shown in FIG. 11 and SEQ ID NOs:13 to 18.

In addition, the present invention have succeeded in producing TYLCV resistant solanaceous plants which have mutations similar to those mentioned above for the eIF4E gene in the eIF(iso)4E gene (an isoform of the eIF4E gene).

In one aspect, when the solanaceous plants have a mutation in the RLK gene, the mutation is preferably in exon 1 (SEQ ID NO:5) of the RLK gene, and more preferably in a region comprising the 790th to 809th nucleotides in exon 1, that is, the region comprising TCTCTAGAGTACCTTGCAGT as set forth in SEQ ID NO:6. When the solanaceous plants have mutation in the gene homologous to the RLK gene, the mutation is preferably in a region of the homologous gene which corresponds to the nucleotide sequence as set forth in SEQ ID NO:5, and more preferably in a part of the above region which corresponds to the nucleotide sequence as set forth in SEQ ID NO:6.

When the solanaceous plants have a mutation in the sequence TCTCTAGAGTACCTTGCAGT as set forth in SEQ ID NO:6 or a region corresponding to the sequence, the mutation is preferably a deletion of 5 nucleotides, deletion of 7 nucleotides, or insertion or replacement of 1 nucleotide. Nucleotide sequences of regions with such mutations are shown in FIG. 12 and SEQ ID NOs:19 to 22.

In one aspect, when the solanaceous plants have a mutation in the deltaCOP gene, the mutation is preferably in exon 6 (SEQ ID NO:34) of the deltaCOP gene on chromosome 1 (i.e., delta01 gene), and more preferably in a region comprising the 70th to 89th nucleotides in exon 6 of the delta01 gene, that is, the region comprising ACTGGCTTTGGCAGCGACTC as set forth in SEQ ID NO:35. When the solanaceous plants have mutation in the gene homologous to the delta01 gene, the mutation is preferably in a region of the homologous gene which corresponds to the nucleotide sequence as set forth in SEQ ID NO:34, and more preferably in a part of the above region which corresponds to the nucleotide sequence as set forth in SEQ ID NO:35.

When the solanaceous plants have a mutation in the sequence ACTGGCTTTGGCAGCGACTC as set forth in SEQ ID NO:35 or a region corresponding to the sequence, the mutation is preferably a deletion of 2 nucleotides, deletion of 3 nucleotides, or deletion of 6 nucleotides with replacement of 1 nucleotide. Specific examples of such mutations are: deletion of 2 nucleotides which are 16th to 17th nucleotides, deletion of 3 nucleotides which are the 15th to 17th nucleotides, and replacement of the 11th nucleotide with deletion of 6 nucleotides which are the 12th to 17th nucleotides.

Alternatively, the mutation in the deltaCOP gene is preferably in exon 2 (SEQ ID NO:37) of the deltaCOP gene on chromosome 10 (i.e., delta10 gene), and more preferably in a region comprising the 31st to 50th nucleotides in exon 2 of the delta10 gene, that is, the region comprising TTCATGTCTCTGCAATCCAT as set forth in SEQ ID NO:38. When the solanaceous plants have mutation in the gene homologous to the delta10 gene, the mutation is preferably in a region of the homologous gene which corresponds to the nucleotide sequence as set forth in SEQ ID NO:37, and more preferably in a part of the above region which corresponds to the nucleotide sequence as set forth in SEQ ID NO:38.

When the solanaceous plants have a mutation in the sequence TTCATGTCTCTGCAATCCAT as set forth in SEQ ID NO:38 or a region corresponding to the sequence, the mutation is preferably a deletion of 1 nucleotide, or deletion of 4 nucleotides. Specific examples of such mutations are: deletion of 1 nucleotide which is the 17th nucleotide, and deletion of 4 nucleotides which are the 14th to 17th nucleotides.

Nucleotide sequences of the mutated regions of the deltaCOP gene are shown in FIG. 19 and SEQ ID NOs:48 to 52.

In one aspect, when the solanaceous plants have a mutation in the NSI gene, the mutation is preferably in exon 4 (SEQ ID NO:40) of the NSI gene, and more preferably in a region comprising the 74th to 93rd nucleotides in exon 4, that is, the region comprising GAGGAATTTGTTCTAGTTGA as set forth in SEQ ID NO:41. When the solanaceous plants have mutation in the gene homologous to the NSI gene, the mutation is preferably in a region of the homologous gene which corresponds to the nucleotide sequence as set forth in SEQ ID NO:40, and more preferably in a part of the above region which corresponds to the nucleotide sequence as set forth in SEQ ID NO:41.

When the solanaceous plants have a mutation in the sequence GAGGAATTTGTTCTAGTTGA as set forth in SEQ ID NO:41 or a region corresponding to the sequence, the mutation is preferably an insertion of 1 nucleotide or deletion of 9 nucleotides. Nucleotide sequences of regions with such mutations are shown in FIG. 12 and SEQ ID NOs:19 to 22. Specific examples of such mutations are: insertion of 1 nucleotide between the 3rd and 4th nucleotides (one example is insertion of T (thymine)), and deletion of 9 nucleotides which are the 4th to 12th nucleotides. Nucleotide sequences of regions with such mutations are shown in FIG. 20 and SEQ ID NOs:53 and 54.

The present embodiment relates to the TYLCV resistance genes, which are: the mutated eIF4E gene per se having the mutated region as set forth in any one of SEQ ID NOs:13 to 18, the mutated RLK gene per se having the mutated region as set forth in any one of SEQ ID NOs:19 to 22, the mutated deltaCOP gene per se having the mutated region as set forth in any one of SEQ ID NOs:48 to 50 and SEQ ID NOs:51 to 52, and the mutated NSI gene per se having the mutated region as set forth in any one of SEQ ID NOs:53 to 54. These genes are preferably the mutated eIF4E gene having a cDNA sequence which either comprises the nucleotide sequence as set forth in any one of SEQ ID NO:23 to 28 or consists of the nucleotide sequence as set forth in any one of SEQ ID NO:23 to 28, the mutated RLK gene having a cDNA sequence which either comprises the nucleotide sequence as set forth in any one of SEQ ID NO:29 to 32 or consists of the nucleotide sequence as set forth in any one of SEQ ID NO:29 to 32, the mutated deltaCOP gene having a cDNA sequence which either comprises the nucleotide sequence as set forth in any one of SEQ ID NO:55 to 59 or consists of the nucleotide sequence as set forth in any one of SEQ ID NO:55 to 59, or the mutated NSI gene having a cDNA sequence which either comprises the nucleotide sequence as set forth in any one of SEQ ID NO:60 to 61 or consists of the nucleotide sequence as set forth in any one of SEQ ID NO:60 to 61. The present embodiment also relates to the use of the above-mentioned mutated eIF4E gene, mutated RLK gene, mutated deltaCOP gene, or mutated NSI gene for giving TYLCV resistance to the solanaceous plants.

It should be noted that the mutations in the solanaceous plants are not limited to the above-mentioned regions, and mutations may exist in other regions of the eIF4E gene, RLK gene, deltaCOP gene, NSI gene, and other genes, as long as TYLCV resistance is maintained.

In one aspect, the mutation in the gene of the solanaceous plants is preferably a genomic gene mutation introduced by genome editing techniques, such as the below-mentioned CRISPR system.

The mutated gene in the genome may be homozygous in which the mutation exists in both alleles, or heterozygous in which the mutation exists in one of the alleles, but homozygous mutation is preferred. This is because properties imparted by the mutated gene are more strongly exhibited by a homozygous mutation in which both alleles are characterized by the same mutated sequence.

(TYLCV Resistant Solanaceous Plant and Parts Thereof)

The TYLCV resistant solanaceous plants of the present embodiment may be solanaceous plants with complex resistance showing resistance against viruses other than TYLCV and bacteria, as long as the plants show resistance against TYLCV. Specific examples of other viruses include all potyviruses (PVY, etc.); viruses belonging to the genera *Bymovirus* and *Sobemovirus* and having a VPg similar to that of the PVY at their 5' terminus, in which a mutation in a translation initiation factor has been reported to impart resistance against these viruses; and viruses belonging to the genus *Carmovirus* in which a mutation in a translation initiation factor has been reported to impart resistance against these viruses.

In one aspect, the present embodiment relates to parts of the TYLCV resistant solanaceous plants. Such parts include not only parts collected from the solanaceous plants having the above-mentioned characteristics, and their progenies or clone plants, but also derivatives obtained from plant bodies or parts thereof. Specific examples of the parts include organs, such as fruits, shoots, roots, burgeons, and anthers; and plant tissues and cells. The parts may take any form, such as a suspension culture, protoplast, germ, callus tissue, lamina, gametophyte, sporophyte, pollen or microspore. An example of a derivative of the solanaceous plant is seeds.

In the present embodiment, the part of the TYLCV resistant solanaceous plants may be a scion, rootstock, etc. used for grafting. Further, in one aspect, the present embodiment relates to plant cells (including callus) which can regenerate the above-mentioned TYLCV resistant solanaceous plants, and the TYLCV resistant solanaceous plants of the present embodiment also include such plants obtained from plant cells.

Parts of the solanaceous plants having TYLCV resistance are preferably fruits which are edible fresh or useful for processing. In addition, the parts are preferably seeds which are useful for progeny production and the like.

(Processed Material of Solanaceous Plants or Parts Thereof)

In one aspect, the present embodiment relates to a processed material of the solanaceous plants or the parts thereof. There is no particular limitation with respect to the processed materials, and examples include edible, industrial, and medical processed materials, and preferably the processed materials are edible materials.

For example, when the solanaceous plant having TYLCV resistance is a tomato, examples of edible processed materials of tomato include canned tomatoes, tomato pastes, ketchups, tomato sauces, tomato soups, dried tomatoes, tomato juices, tomato powders, and tomato concentrates. A nutritional supplementary food (supplement) made from tomatoes is also an example of a processed material.

[II] Solanaceous Plant Cells Having TYLCV Resistance

In one aspect, the present embodiment relates to Solanaceous plant cells having TYLCV resistance.

The solanaceous plant cells of the present embodiment has a mutation in at least one gene selected from the group consisting of the translation initiation factor eIF4E gene and a gene homologous thereto, the receptor-like kinase RLK gene and a gene homologous thereto, the coatomer complex deltaCOP gene and a gene homologous thereto, and the nuclear shuttle protein interactor NSI gene and a gene homologous thereto. Details of these genes and their mutation are already explained above in connection with the TYLCV resistant solanaceous plants.

TYLCV resistance of the solanaceous plant cells may be confirmed by the above-mentioned methods. For example, absence or presence of TYLCV resistance can be confirmed by infecting plant cells with TYLCV using a routine procedure, and determining the amount of accumulated TYLCV in plant cells by conventional methods, such as ELISA, PCR, and the like.

The TYLCV resistant solanaceous plant cells of the present embodiment may be either cells isolated from the above-mentioned solanaceous plants and their progenies or clone plants, or plant cells with introduced gene mutation which are obtained by the below-mentioned method for producing a TYLCV resistant solanaceous plant. Further, there is no particular limitation on the form of the plant cells, and the plant cells include a suspension culture and protoplast.

There is no particular limitation on the type of plant cells as long as the cells are solanaceous plant cells. The cells are preferably the cells of tomato, eggplant, tobacco, hot pepper, or potato, and more preferably the cells of tomato, eggplant or potato, and most preferably the cells of tomato.

In one aspect, the present embodiment relates to solanaceous plant bodies and parts thereof containing the above-mentioned solanaceous plant cells and having TYLCV resistance. The solanaceous plant bodies and parts thereof include plant bodies or parts, such as tissues and organs, which have been regenerated from plant cells carrying an introduced gene mutation. Parts of a plant body regenerated from plant cells are also parts containing the above-mentioned solanaceous plant cells. The details of the parts are the same as those mentioned above in connection with the TYLCV resistant solanaceous plants.

Further, parts of the solanaceous plants are preferably fruits which are edible fresh or useful for processing. In addition, the parts are preferably seeds which are useful for progeny production and the like.

In one aspect, the present embodiment relates to a processed material of the solanaceous plants or the parts thereof. There is no particular limitation with respect to the processed materials, and examples include edible, industrial, and medical processed materials, and preferably the processed materials are edible materials.

[III] Method for Producing a TYLCV Resistant Solanaceous Plant

In one aspect, the present embodiment relates to a method for producing a TYLCV resistant solanaceous plant. Specifically, the method comprises the following steps:

selecting at least one gene from the group consisting of the translation initiation factor eIF4E gene and a gene homologous thereto, the receptor-like kinase RLK gene and a gene homologous thereto, the coatomer complex deltaCOP gene and a gene homologous thereto, and the nuclear shuttle protein interactor NSI gene and a gene homologous thereto;

introducing a mutation into the selected gene in a genome, in which the introduced mutation is either a mutation inhibiting an expression of the mutated gene or a mutation making a protein encoded by the mutated gene to be non-functional for TYLCV; and selecting a solanaceous plant having resistance to TYLCV.

Firstly, a target gene for introducing a mutation is selected. At least one gene is selected from the group consisting of the translation initiation factor eIF4E gene and a gene homologous thereto, the receptor-like kinase RLK gene and a gene homologous thereto, the coatomer complex deltaCOP gene and a gene homologous thereto, and the nuclear shuttle protein interactor NSI gene and a gene homologous thereto. The selected gene may be single gene or a combination of two or more genes. Details of the genes are the same as those explained above in connection with the TYLCV resistant solanaceous plants.

Secondly, a mutation is introduced into the selected gene. Methods for introducing a mutation into a genomic gene can be broadly classified into two methods exemplified below.

(1) Direct genome editing: A method in which a plant carrying a TYLCV resistance gene is produced by directly editing a plant genome carrying the eIF4E, RLK, deltaCOP or NSI gene functional for TYLCV to introduce a mutation into a desired site at a pin point.

(2) Introduction of mutated gene: A method which combines the following steps (A) and (B): (A) TYLCV resistance gene is produced, and introduced into a plant by using an appropriate promotor; and (B) among endogenous genes of a plant which correspond to the TYLCV resistance gene produced in step (A) above, a gene functional for TYLCV is changed into a gene non-functional for TYLCV.

Each method is explained below.

(1) Direct Genome Editing

Direct genome editing can be performed using conventional genome editing techniques which use a site specific nuclease, such as CRISPR, TALEN or the like. When a double strand cleavage is introduced using a restriction enzyme capable of cleaving a specific site in a genome, various mutations are introduced at the time of repair due to a repair error. As a result, a mutation is introduced into a target gene (in the present embodiment, a gene encoding eIF4E, RLK, deltaCOP or NSI functional for TYLCV).

Preferably a CRISPR system, and more preferably a CRISPR/Cas9 system is used since these systems are capable of introducing mutation at high specificity and high efficiency. In the CRISPR/Cas9 system, a guide RNA (sgRNA) which has a sequence of about 20 nucleotides long and which is homologous to the target gene recognizes the target and Cas9 protein cleaves the double strand. During the repair of the resultant cleavage by nonhomologous end-joining (NHEJ) repair cycle, a mutation is introduced into the target site due to a repair error.

Delivery of the Cas protein and sgRNA to a plant may be performed via a vector encoding the same by using methods well-known to those skilled in the art, such as an *Agrobac-*

*terium* method, a standard transfection, electroporation, particle bombardment and the like.

Briefly, as explained in Examples hereinbelow, the Cas protein and sgRNA are delivered to plants by constructing a binary vector with incorporated Cas gene and sgRNA, and transforming *Agrobacterium* with the constructed vector, followed by transformation of plants with the *Agrobacterium* (see, for example, Friedrich Fuser et al., "The Plant Journal," 2014, 79: 348-359; and Ryo Oosawa and Hiroshi Ezura, "Atarashii Shokubutu Ikushu Gijyutu wo Rikaisiyou—NBT (New plant breeding techniques) (Understanding New Plant Breeding Techniques—NBT (New plant breeding techniques))", International Academic Publishing Co., Ltd., 2013).

There is no particular limitation on the form of the plants being transformed with the *Agrobacterium*, as long as the plant is capable of reproducing a plant body. Examples of such plant forms include a suspension culture, protoplast, leaf section, callus and the like. After removing the *Agrobacterium*, the transfected plants can be cultured in a medium containing a drug selected in accordance with the vector used, and a selection culture of a plant (section) having an incorporated desired gene may be performed based on drug resistance.

The guide RNA may be designed to enable a highly efficient introduction of a mutation into a target site. In general, a site 3 nucleotides upstream of a 3-nucleotide sequence called a PAM sequence (which is NGG for the most popular Cas9 derived from *S. pyogenes*) is basically cleaved in a CRISPR system. Since the PAM sequence must exist immediately after the target sequence, the guide RNA may be designed so that the target sequence is located upstream of the PAM sequence.

When designing the guide RNA, GC content is preferably taken into consideration because higher the GC content, the higher is the the cleavage efficiency. Further, the system may be designed to minimize non-specific cleavage by an off-target effect. In one aspect, when the plant is tomato, the guide RNA is preferably designed to have a nucleotide sequence which targets a specific sequence (e.g., SEQ ID NO:3) in exon 2 of chromosome 3 and/or a specific sequence (e.g., SEQ ID NO:6) in exon 1 of chromosome 2.

For example, in FIG. 1 which illustrates the cDNA sequence (SEQ ID NO:1) of the eIF4E gene present on chromosome 3 of a tomato, the guide RNA may be designed so that the PAM sequence is the boxed portion in exon 2 (underlined portion of FIG. 1; SEQ ID NO:2) and the target is generally 20 nucleotides (SEQ ID NO:3) located upstream of the boxed 3 nucleotides. The direct genome editing of other solanaceous plants can be performed in the same manner as in tomatoes, by selecting a target from a region in a gene homologous to the eIF4E gene which corresponds to the nucleotide sequence as set forth in SEQ ID NO:3 and, then, selecting the PAM sequence and designing the guide RNA. Plants having TYLCV resistant eIF4E gene can be produced by introducing a mutation to the target site into the above-mentioned manner.

In FIG. 2 which illustrates the cDNA sequence (SEQ ID NO:4) of the RLK gene present on chromosome 2 of a tomato, the guide RNA may be designed so that the PAM sequence is the boxed portion in exon 1 (underlined portion of FIG. 2; SEQ ID NO:5) and the target is generally 20 nucleotides (SEQ ID NO:6) located upstream of the boxed 3 nucleotides. The direct genome editing of other solanaceous plants can be performed in the same manner as in tomatoes, by selecting a target from a region in a gene homologous to the RLK gene which corresponds to the nucleotide sequence as set forth in SEQ ID NO:6 and, then, selecting the PAM sequence and designing the guide RNA. Plants having TYLCV resistant RLK gene can be produced by introducing a mutation into the target site in the above-mentioned manner.

In FIG. 13 which illustrates the cDNA sequence (SEQ ID NO:33) of the deltaCOP gene present on chromosome 1 (i.e., delta01 gene) of a tomato, the guide RNA may be designed so that the PAM sequence is the boxed portion in exon 6 (underlined portion of FIG. 13; SEQ ID NO:34) and the target is generally 20 nucleotides (SEQ ID NO:35) located upstream of the boxed 3 nucleotides. The direct genome editing of other solanaceous plants can be performed in the same manner as in tomatoes, that is, selecting a target from a region in a gene homologous to the delta01 gene which corresponds to the nucleotide sequence as set forth in SEQ ID NO:35 and, then, selecting the PAM sequence and designing the guide RNA. Plants having TYLCV resistant deltaCOP gene can be produced by introducing a mutation into the target site in the above-mentioned manner.

In FIG. 14 which illustrates the cDNA sequence (SEQ ID NO:36) of the deltaCOP gene present on chromosome 10 (i.e., delta10 gene) of a tomato, similarly, the guide RNA may be designed so that the PAM sequence is the boxed portion in exon 2 (underlined portion of FIG. 14; SEQ ID NO:37) and the target is generally 20 nucleotides (SEQ ID NO:38) located upstream of the boxed 3 nucleotides. The direct genome editing of other solanaceous plants can be performed in the same manner as in tomatoes, by selecting a target from a region in a gene homologous to the delta10 gene which corresponds to the nucleotide sequence as set forth in SEQ ID NO:38 and, then, selecting the PAM sequence and designing the guide RNA. Plants having TYLCV resistant deltaCOP gene can be produced by introducing a mutation into the target site in the above-mentioned manner.

In FIG. 15 which illustrates the cDNA sequence (SEQ ID NO:39) of the NSI gene present on chromosome 10 of a tomato, the guide RNA may be designed so that the PAM sequence is the boxed portion in exon 4 (underlined portion of FIG. 15; SEQ ID NO:40) and the target is generally 20 nucleotides (SEQ ID NO:41) located upstream of the boxed 3 nucleotides. The direct genome editing of other solanaceous plants can be performed in the same manner as in tomatoes, by selecting a target from a region in a gene homologous to the NSI gene which corresponds to the nucleotide sequence as set forth in SEQ ID NO:41 and, then, selecting the PAM sequence and designing the guide RNA. Plants having TYLCV resistant NSI gene can be produced by introducing a mutation into the target site in the above-mentioned manner.

When a double strand cleavage is introduced into a single site by the CRISPR system, about 20 nucleotides are repaired and a mutation is considered to be introduced by the repair error. Therefore, in one aspect, the mutation in the TYLCV resistance gene of the present embodiment is a mutation of continuous or non-continuous 3n nucleotides (wherein n=1 to 7, preferably n=1 to 3).

Further, the present embodiment relates to the guide RNAs and vectors comprising the guide RNA which are used for producing the TYLCV resistant solanaceous plant. The sequences of the guide RNAs are as mentioned above. The present embodiment also relates to kits comprising the guide RNA. The kits may comprise a site specific nuclease and the like which are necessary for genome editing using the CRISPR system, and the kit may be used for producing the TYLCV resistant solanaceous plants.

(2) Introduction of Mutated Gene

Introduction of mutated gene is a method which combines the following steps (A) and (B).

(A) TYLCV resistance gene is produced, and introduced into a plant by using an appropriate promotor; and (B) among endogenous genes of a plant which correspond to the TYLCV resistance gene produced in step (A) above, a gene functional for TYLCV is changed into a gene non-functional for TYLCV.

There is no particular limitation on the order for performing the above steps (A) and (B) as long as the steps cause no fatal damage to the plants, and step (B) may be performed before step (A). It should be noted that a method which performs step (B) alone at a specific part of the plant is the method (1) Direct Genome Editing.

In step (A), a mutated gene encoding eIF4E protein non-functional for TYLCV, a mutated gene encoding RLK protein non-functional for TYLCV, a mutated gene encoding deltaCOP protein non-functional for TYLCV, and/or a mutated gene encoding NSI protein non-functional for TYLCV is/are produced, and introduced into plants using an appropriate promotor. Production of the mutated gene may be performed by conventional methods well-known in the art. For example, a nucleotide sequence having a desired mutation may be synthesized and amplified by PCR, etc. The mutations introduced herein are the same as those explained above in connection with the TYLCV resistant solanaceous plants.

Introduction of the produced mutated gene into plants may be also performed by conventional methods well-known in the art. In brief, the introduction may be performed using a vector containing the mutated gene, for example by a polyethylene glycol method, electroporation, *Agrobacterium* method, particle gun method and the like. The mutated gene introduced herein is the TYLCV resistance gene obtained by introducing a mutation into the eIF4E gene (or the gene homologous thereto), RLK gene (or the gene homologous thereto), deltaCOP gene (or the gene homologous thereto) and/or NSI gene (or the gene homologous thereto) derived from a solanaceous plant, and the TYLCV resistance gene can be derived from solanaceous plants of different species.

There is no particular limitation on the form of the plants used for introduce the above-mentioned vector, as long as the plant is capable of reproducing a plant body. Examples of such plant forms include a suspension culture, protoplast, leaf section, callus and the like.

Next, in step (B), among the endogenous eIF4E gene (or the gene homologous thereto), RLK gene (or the gene homologous thereto), deltaCOP gene (or the gene homologous thereto) and/or NSI gene (or the gene homologous thereto) of the plant, a gene which is functional for TYLCV is changed into a gene which is non-functional for TYLCV. Step (B) may be performed using conventional methods which are used for introducing mutation into plants. Examples of such methods include treatments with a mutagen, such as ion beam or EMS. Step (B) may be performed using the above-mentioned genome editing techniques, such as CRISPR and TALEN. Desirably, all of the genes functional for TYLCV among the endogenous eIF4E, RLK, deltaCOP and/or NSI are changed into a state which is non-functional for TYLCV.

Subsequently, a plant body is reproduced from the parts (such as, leaf sections or plant cells) of the plant carrying the TYLCV resistance gene. Reproduction of the plant body may be performed by well-known conventional methods in accordance with the type of the plant. For example, reproduction may be performed by making reference to Sun H. J. et al., "Plant Cell Physiol.," 2006, 47: 426 and the like for tomatoes, and Jefferson R. A. et al., "EMBO J.," 1987, 6: 3901 and the like for tobaccos.

Further, solanaceous plants having resistance against TYLCV are selected from the reproduced plants. Such a selection may be performed by the above-mentioned methods for confirming TYLCV resistance. For example, plants having TYLCV resistance may be selected by infecting the plants with TYLCV using a routine procedure, and determining the amount of accumulated TYLCV in the plants by conventional methods, such as ELISA, PCR and the like. Alternatively, solanaceous plants having TYLCV resistance may be selected by determining the presence or absence of TYLCV infection symptoms (mosaic pattern and yellowing of leaves, fern leaves, dwarfing, necrosis, etc.) in the TYLCV infected plants.

The solanaceous plants produced by the above-mentioned methods include tomato, eggplant, tobacco, hot pepper, potato and the like, preferably tomato, eggplant, and potato, and more preferably tomato.

In one aspect, the present embodiment relates to solanaceous plants produced by the above-mentioned method. Such solanaceous plants are the same as the TYLCV resistant solanaceous plants explained above.

Once the TYLCV resistant solanaceous plants carrying the TYLCV resistance gene are obtained, progenies and clones of such plants may be obtained by conventional methods. Therefore, the TYLCV resistant solanaceous plants of the present embodiment include such progenies and clones.

In one aspect, the present embodiment relates to a method for producing a bred progeny of the TYLCV resistant solanaceous plant, comprising: self-pollination or cross-pollination of TYLCV resistant solanaceous plant (first generation) or its progeny. The self-pollination or cross-pollination of a plant can be performed by any conventional methods well-known in the art, and can be performed under either natural or artificial conditions. The progeny obtained in this manner may be subjected to self-pollination or cross-pollination to produce a further progeny.

A solanaceous plant used to crossbreed with the first generation or later progeny by cross-pollination may be a solanaceous plant having either the same mutation in the same gene, a different mutation in the same gene, or a mutation in a different gene. For example, it is possible to crossbreed 2 different plants selected from a plant having mutation in the eIF4E gene, a plant having mutation in the RLK gene, a plant having mutation in the deltaCOP gene, and a plant having mutation in the NSI gene. It is also possible to perform breeding several times to produce a plant carrying mutation in 3 or more genes.

EXAMPLES

Example 1

Production of Recombinant *Agrobacterium* A for Introducing Mutation into eIF4 Gene Guide RNA recognition site was designed in exon 2 (SEQ ID NO:2) of eIF4E gene (Solyc03g005870) which is said to be present on chromosome 3 of tomatoes. Double stranded DNA corresponding to the designed 20 nucleotide-long site (SEQ ID NO:3: AGGGTAAATCTGATACCAGC) was synthesized and inserted into restriction enzyme BbsI site of vector pUC19_AtU6oligo (obtained from National Research and Development Agency, National Institute of Agrobiological Sciences), thereby constructing recombinant vector A. cDNA sequence of the eIF4E gene present on chromosome 3 of wild type tomatoes is shown in FIG. 1 and SEQ ID NO:1.

A cassette site containing the guide RNA region was cutout from the constructed recombinant vector A and inserted into restriction enzyme I-SceI site of binary vector pZD_OsU3gYSA_HolgerCas9_NPTII, thereby obtaining recombinant binary vector A. *Agrobacterium* LBA4404 (manufactured and sold by Takara Bio Inc) was transformed with the binary vector A by a conventional method to obtain recombinant *Agrobacterium* A.

Example 2

Production of Recombinant *Agrobacterium* B for Introducing Mutation into RLK Gene Guide RNA recognition site was designed in exon 1 (SEQ ID NO:5) of RLK gene (Solyc02g091840) which is said to be present on chromosome 2 of tomatoes. Double stranded DNA corresponding to the designed 20 nucleotide-long site (SEQ ID NO:6: TCTCTAGAGTACCTTGCAGT) was synthesized and inserted into restriction enzyme BbsI site of vector pUC19_AtU6oligo (obtained from National Research and Development Agency, National Institute of Agrobiological Sciences), thereby constructing recombinant vector B. cDNA sequence of the RLK gene present on chromosome 2 of wild type tomatoes is shown in FIG. 2 and SEQ ID NO:4.

A cassette site containing the guide RNA region was cutout from the constructed recombinant vector B and inserted into restriction enzyme I-SceI site of binary vector pZD_OsU3gYSA_HolgerCas9_NPTII, thereby obtaining recombinant binary vector B. *Agrobacterium* LBA4404 (manufactured and sold by Takara Bio Inc) was transformed with the binary vector B by a standard method to obtain recombinant *Agrobacterium* B.

Example 3

Production of Recombinant *Agrobacterium* C for Introducing Mutation into deltaCOP Gene on Chromosome 1

Guide RNA recognition site was designed in exon 6 (SEQ ID NO:34) of deltaCOP gene (Solyc01g103480) which is said to be present on chromosome 1 of tomatoes. Double stranded DNA corresponding to the designed 20 nucleotide-long site (SEQ ID NO:35: ACTGGCTTTGGCAGCGACTC) was synthesized and inserted into restriction enzyme BbsI site of vector pUC19_AtU6oligo (obtained from National Research and Development Agency, National Institute of Agrobiological Sciences), thereby constructing recombinant vector C. cDNA sequence of the deltaCOP gene present on chromosome 1 of wild type tomatoes is shown in FIG. 13 and SEQ ID NO:33.

A cassette site containing the guide RNA region was cutout from the constructed recombinant vector C and inserted into restriction enzyme I-SceI site of binary vector pZD_OsU3gYSA_HolgerCas9_NPTII, thereby obtaining recombinant binary vector C. *Agrobacterium* LBA4404 (manufactured and sold by Takara Bio Inc) was transformed with the binary vector C by a standard method to obtain recombinant *Agrobacterium* C.

Example 4

Production of Recombinant *Agrobacterium* D for Introducing Mutation into deltaCOP Gene on Chromosome 10

Guide RNA recognition site was designed in exon 2 (SEQ ID NO:37) of deltaCOP gene (Solyc10g038120) which is said to be present on chromosome 10 of tomatoes. Double stranded DNA corresponding to the designed 20 nucleotide-long site (SEQ ID NO:38: TTCATGTCTCTGCAATCCAT) was synthesized and inserted into restriction enzyme BbsI site of vector pUC19_AtU6oligo (obtained from National Research and Development Agency, National Institute of Agrobiological Sciences), thereby constructing recombinant vector D. cDNA sequence of the deltaCOP gene present on chromosome 10 of wild type tomatoes is shown in FIG. 14 and SEQ ID NO:36.

A cassette site containing the guide RNA region was cutout from the constructed recombinant vector C and inserted into restriction enzyme I-SceI site of binary vector pZD_OsU3gYSA_HolgerCas9_NPTII, thereby obtaining recombinant binary vector D. *Agrobacterium* LBA4404 (manufactured and sold by Takara Bio Inc) was transformed with the binary vector D by a standard method to obtain recombinant *Agrobacterium* D.

Example 5

Production of Recombinant *Agrobacterium* E for Introducing Mutation into NSI Gene Guide RNA recognition site was designed in exon 4 (SEQ ID NO:40) of NSI gene (Solyc10g074910) which is said to be present on chromosome 10 of tomatoes. Double stranded DNA corresponding to the designed 20 nucleotide-long site (SEQ ID NO:41:GAGGAATTTGTTCTAGTTGA) was synthesized and inserted into restriction enzyme BbsI site of vector pUC19_AtU6oligo (obtained from National Research and Development Agency, National Institute of Agrobiological Sciences), thereby constructing recombinant vector E. cDNA sequence of the NSI gene present on chromosome 10 of wild type tomatoes is shown in FIG. 15 and SEQ ID NO:39.

A cassette site containing the guide RNA region was cutout from the constructed recombinant vector E and inserted into restriction enzyme I-SceI site of binary vector pZD_OsU3gYSA_HolgerCas9_NPTII, thereby obtaining recombinant binary vector E. *Agrobacterium* LBA4404 (manufactured and sold by Takara Bio Inc) was transformed with the binary vector E by a standard method to obtain recombinant *Agrobacterium* E.

Example 6

Transformation of Tomatoes

A conventional variety Moneymaker and a personal variety S were used for transformation of tomatoes. Transformation of tomatoes using an *Agrobacterium* was performed in accordance with a common textbook (for example, Yataka Tabei ed., "Keishitutenkan Purotokoru <Shokubutu-hen> (Protocols for plant transformation)", Kagaku-Dojin Publishing Company, INC., 2012). Specifically, either sections of cotyledons obtained by germination of tomato seeds in sterile medium, or sterilized sections of cotyledons or leaves obtained by usual seeding were prepared. Next, each of the recombinant agrobacteria A to E obtained in Examples 1 to 5 was cultured individually until the turbidity of the culture liquid reached 0.1 to 1.0, and the sections were immersed in the culture liquid for about 10 minutes, to thereby infect the sections with the agrobacteria.

On day 3 post infection, the agrobacteria were removed. Tomato leaf sections were transferred to Murashige and Skoog medium (may be abbreviated to MS medium) (a medium obtained by adding 3% sucrose, 1.5 mg/L zeatin and 1% agar to MS basic medium) supplemented with carbenicillin (100 to 500 mg/ml) and kanamycin (20 to 100 mg/ml). The leaf sections were subjected to selection culture at 25° C. under light (16 hours light/8 hours dark). Leaf sections were passaged by changing the medium every 10 days to 2 weeks from the start of the culture, thereby promoting the formation of callus from the leaf sections. The passage was continued further to induce the formation of adventitious buds.

When the size of the adventitious buds reached several centimeters, the buds were transferred to a rooting medium (a medium obtained by adding 1.5% sucrose, 1% agar, 50 to 250 mg/ml carbenicillin, 20 to 100 mg/ml kanamycin, and optionally naphthalene acetic acid (NAA), to MS basic medium) and cultured for 1 to 3 months while passaging every month.

All cultures, up to the culture in the rooting medium, were sterile cultures. The rooted plants were taken out from the sterile medium and transferred to a conventional pot soil obtained by mixing black soil, Akadama soil and the like, and cultivated in the pot. The thus obtained reproduced plants were first generation transgenic plants (hereinbelow, sometimes abbreviated to "T0").

Example 7

Selection of Gene Edited Subculture

For confirming the presence or absence of gene recombination and edited site (site with deletion, insertion or replacement of a nucleotide) in the target gene of the first generation transgenic plants, the desired sites were amplified by PCR using the following primers:

```
primer 1
(ATCCATCACCCAAGCAAGTTAATT (SEQ ID NO: 7))
and primer 2
(GTCCACAAAGCTATTTTTTCTCCC (SEQ ID NO: 8))
for the region in the eIF4E gene (Solyc03g005870);

primer 3
(TTAACACGTCTGCGTAACCTC (SEQ ID NO: 9))
and primer 4
(CCGGTGAAGGTATTGTAGTATCC (SEQ ID NO: 10))
for the region in the RLK gene (Solyc02g091840);

primer 7
(CGCATGTCAGCTATGCTAAATG (SEQ ID NO: 42))
and primer 8
(GTAGAGCAAATCCACCAGAACCAT (SEQ ID NO: 43))
for the region in the delta01 gene
(Solyc01g103480);

primer 9
(ATGAAGCGCAAAGCCAGTGAG (SEQ ID NO: 44))
and primer 10
(ATCCACATCAGTGCTTGGTC (SEQ ID NO: 45))
for the region in the delta10 gene
(Solyc10g038120);
and primer 11
(CAGGTTATAGATACACCATCCA (SEQ ID NO: 46))
and
```

-continued

```
primer 12
(TAAATCACCGGAAAGAAAG (SEQ ID NO: 47))
for the region in the NSI gene (Solyc10g074910).
```

Since primer 7 is based on a sequence inside an intron of the delta01 gene, a sequence corresponding to primer 7 is not present in the cDNA sequence as set forth in SEQ ID NO:33.

PCR was performed using "KOD Plus Neo" manufactured and sold by TOYOBO CO., LTD., and DNA was amplified in accordance with the enclosed manual.

Next, the amplified fragments were treated with a restriction enzyme having its cleavage site in the target site of the fragments to confirm whether the amplified fragments are cleaved by the restriction enzyme or not. Specifically, PvuII was used for the eIF4E gene, XbaI was used for the RLK gene, HinfI was used for the delta01 gene, NcoI was used for the delta10 gene, and Bsu36I was used for the NSI gene. Amplified fragments will not be cleaved by the restriction enzyme when the restriction site is changed by recombination and editing of the gene. Occurrence of gene recombination and editing in the target gene was determined based on the non-cleavage of the amplified fragments (data not shown).

As a result, in some of the reproduced plants, editing of a sequence in the eIF4E gene, RLK gene, delta01 gene, delta10 gene, or NSI gene was confirmed and edited lines were selected.

Example 8

Test for Confirming TYLCV Resistance of eIF4E Mutated Tomato

In nature, TYLCV is transmitted by an insect vector which is silverleaf whitefly and, therefore, plants are not infected by a mechanical inoculation using a juice of an infected leaf. Viral infectious clone inoculation method using an *Agrobacterium* was employed for efficiently infecting a plurality of samples with TYLCV. In this method, similarly to the method for gene recombination, an *Agrobacterium* binary vector having the whole TYLCV sequence incorporated therein (infectious clone) is produced, and an *Agrobacterium* is transformed with the produced clone. The resultant recombinant *Agrobacterium* is cultured in a liquid medium. Then, the medium is replaced with 0.01M MES buffer (pH 5.7 and the *Agrobacterium* is inoculated by injection or the like to plant bodies (i.e., tomato in this experiment) at their growing points, relatively young stems, or petioles, so that the cells in the vicinity of the injected parts become infected by the *Agrobacterium*. When the infected *Agrobacterium* introduces TYLCV DNA into the plant genome, the TYLCV DNA introduced into the plant genome is expressed by the NOS promoter and the like designed in the binary vector. As a result, virus is produced and infection is established. Such infectious clone inoculation was used as a mock inoculation because TYLCV in nature also replicates inside the nucleus of a plant cell.

Plants (T0) of eIF4E gene-edited line were grown in an isolated green house and were self-pollinated for collecting seeds. The seeds which are transgenic progeny (T1) are sown and grown. The thus obtained seedlings were inoculated with infectious clone of TYLCV-Israel strain by the above-mentioned test for confirming TYLCV resistance. A wild type variety free of introduced mutation was also tested as a control.

Figure 3B:
Figure 4:
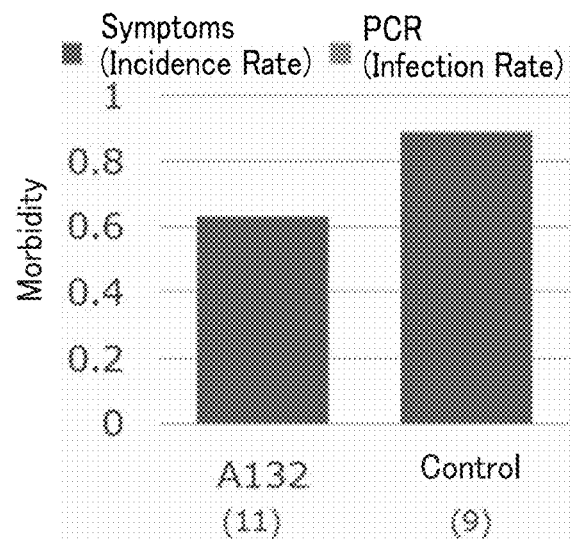
FIG. 4 is a graph showing morbidities for T1 plants of eIF4E gene-edited line A132 and control tomato plants free of introduced mutation, the morbidities being calculated based on presence or absence of symptoms and results of PCR analysis, both on day 25 from TYLCV inoculation, and a number in parentheses under each bar is the number of samples.

As a result, in several plants, such as plant A132-4 which is a T1 plant of the eIF4E gene-edited line, symptoms of virus infections (such as mosaic pattern and yellowing of leaves, fern leaves, dwarfing, necrosis, etc.) were not observed even after 20 days from virus inoculation. FIG. 3 shows A132-4 plant ((a) of the Figure) and a control wild type tomato plant ((b) of the Figure), both on day 42 from virus inoculation. In the control, leaves were deformed by curling downward. Further, the presence or absence of infection symptoms were visually observed on day 25 from the virus infection. Morbidity was defined as a proportion of the number of plants which are defined positive based on symptoms and PCR, relative to the number of tested plants (number of samples). The morbidity of the control was about 0.9 and the morbidity of the eIF4E-edited line A132 was as low as 0.6 (see FIG. 4). The test method used herein is a method with much higher infection pressure than a virus infection in nature by an insect vector. Therefore, the morbidity of 0.6 in the present test is suspected to be a level which causes no virus infection in nature.

Figure 5:
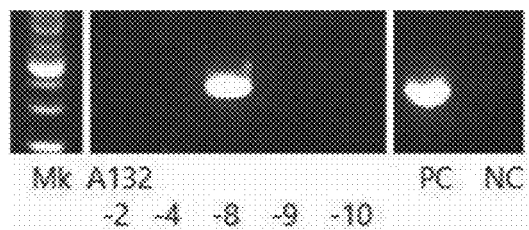
FIG. 5 is a result of PCR analysis of the T1 plants of the eIF4E gene-edited line A132 without any symptoms.

Next, DNA was extracted from leaves of plants without any symptoms and subjected to PCR analysis using TYLCV detection primer 5 (CCCTCTGGAATGAAGGAACA, SEQ ID NO:11) and primer 6 (TTGAAAAATTGGRCTCTCAA, SEQ ID NO:12). As a result, the virus was detected by PCR from one plant (A132-8) of the eIF4E-edited line without any symptoms. However, no virus was detected from the remaining tested plants (eIF4E-edited lines A132-2, A132-4, A132-9 and A132-10) (see FIG. 5).

Figure 6:
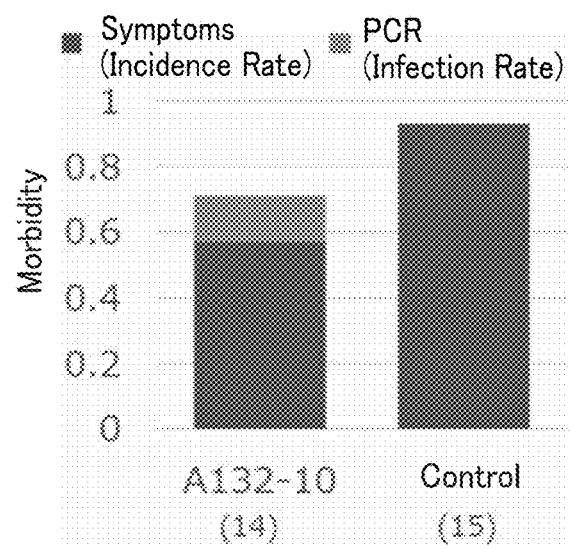
FIG. 6 is a graph showing morbidities for T2 plants of eIF4E gene-edited line A132-10 and control tomato plants free of introduced mutation, the morbidities being calculated based on presence or absence of symptoms and results of PCR analysis, both on day 22 from the virus inoculation, and a number in parentheses under each bar is the number of samples.

In addition, seeds were collected from the plant A132-10 which is a T1 generation plant of the eIF4E-edited line showing virus resistance. The seeds were sown and grown. The thus obtained seedlings (corresponding to the T2 generation) were inoculated with infectious TYLCV clone. S8 plants before the introduction of mutation were used as controls. The morbidity was determined on day 22 from the virus infection based on the presence or absence of symptoms. There was a clear difference in morbidity between the control and the gene edited line such that the morbidity of the control was 0.9 or more, while that of the eIF4E-edited line A132-10 was less than 0.6. When DNA was extracted from leaves of plants without any symptoms and subjected to PCR analysis in the above-mentioned manner, virus was detected from one plant without any symptoms. The number of plants in which virus infection has been confirmed by PCR and the number of plants in which symptoms have been confirmed by visual inspection were summed together, and the proportion of this sum to the number of samples were calculated as morbidity after the PCR analysis. The morbidity for eIF4E-edited line became about 0.7, but this value is much lower than that of the control (see FIG. 6). These results confirmed that TYLCV resistance is being inherited by the mutation introduced into the eIF4E gene.

Example 9

Test for Confirming TYLCV Resistance of RLK Mutated Tomato

Plants (T0) of RLK gene-edited line selected in Example 7 were grown in an isolated green house and were self-pollinated for collecting seeds in the same manner as in Example 8. The seeds which are transgenic progeny (T1) are sown and grown. The thus obtained seedlings were inoculated with infectious clone of TYLCV-Israel strain as in Example 8.

Figure 7A:
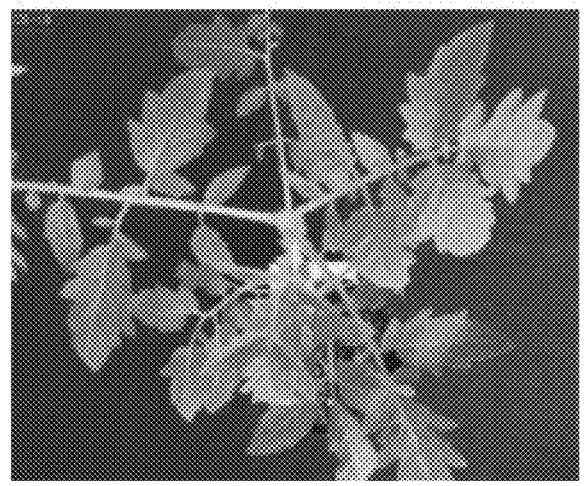
FIG. 7A to FIG. 7C show T1 plants of the RLK gene-edited line C6 without any symptoms of TYLCV infection (in FIG. 7A and FIG. 7B), and a control tomato plant free of introduced mutation and showing the symptoms of TYLCV infection (in FIG. 7C), both on day 25 from TYLCV inoculation.
Figure 7B:
Figure 7C:
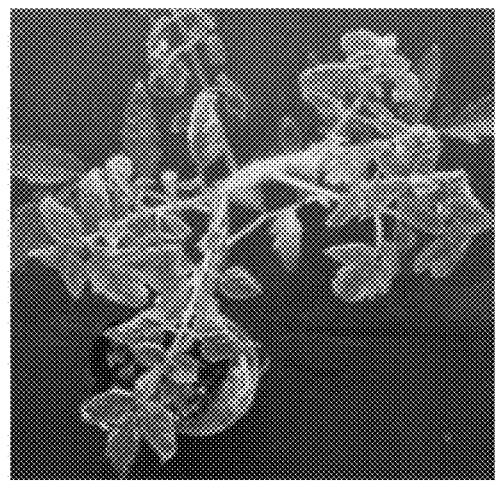
Figure 8:
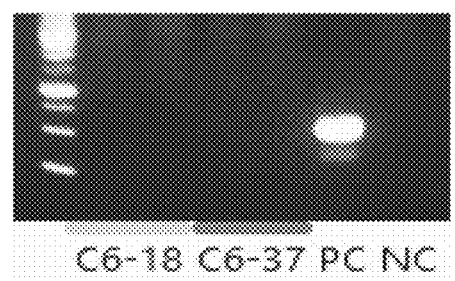
FIG. 8 is a result of PCR analysis of the T1 plants of the RLK gene-edited line C6 without any symptoms.

As a result, regarding the RLK gene-edited line, 3 plants among 41 plants being inoculated with the virus showed no symptoms on day 25 post inoculation. On the other hand, regarding the control, all 42 virus inoculated plants showed symptoms. FIGS. 7A-FIG. 7C show plants C6-18 (FIG. 7A) and C6-37 (FIG. 7B), and control tomato free of introduction of mutation (FIG. 7C) on day 35 post virus inoculation. In the control, leaves are deformed by curling downward. Next, DNA was extracted from leaves of plants C6-18 and C6-37 without any symptoms and subjected to PCR analysis using the TYLCV detection primers. No viruses were detected from these plants (see FIG. 8).

Figure 9:
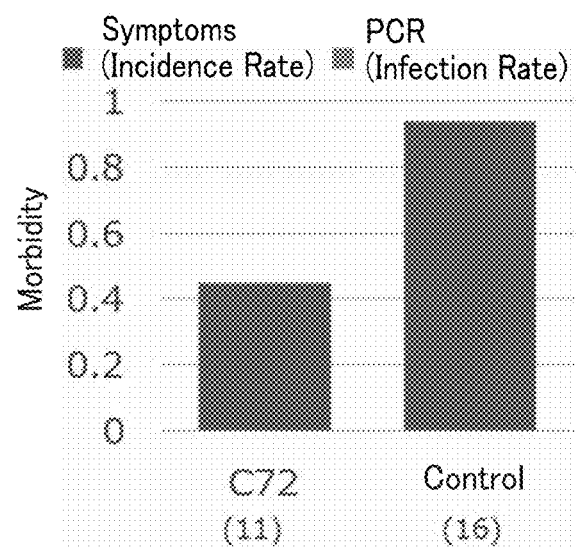
FIG. 9 is a graph showing morbidities for T1 plants of RLK gene-edited line C72 and control tomato plants free of introduced mutation, the morbidities being calculated based on presence or absence of symptoms and results of PCR analysis, both on day 28 from TYLCV inoculation, and a number in parentheses under each bar is the number of samples.

Further, transgenic progenies (T1) of plant C72, which is another RLK gene-edited line, were also subjected to the above-mentioned tests for confirming TYLCV resistance. As a result, the morbidity determined based on the presence or absence of symptoms on day 25 post virus infection was about 0.9 for the control and as low as about 0.4 for the RLK-edited line. No virus was detected when the presence or absence of viruses was tested by PCR analysis of leaves without any symptoms (see FIG. 9).

Figure 10:
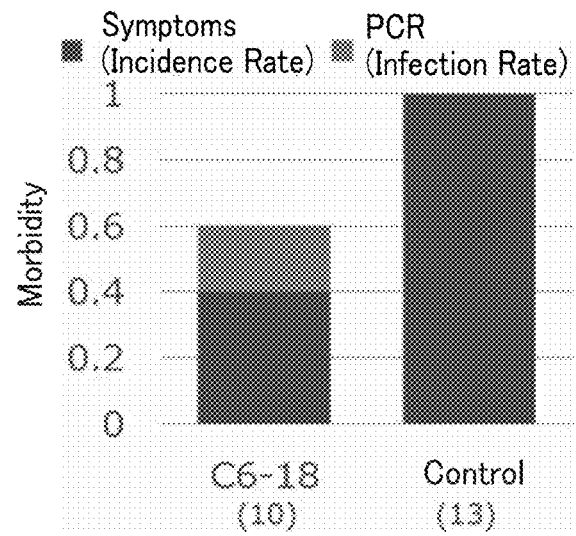
FIG. 10 is a graph showing morbidities for T2 plants of RLK gene-edited line C6-18 and control tomato plants free of introduced mutation, the morbidities being calculated based on presence or absence of symptoms and results of PCR analysis, both on day 22 from the virus inoculation, and a number in parentheses under each bar is the number of samples.

In addition, seeds were collected from the plant C6-18 which is a T1 generation plant of the RLK-edited line showing the resistance. The seeds were sown and grown. The thus obtained seedlings (corresponding to the T2 generation) were inoculated with infectious TYLCV clone. A clear difference in morbidity between the control and the gene edited line was observed on day 22 from the virus infection, and the results confirmed that TYLCV resistance is inherited by the mutation introduced into the RLK gene (FIG. 10). Determination of morbidity was performed twice and similar results were obtained in both determination.

Example 10

Test for Confirming TYLCV Resistance of delta01 Mutated Tomato

Plants (T0) of delta01 gene-edited line selected in Example 7 were grown in an isolated green house and were self-pollinated for collecting seeds in the same manner as in Example 8. The seeds which are transgenic progeny (T1) are sown and grown. The thus obtained seedlings were inoculated with infectious clone of TYLCV-Israel strain as in Example 8.

Figure 16:
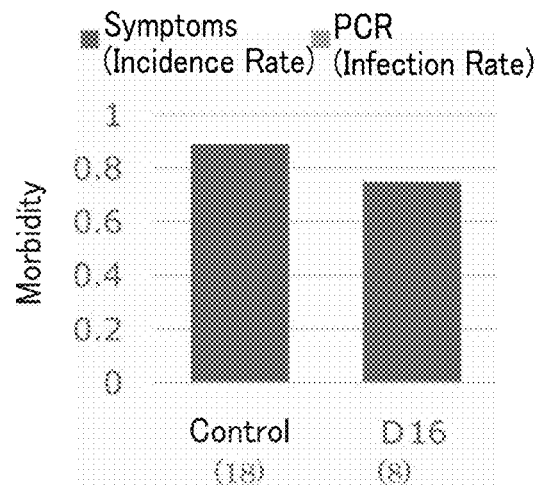
FIG. 16 is a graph showing morbidities for T1 plants of deltaCOP gene-edited line D16 (the deltaCOP gene present on tomato chromosome 1) and control tomato plants free of introduced mutation, the morbidities being calculated based on presence or absence of symptoms and results of PCR analysis, both on day 21 from TYLCV inoculation, and a number in parentheses under each bar is the number of samples.

A transgenic progeny (T1) of delta01 gene-edited line D16 was tested by the above-mentioned test for confirming TYLCV resistance. As a result, the morbidity determined based on the presence or absence of symptoms on day 21 post virus infection was about 0.9 for the control and lower, namely about 0.75, for the gene-edited line D16. Further, no virus was detected when the presence or absence of viruses was tested by PCR analysis of leaves without any symptoms (see FIG. 16).

Example 11

Test for Confirming TYLCV Resistance of delta10 Mutated Tomato

Plants (T0) of delta10 gene-edited line selected in Example 7 were grown in an isolated green house and were self-pollinated for collecting seeds in the same manner as in Example 8. The seeds which are transgenic progeny (T1) are sown and grown. The thus obtained seedlings were inoculated with infectious clone of TYLCV-Israel strain as in Example 8.

Figure 17:
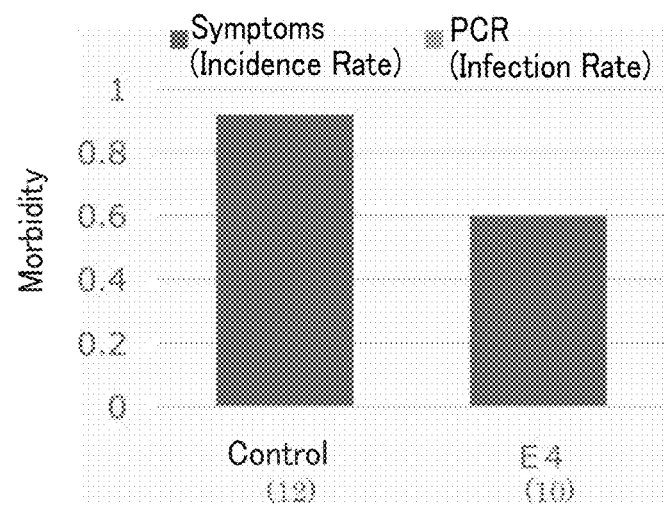
FIG. 17 is a graph showing morbidities for T1 plants of deltaCOP gene-edited line E4 (the deltaCOP gene present on tomato chromosome 10) and control tomato plants free of introduced mutation, the morbidities being calculated based on presence or absence of symptoms and results of PCR analysis, both on day 21 from TYLCV inoculation, and a number in parentheses under each bar is the number of samples.

A transgenic progeny (T1) of delta10 gene-edited line E4 was tested by the above-mentioned test for confirming TYLCV resistance. As a result, the morbidity determined based on the presence or absence of symptoms on day 21 post virus infection was about 0.9 for the control and was significantly lower, namely about 0.6, for the gene-edited line E4. Further, no virus was detected when the presence or absence of viruses was tested by PCR analysis of leaves without any symptoms (see FIG. 17).

Example 12

Test for Confirming TYLCV Resistance of NSI Mutated Tomato

Plants (T0) of NSI gene-edited line selected in Example 7 were grown in an isolated green house and were self-pollinated for collecting seeds in the same manner as in Example 8. The seeds which are transgenic progeny (T1) are sown and grown. The thus obtained seedlings were inoculated with infectious clone of TYLCV-Israel strain as in Example 8.

Figure 18:
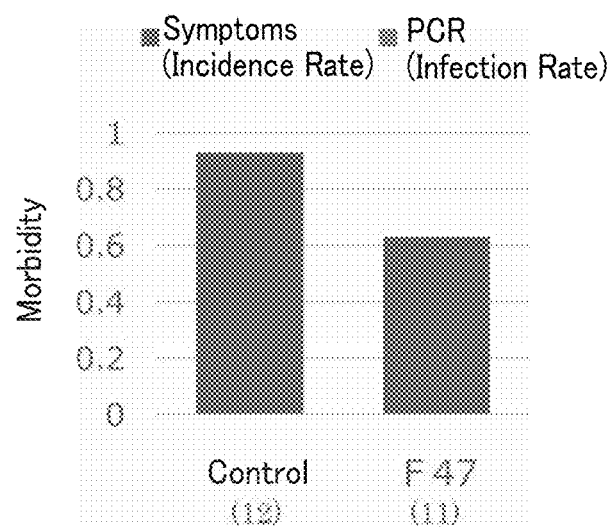
FIG. 18 is a graph showing morbidities for T1 plants of NSI gene-edited line F43 and control tomato plants free of introduced mutation, the morbidities being calculated based on presence or absence of symptoms and results of PCR analysis, both on day 21 from TYLCV inoculation, and a number in parentheses under each bar is the number of samples.

A transgenic progeny (T1) of NSI gene-edited line F43 was tested by the above-mentioned test for confirming TYLCV resistance. As a result, the morbidity determined based on the presence or absence of symptoms on day 21 post virus infection was about 0.9 for the control and was significantly lower, namely about 0.6, for the gene-edited line F43. Further, no virus was detected when the presence or absence of viruses was tested by PCR analysis of leaves without any symptoms (see FIG. 18).

Example 13

Sequencing of TYLCV Resistance eIF4E Gene

A region around the eIF4E edited site (i.e., a region starting from the vicinity of the 14th nucleotide to the 3' region of exon 2 (SEQ ID NO:2) of the eIF4E gene on chromosome 3) of a TYLCV resistance T1 plant was amplified by PCR (T100 thermocycler, manufactured and sold by Bio-Rad laboratories Inc.) using the above-mentioned primer 1 and primer 2. The amplified fragments were cloned for determining the nucleotide sequence.

As a result, deletion, insertion or replacement of several nucleotides in the same region were confirmed. Six mutated sequences found in the eIF4E gene are shown in FIG. 11, together with the wild type nucleotide sequence as set forth in SEQ ID NO:3.

Example 14

Sequencing of TYLCV Resistance RLK Gene

A region around the RLK edited site (i.e., a region starting from the vicinity of the 631st nucleotide to the 3' region of exon 1 (SEQ ID NO:5) of the RLK gene on chromosome 2) of a TYLCV resistance T1 plant was amplified by PCR (T100 thermocycler, manufactured and sold by Bio-Rad laboratories Inc.) using the above-mentioned primer 3 and primer 4. The amplified fragments were cloned for determining the nucleotide sequence.

As a result, deletion of several nucleotides in the same region was confirmed. Two mutated sequences found in the RLK gene are shown in FIG. 12, together with the wild type nucleotide sequence as set forth in SEQ ID NO:6.

Example 15

Sequencing of TYLCV Resistance delta01 Gene

A region around the delta01 edited site in exon 6 of a TYLCV resistance T0 plant was amplified by PCR (T100 thermocycler, manufactured and sold by Bio-Rad laboratories Inc.) using the above-mentioned primer 7 (SEQ ID NO:42) and primer 8 (SEQ ID NO:43). The amplified fragments were cloned for determining the nucleotide sequence.

As a result, deletion and replacement of several nucleotides in the same region were confirmed. Three mutated sequences found in the delta01 gene are shown in FIG. 19(A), together with the wild type nucleotide sequence as set forth in SEQ ID NO:35.

Example 16

Sequencing of TYLCV Resistance delta10 Gene

A region around the delta10 edited site in exon 2 of a TYLCV resistance T0 plant was amplified by PCR (T100 thermocycler, manufactured and sold by Bio-Rad laboratories Inc.) using the above-mentioned primer 9 (SEQ ID NO:44) and primer 10 (SEQ ID NO:45). The amplified fragments were cloned for determining the nucleotide sequence.

As a result, deletion of several nucleotides in the same region was confirmed. Two mutated sequences found in the delta10 gene are shown in FIG. 19(B), together with the wild type nucleotide sequence as set forth in SEQ ID NO:38.

Example 17

Sequencing of TYLCV Resistance NSI Gene

A region around the NSI edited site in exon 4 of a TYLCV resistance T1 plant was amplified by PCR (T100 thermocycler, manufactured and sold by Bio-Rad laboratories Inc.) using the above-mentioned primer 11 (SEQ ID NO:46) and primer 12 (SEQ ID NO:47). The amplified fragments were cloned for determining the nucleotide sequence.

As a result, deletion and insertion of several nucleotides in the same region were confirmed. Two mutated sequences found in the NSI gene are shown in FIG. 20, together with the wild type nucleotide sequence as set forth in SEQ ID NO:41.

Example 18

Production of Tomato Transformant Having TYLCV Resistance eIF4E Gene and TYLCV Resistance RLK Gene A first generation transgenic plant is obtained by transfecting a tomato with an *Agrobacterium* by the method described in Example 6. The *Agrobacterium* used may be either a combination of the recombinant *Agrobacterium* A obtained in Example 1 and the recombinant *Agrobacterium* B obtained in Example 2; or *Agrobacterium* F obtained by linking the guide RNA recognition sites of Examples 1 and 2, preparing binary vector F by inserting the linked guide RNA recognition sites into a binary vector, and recombining an *Agrobacterium* with the binary vector F.

Next, presence or absence of gene recombination and editing (deletion, insertion or replacement of a nucleotide) in the target gene of the first generation transgenic plant, that is both the eIF4E gene and RLK gene, is confirmed in the same manner as described in Example 7. Edited line having mutations in both genes is selected.

The selected edited line is subjected to the test for confirming TYLCV resistance in the same manner as described in Examples 8 and 9. Production of tomato plant having the gene recombination and editing (deletion, insertion or replacement of a nucleotide) in both the eIF4E gene and RLK gene, and acquiring TYLCV resistance may be confirmed by this test.

This application is an application claiming priority based on Japanese Patent Application No. 2018-222289 filed on Nov. 28, 2018 and Japanese Patent Application No. 2019-095150 filed on May 21, 2019, and the contents described in the claims, description and drawings of the above-mentioned applications are incorporated into the present application.

INDUSTRIAL APPLICABILITY

According to the present invention, there is provided a virus resistant solanaceous plant, a solanaceous plant cell, and a method for producing the solanaceous plant, and the solanaceous plant has inhibitory properties against: infection by a virus of genus *Begomovirus* causing tomato yellow leaf curl symptoms, proliferation of the infected virus, and/or expression of infection symptoms. The present invention is capable of solving problems mainly in agricultural fields, such as decrease in solanaceous plant yield caused by infection of the above-mentioned virus

SEQUENCE LISTING FREE TEXT

SEQ ID NO:1: cDNA sequence of eIF4E gene (Solyc03g005870), 317th to 482nd nucleotides are exon 2, and 451st to 470th nucleotides are target sequence.

SEQ ID NO:2: Exon 2 of eIF4E gene, and 135th to 154th nucleotides are target sequence.

SEQ ID NO:3: Target sequence in exon 2 of eIF4E gene

SEQ ID NO:4: cDNA sequence of RLK gene (Solyc02g091840), 1st to 2818th nucleotides are exon 1, 790th to 809th nucleotides are target sequence.

SEQ ID NO:5: Exon 1 of RLK gene, and 790th to 809th nucleotides are target sequence.

SEQ ID NO:6: Target sequence in exon 1 of RLK gene
SEQ ID NO:7: primer 1 for detecting eIF4E gene
SEQ ID NO:8: primer 2 for detecting eIF4E genei
SEQ ID NO:9: primer 3 for detecting RLK gene
SEQ ID NO:10: primer 4 for detecting RLK gene
SEQ ID NO:11: primer 5 for detecting TYLCV
SEQ ID NO:12: primer 6 for detecting TYLCV
SEQ ID NO:13: mutated region I1 of eIF4E gene
SEQ ID NO:14: mutated region I2 of eIF4E gene
SEQ ID NO:15: mutated region I3 of eIF4E gene
SEQ ID NO:16: mutated region I4 of eIF4E gene
SEQ ID NO:17: mutated region I5 of eIF4E gene
SEQ ID NO:18: mutated region I6 of eIF4E gene
SEQ ID NO:19: mutated region R1 of RLK gene
SEQ ID NO:20: mutated region R2 of RLK gene
SEQ ID NO:21: mutated region R3 of RLK gene
SEQ ID NO:22: mutated region R4 of RLK gene SEQ ID NO:23: cDNA sequence of mutated eIF4E gene, and 451st to 471st nucleotides are mutated region I1.

SEQ ID NO:24: cDNA sequence of mutated eIF4E gene, and 451st to 467th nucleotides are mutated region I2.

SEQ ID NO:25: cDNA sequence of mutated eIF4E gene, and 451st to 467th nucleotides are mutated region I3.

SEQ ID NO:26: cDNA sequence of mutated eIF4E gene, and 451st to 467th nucleotides are mutated region I4.

SEQ ID NO:27: cDNA sequence of mutated eIF4E gene, and 451st to 461st nucleotides are mutated region I5.

SEQ ID NO:28: cDNA sequence of mutated eIF4E gene, and 451st to 467th nucleotides are mutated region I6.

SEQ ID NO:29: cDNA sequence of mutated RLK gene, and 790th to 804th nucleotides are mutated region R1.

SEQ ID NO:30: cDNA sequence of mutated RLK gene, and 790th to 802nd nucleotides are mutated region R2.

SEQ ID NO:31: cDNA sequence of mutated RLK gene, and 790th to 810th nucleotides are mutated region R3.

SEQ ID NO:32: cDNA sequence of mutated RLK gene, and 790th to 804th nucleotides are mutated region R4.

SEQ ID NO:33: deltaCOP gene present in chromosome 1 (delta01 gene) (Solyc01g103480), 402nd to 572nd nucleotides are exon 6, and 471st to 490th nucleotides are target sequence.

SEQ ID NO:34: Exon 6 of delta01 gene, and 70th to 89th nucleotides are target sequence.

SEQ ID NO:35: Target sequence in exon 6 of delta01 gene

SEQ ID NO:36: deltaCOP gene present in chromosome10 (delta10 gene) (Solyc10g038120), 106th to 274th nucleotides are exon 2, and 136th to 155th nucleotides are target sequence.

SEQ ID NO:37: Exon 2 of delta10 gene, and 31st to 50th nucleotides are target sequence.

SEQ ID NO:38: Target sequence in exon 2 of delta01 gene

SEQ ID NO:39: cDNA sequence of NSI gene (Solyc10g074910), 209th to 393rd nucleotides are exon 4, and 283rd to 302nd nucleotides are target sequence.

SEQ ID NO:40: Exon 4 of NSI gene, and 74th to 93rd nucleotides are target sequence.

SEQ ID NO:41: Target sequence in Exon 4 of NSI gene
SEQ ID NO:42: primer 7 for detecting delta01 gene
SEQ ID NO:43: primer 8 for detecting delta01 gene
SEQ ID NO:44: primer 9 for detecting delta10 gene
SEQ ID NO:45: primer 10 for detecting delta10 gene
SEQ ID NO:46: primer 11 for detecting NSI gene
SEQ ID NO:47: primer 12 for detecting NSI gene
SEQ ID NO:48: mutated region D011 of delta01 gene
SEQ ID NO:49: mutated region D012 of delta01 gene
SEQ ID NO:50: mutated region D013 of delta01 gene
SEQ ID NO:51: mutated region D101 of delta10 gene
SEQ ID NO:52: mutated region D102 of delta10 gene
SEQ ID NO:53: mutated region N1 of NSI gene
SEQ ID NO:54: mutated region N2 of NSI gene SEQ ID NO:55: cDNA sequence of a mutated delta01 gene, and the 471st to 488th nucleotides are the mutated region D011.

SEQ ID NO:56: cDNA sequence of a mutated delta01 gene, and the 470th to 487th nucleotides are the mutated region D012.

SEQ ID NO:57: cDNA sequence of a mutated delta01 gene, and the 470th to 484th nucleotides are the mutated region D013.

SEQ ID NO:58: cDNA sequence of a mutated delta10 gene, and the 135th to 154th nucleotides are the mutated region D101.

SEQ ID NO:59: cDNA sequence of a mutated delta10 gene, and the 135th to 151st nucleotides are the mutated regionD102.

SEQ ID NO:60: cDNA sequence of a mutated NSI gene, and the 283rd to 303rd nucleotides are the mutated region N1.

SEQ ID NO:61: cDNA sequence of a mutated NSI gene, and the 283rd to 293rd nucleotides are the mutated region N2.

The invention claimed is:

1. A tomato plant having a mutation in at least one gene selected from the group consisting of a translation initiation factor eIF4E gene comprising SEQ ID NO:1 and a receptor-like kinase RLK gene comprising SEQ ID NO: 4,
   wherein the mutation in the eIF4E gene is in a region represented by SEQ ID NO:3, and the region represented by SEQ ID NO:3 is mutated to the nucleotide sequence selected from any one of SEQ ID NOs:13 to 18, and
   wherein the mutation in the RLK gene is in a region represented by SEQ ID NO:6, and the region represented by SEQ ID NO:6 is mutated to the nucleotide sequence selected from any one of SEQ ID NOs:19 to 22,
   wherein the mutation inhibits expression of the mutated gene or the mutation makes a protein encoded by the mutated gene to be non-functional for tomato yellow leaf curl virus, and wherein the protein which is non-functional for the virus is either a protein which cannot be used by the virus during infection and replication, or a protein which reduces the infection and replication of the virus, and
   wherein the tomato plant has virus resistance against the virus.

2. The tomato plant according to claim 1, wherein the mutation is a genomic gene mutation introduced by genome editing techniques.

3. The tomato plant according to claim 1, wherein the mutation is at least one type of mutation selected from:
   (a) a loss of continuous or non-continuous 3n nucleotides (wherein n=1 to 7), and
   (b) a replacement, deletion, addition, and/or insertion of 1 or more nucleotides.

4. A part of the tomato plant according to claim 1.

* * * * *

SEQUENCE LISTING

<160> NUMBER OF SEQ ID NOS: 61

<210> SEQ ID NO 1
<211> LENGTH: 916
<212> TYPE: DNA
<213> ORGANISM: Solanum lycopersicum
<220> FEATURE:
<221> NAME/KEY: misc_feature
<222> LOCATION: (1)..(916)
<223> OTHER INFORMATION: cDNA sequence of eIF4E gene
<220> FEATURE:
<221> NAME/KEY: misc_feature
<222> LOCATION: (317)..(482)
<223> OTHER INFORMATION: Exon 2
<220> FEATURE:
<221> NAME/KEY: misc_feature
<222> LOCATION: (451)..(470)
<223> OTHER INFORMATION: Target sequence

<400> SEQUENCE: 1

```
agtgctccac agtccacaga gcagcaaaaa tggcagcagc tgaaatggag agaacgatgt      60
cgtttgatgc agctgagaag ttgaaggccg ccgatggagg aggaggagag gtagacgatg     120
aacttgaaga aggtgaaatt gttgaagaat caaatgatac ggcatcgtat ttagggaaag     180
aaatcacagt gaagcatcca ttggagcatt catggacttt tggtttgat aaccctacca      240 ctaaatctcg acaaactgct tggggaagct cacttcgaaa tgtctacact ttctccactg     300
ttgaagattt ttggggtgct acaataata tccatcaccc aagcaagtta attatgggag      360
cagactttca ttgttttaag cacaaaattg agccaaagtg ggaagatcct gtatgtgcca     420
atggagggac gtggaaaatg agttttcga agggtaaatc tgataccagc tggctgtata     480
cgctgctggc aatgattgga catcaattcg atcatggaga tgaaatttgt ggagcagttg     540
ttagtgtccg ggctaaggga gaaaaaatag ctttgtggac caagaatgct gcaaatgaaa     600
cagctcaggt tagcattggt aagcaatgga agcagtttct agattacagt gattcggttg     660
gcttcatatt tcacgacgat gcaaagaggc tcgacagaaa tgccaagaat cgttacaccg     720
tatagttctt gatgcagtgt gggattgcaa gaaacacaat tcgtactgga aaggttggta     780
ggtactagtt tagtttctca tttgataagc ttctggtttg agtaactcgt gtgttggtgt     840
ttacactttc taatcgtgga aaattgtttg atttgaatcc atgcctctat gtttcgtcac     900
ataacaaaac acaaat                                                     916
```

<210> SEQ ID NO 2
<211> LENGTH: 166
<212> TYPE: DNA
<213> ORGANISM: Solanum lycopersicum
<220> FEATURE:
<221> NAME/KEY: misc_feature
<222> LOCATION: (1)..(166)
<223> OTHER INFORMATION: Exon 2 of eIF4E gene
<220> FEATURE:
<221> NAME/KEY: misc_feature
<222> LOCATION: (135)..(154)
<223> OTHER INFORMATION: Target sequence

<400> SEQUENCE: 2

```
tgcttacaat aatatccatc acccaagcaa gttaattatg ggagcagact ttcattgttt      60
taagcacaaa attgagccaa agtgggaaga tcctgtatgt gccaatggag ggacgtggaa     120
aatgagtttt tcgaagggta atctgatac cagctggctg tatacg                     166
```

<210> SEQ ID NO 3
<211> LENGTH: 20
<212> TYPE: DNA
<213> ORGANISM: Solanum lycopersicum
<220> FEATURE:
<221> NAME/KEY: misc_feature
<222> LOCATION: (1)..(20)
<223> OTHER INFORMATION: Target sequence in exon 2 of eIF4E gene

<400> SEQUENCE: 3
agggtaaatc tgataccagc                                                20

<210> SEQ ID NO 4
<211> LENGTH: 3516
<212> TYPE: DNA
<213> ORGANISM: Solanum lycopersicum
<220> FEATURE:
<221> NAME/KEY: misc_feature
<222> LOCATION: (1)..(3516)
<223> OTHER INFORMATION: cDNA sequence of RLK gene
<220> FEATURE:
<221> NAME/KEY: misc_feature
<222> LOCATION: (1)..(2818)
<223> OTHER INFORMATION: Exon 1
<220> FEATURE:
<221> NAME/KEY: misc_feature
<222> LOCATION: (790)..(809)
<223> OTHER INFORMATION: Target sequence

<400> SEQUENCE: 4
gttacaaaaa agagttgggg cctcctctac ttgtacaatc tcacaattca aattttattt      60
ctttataata atcaatccct tcgtattata tttatttact caaaacaaaa gaatatacac     120
accaaacgga ttacccaccc tcaaaccaaa tcctcatttt tgcctttctc actctaactg     180
agtgaaactg caaaccaaac agtaggtggg cgttagatta acgaagcaaa aatgcgtctt     240
cttttttttc ttcttcttct tatgcatttt actgactttt ctgccggtaa acaaccacgc     300
ttaccggaat accaggcttt gcttgccctg aaaactgcca ttaccgatga cccgcagtta     360
actcttgcct catggaacat ctccaccagt cactgtacgt ggaatggtgt cacgtgcgac     420
acgcatcgtc acgtgacctc tcttgatatt tctgggttta atcttaccgg tactcttccg     480
ccggaagttg gaaatcttcg tttcttacaa aatttgtctg ttgctgttaa ccagtttact     540
ggacctgtac ctgttgaaat ctcctttatt ccaaatctga gttaccttaa tctttctaat     600
aacatattcg ggatggaatt cccttcgcag ttaacacgtc tgcgtaacct ccaagtcctt     660
gacctttaca caacaatat gaccggtgaa cttcccgttg aggtgtatca gatgactaaa     720
cttcgacatc tacacctagg cgggaacttt ttcagtggcc gcattcctcc ggagtatgga     780
agattcccgt tctagagta ccttgcagtt tcaggcaatg cattggtagg agagatacca     840
ccggagattg gaaacatcgc tacacttcag cagttgtatg taggatacta aataccttc     900 accggtggga ttccaccggc aatagggaac ttatcgcagc ccttcggtt tgatgctgct     960 aactgtggac tttcggggaa gattccaccg gagattggga agcttcagaa ccttgatacc    1020
ctcttcctgc aagtgaattc tctatctgga tctttaactc cggagatagg ttatctgaag    1080
agcttgaaat ctttggatct gtcgaataac atgttctctg gcgagatacc gccgacattt    1140
gcggagctta agaatatcac tcttgttaat cttttccgga ataagcttta tgggtcaata    1200
ccagagttca tagaggactt gccggaacta gaggtgttgc aactttggga aaataacttt    1260
actggaagca ttcctcaggg gttaggcaca aagagcaagc tcaaaactct tgatctcagt    1320
tccaataaat taacgggaaa tttacccca aacatgtgct ccggtaacaa tctgcagaca    1380

```
attatcactc tagggaactt cttgtttggc ccaattcctg aatctttggg taggtgtgaa    1440
tcacttaatc gtattagaat gggagaaaat tatctgaatg ggtctattcc aaaagggctc    1500
ttaagcttgc cacatctgtc acaagttgaa cttcagaata atattctcac tggtacattt    1560
cctgatattt cttccaaatc taacagtctt ggccagatta tcctttcaaa taatcgctta    1620
actggacctt tgccaccaag cattggaaac tttgctgtag cccaaaaatt gcttcttgat    1680
gggaacaaat tttcgggacg aattccagct gaaataggaa agcttcaaca gctatccaaa    1740
attgatttca gtcataacaa cttgtctgga cccattgctc cggagattag ccagtgcaag    1800
ttgctgactt atgttgatct cagcaggaac caactttcgg gtgagattcc tactgagatc    1860
acaggtatga gaatactcaa ctacttgaat ttatcgcgaa accacttagt tgggagtatt    1920
cctgccccta tttctagtat gcagagttta acttctgttg atttctcgta taacaacttt    1980
tctggtttag ttcctggaac cgggcaattt agttatttca attcacctc atttctaggc    2040 aatccagatc tttgcggacc ctatttgggc ccttgcaaag agggcgttgt tgatggggtt    2100
agtcaacctc accaacgagg agccttaacg ccttcgatga agcttttact tgttataggt    2160
ttgcttgtct gttctattgt gtttgctgtt gctgcaatta taaaggcccg atctttaaag    2220
aaggcaagtg aagctcgtgc ctggaagcta actgcttttc agcgcctgga ttttacttgt    2280
gatgatattt tggatagctt gaaggaggat aacgttattg gaaaaggagg tgctggtatt    2340
gtctacaagg gggtaatgcc tagcggggaa catgtagcgg ttaagaggtt gccagctatg    2400
agcaggggtt cctctcatga tcatgggttc aatgcagaga tacagactct tgggaggatc    2460
cgacacaggc acattgttag attattaggg ttttgctcga atcatgagac aaatcttttg    2520
gtttacgagt acatgcctaa tggaagtctt ggggaaatgc ttcatggcaa gaaaggcggt    2580
catttacatt gggataccag gtataagatt gccttggagt ctgctaaggg tctttgctat    2640
ctccatcacg attgctctcc tttgatcctc catcgtgatg tgaaatcaaa caacattctg    2700
ctggactcca gctttgaagc tcatgttgct gattttggac ttgctaagtt cttgcaagat    2760
tcagggacat cagaatgcat gtctgctatt gctggttctt atgggtacat tgctccagaa    2820
tatgcttaca cacttaaggt tgatgagaag agtgatgtat atagcttcgg tgtggtgcta    2880
ctagaactgg taagtggcaa aaaaccagtt ggagaatttg gtgatggtgt tgacatagtc    2940
caatgggtta ggaaaatgac tgatgggaaa aaggatggag ttctcaagat ccttgaccca    3000
agactctcaa cggttcccct taatgaggtg atgcatgtct tctatgtcgc attgttgtgt    3060
gtcgaagagc aggctgtgga acgtcccacc atgcgagagg tagtgcaaat actaacggaa    3120
cttcccaagc caccaggtgc aaaatcagat gactcaaccg tcactgatca gtcgcccca    3180 tcagcctctg cattagagtc cccaacctca attcccgggg acacaaaaga ccatcatcaa    3240
ccaacacctc aatcacctcc acctgaccta ctcagtatct aatttgcaat gttcttgaag    3300
taggagtgtt ttatttagtt tgattctcta gttctattat gatcaattgt gctaagcttt    3360
attcctttgt tttaaaaaaa ttgggtcttt ctaggctcgg gggtttattc taactctaag    3420
atgggtttaa tgctcagaag ttttcctctt gtacagtaag attggtaggg ttttcaagtg    3480
tattattaaa tggaaaaaaa ttgcccttca tttgct                              3516
```

<210> SEQ ID NO 5
<211> LENGTH: 2818
<212> TYPE: DNA
<213> ORGANISM: Solanum lycopersicum
<220> FEATURE:

<221> NAME/KEY: misc_feature
<222> LOCATION: (1)..(2818)
<223> OTHER INFORMATION: Exon 1 of RLK gene
<220> FEATURE:
<221> NAME/KEY: misc_feature
<222> LOCATION: (790)..(809)
<223> OTHER INFORMATION: Target sequence

<400> SEQUENCE: 5

```
gttacaaaaa agagttgggg cctcctctac ttgtacaatc tcacaattca aattttattt      60
ctttataata atcaatccct tcgtattata tttatttact caaaacaaaa gaatatacac     120
accaaacgga ttacccaccc tcaaaccaaa tcctcatttt tgcctttctc actctaactg     180
agtgaaactg caaaccaaac agtaggtggg cgttagatta acgaagcaaa aatgcgtctt     240
cttttttttc ttcttcttct tatgcatttt actgactttt ctgccggtaa acaaccacgc     300
ttaccggaat accaggcttt gcttgccctg aaaactgcca ttaccgatga cccgcagtta     360
actcttgcct catggaacat ctccaccagt cactgtacgt ggaatggtgt cacgtgcgac     420
acgcatcgtc acgtgacctc tcttgatatt tctgggttta atcttaccgg tactcttccg     480
ccggaagttg gaaatcttcg tttcttacaa aatttgtctg ttgctgttaa ccagtttact     540
ggacctgtac ctgttgaaat ctcctttatt ccaaatctga gttaccttaa tctttctaat     600
aacatattcg ggatggaatt cccttcgcag ttaacgtcc tgcgtaacct ccaagtcctt      660
gacctttaca acaacaatat gaccggtgaa cttcccgttg aggtgtatca gatgactaaa     720
cttcgacatc tacacctagg cgggaacttt ttcagtggcc gcattcctcc ggagtatgga     780
agattcccgt tctagagta ccttgcagtt tcaggcaatg cattggtagg agagatacca      840
ccggagattg gaaacatcgc tacacttcag cagttgtatg taggatacta caataccttc     900
accggtggga ttccaccggc aatagggaac ttatcgcagc tccttcggtt tgatgctgct     960
aactgtggac tttcggggaa gattccaccg gagattggga agcttcagaa ccttgatacc    1020
ctcttcctgc aagtgaattc tctatctgga tctttaactc cggagatagg ttatctgaag    1080
agcttgaaat ctttggatct gtcgaataac atgttctctg gcgagatacc gccgacattt    1140
gcggagctta agaatatcac tcttgttaat cttttccgga ataagcttta tgggtcaata    1200
ccagagttca tagaggactt gccggaacta gaggtgttgc aactttggga aaataacttt    1260
actggaagca ttcctcaggg gttaggcaca aagagcaagc tcaaaactct tgatctcagt    1320
tccaataaat taacgggaaa tttacccca aacatgtgct ccggtaacaa tctgcagaca     1380
attatcactc tagggaactt cttgtttggc ccaattcctg aatctttggg taggtgtgaa    1440
tcacttaatc gtattagaat gggagaaaat tatctgaatg ggtctattcc aaaagggctc    1500
ttaagcttgc cacatctgtc acaagttgaa cttcagaata atattctcac tggtacatttt    1560
cctgatattt cttccaaatc taacagtctt ggccagatta tcctttcaaa taatcgctta    1620
actggacctt tgccaccaag cattggaaac tttgctgtag cccaaaaatt gcttcttgat    1680
gggaacaaat tttcgggacg aattccagct gaaataggaa agcttcaaca gctatccaaa    1740
attgatttca gtcataacaa cttgtctgga cccattgctc cggagattag ccagtgcaag    1800
ttgctgactt atgttgatct cagcaggaac caacttttcgg gtgagattcc tactgagatc    1860
acaggtatga gaatactcaa ctacttgaat ttatcgcgaa accacttagt tgggagtatt    1920
cctgccccta tttctagtat gcagagttta acttctgttg atttctcgta taacaacttt    1980
tctggtttag ttcctggaac cgggcaattt agttatttca attacacctc atttctaggc    2040
aatccagatc tttgcggacc ctatttgggc ccttgcaaag agggcgttgt tgatgggtt    2100
```

```
agtcaacctc accaacgagg agccttaacg ccttcgatga agcttttact tgttataggt    2160
ttgcttgtct gttctattgt gtttgctgtt gctgcaatta taaaggcccg atctttaaag    2220
aaggcaagtg aagctcgtgc ctggaagcta actgcttttc agcgcctgga ttttacttgt    2280
gatgatattt tggatagctt gaaggaggat aacgttattg gaaaaggagg tgctggtatt    2340
gtctacaagg gggtaatgcc tagcggggaa catgtagcgg ttaagaggtt gccagctatg    2400
agcaggggtt cctctcatga tcatgggttc aatgcagaga tacagactct tgggaggatc    2460
cgacacaggc acattgttag attattaggg ttttgctcga atcatgagac aaatcttttg    2520
gtttacgagt acatgcctaa tggaagtctt ggggaaatgc ttcatggcaa gaaaggcggt    2580
catttacatt gggataccag gtataagatt gccttggagt ctgctaaggg tctttgctat    2640
ctccatcacg attgctctcc tttgatcctc catcgtgatg tgaaatcaaa caacattctg    2700
ctggactcca gctttgaagc tcatgttgct gattttggac ttgctaagtt cttgcaagat    2760
tcagggacat cagaatgcat gtctgctatt gctggttctt atgggtacat tgctccag     2818
```

```
<210> SEQ ID NO 6
<211> LENGTH: 20
<212> TYPE: DNA
<213> ORGANISM: Solanum lycopersicum
<220> FEATURE:
<221> NAME/KEY: misc_feature
<222> LOCATION: (1)..(20)
<223> OTHER INFORMATION: Target sequence in exon 1 of RLK gene

<400> SEQUENCE: 6
tctctagagt accttgcagt                                                   20

<210> SEQ ID NO 7
<211> LENGTH: 24
<212> TYPE: DNA
<213> ORGANISM: Artificial Sequence
<220> FEATURE:
<223> OTHER INFORMATION: Primer 1 for eIF4E

<400> SEQUENCE: 7
atccatcacc caagcaagtt aatt                                              24

<210> SEQ ID NO 8
<211> LENGTH: 24
<212> TYPE: DNA
<213> ORGANISM: Artificial Sequence
<220> FEATURE:
<223> OTHER INFORMATION: Primer 2 for eIF4E

<400> SEQUENCE: 8
gtccacaaag ctatttttc tccc                                               24

<210> SEQ ID NO 9
<211> LENGTH: 21
<212> TYPE: DNA
<213> ORGANISM: Artificial Sequence
<220> FEATURE:
<223> OTHER INFORMATION: Primer 3 for RLK

<400> SEQUENCE: 9
ttaacacgtc tgcgtaacct c                                                 21

<210> SEQ ID NO 10
<211> LENGTH: 23
<212> TYPE: DNA
```

```
<213> ORGANISM: Artificial Sequence
<220> FEATURE:
<223> OTHER INFORMATION: Primer 4 for RLK

<400> SEQUENCE: 10
ccggtgaagg tattgtagta tcc                                              23

<210> SEQ ID NO 11
<211> LENGTH: 20
<212> TYPE: DNA
<213> ORGANISM: Artificial Sequence
<220> FEATURE:
<223> OTHER INFORMATION: Primer 5 for TYLCV

<400> SEQUENCE: 11
ccctctggaa tgaaggaaca                                                  20

<210> SEQ ID NO 12
<211> LENGTH: 20
<212> TYPE: DNA
<213> ORGANISM: Artificial Sequence
<220> FEATURE:
<223> OTHER INFORMATION: Primer 6 for TYLCV

<400> SEQUENCE: 12
ttgaaaaatt ggrctctcaa                                                  20

<210> SEQ ID NO 13
<211> LENGTH: 21
<212> TYPE: DNA
<213> ORGANISM: Solanum lycopersicum
<220> FEATURE:
<221> NAME/KEY: mutation
<222> LOCATION: (1)..(21)
<223> OTHER INFORMATION: Mutated region I1 of eIF4E gene

<400> SEQUENCE: 13
agggtaaatc tgatacccag c                                                21

<210> SEQ ID NO 14
<211> LENGTH: 17
<212> TYPE: DNA
<213> ORGANISM: Solanum lycopersicum
<220> FEATURE:
<221> NAME/KEY: misc_feature
<222> LOCATION: (1)..(17)
<223> OTHER INFORMATION: Mutated region I2 of eIF4E gene

<400> SEQUENCE: 14
agggtaaatc tgatagc                                                     17

<210> SEQ ID NO 15
<211> LENGTH: 11
<212> TYPE: DNA
<213> ORGANISM: Solanum lycopersicum
<220> FEATURE:
<221> NAME/KEY: misc_feature
<222> LOCATION: (1)..(11)
<223> OTHER INFORMATION: Mutated region I3 of eIF4E gene

<400> SEQUENCE: 15
agggtaacag c                                                           11

<210> SEQ ID NO 16
<211> LENGTH: 17
<212> TYPE: DNA
<213> ORGANISM: Solanum lycopersicum
```

```
<220> FEATURE:
<221> NAME/KEY: misc_feature
<222> LOCATION: (1)..(17)
<223> OTHER INFORMATION: Mutated region I4 of eIF4E gene

<400> SEQUENCE: 16
agggtaaatg tgatagc                                                17

<210> SEQ ID NO 17
<211> LENGTH: 11
<212> TYPE: DNA
<213> ORGANISM: Solanum lycopersicum
<220> FEATURE:
<221> NAME/KEY: misc_feature
<222> LOCATION: (1)..(11)
<223> OTHER INFORMATION: Mutated region I5 of eIF4E gene

<400> SEQUENCE: 17
agtgtaacag c                                                      11

<210> SEQ ID NO 18
<211> LENGTH: 17
<212> TYPE: DNA
<213> ORGANISM: Solanum lycopersicum
<220> FEATURE:
<221> NAME/KEY: misc_feature
<222> LOCATION: (1)..(17)
<223> OTHER INFORMATION: Mutated region I6 of eIF4E gene

<400> SEQUENCE: 18
agggtaaatg taacagc                                                17

<210> SEQ ID NO 19
<211> LENGTH: 15
<212> TYPE: DNA
<213> ORGANISM: Solanum lycopersicum
<220> FEATURE:
<221> NAME/KEY: misc_feature
<222> LOCATION: (1)..(15)
<223> OTHER INFORMATION: Mutated region R1 of RLK gene

<400> SEQUENCE: 19
tctgtacctt gcagt                                                  15

<210> SEQ ID NO 20
<211> LENGTH: 13
<212> TYPE: DNA
<213> ORGANISM: Solanum lycopersicum
<220> FEATURE:
<221> NAME/KEY: misc_feature
<222> LOCATION: (1)..(13)
<223> OTHER INFORMATION: Mutated region R2 of RLK gene

<400> SEQUENCE: 20
tctaccttgc agt                                                    13

<210> SEQ ID NO 21
<211> LENGTH: 21
<212> TYPE: DNA
<213> ORGANISM: Solanum lycopersicum
<220> FEATURE:
<221> NAME/KEY: misc_feature
<222> LOCATION: (1)..(21)
<223> OTHER INFORMATION: Mutated region R3 of RLK gene

<400> SEQUENCE: 21
tctactagag taccttgcag t                                           21
```

```
<210> SEQ ID NO 22
<211> LENGTH: 15
<212> TYPE: DNA
<213> ORGANISM: Solanum lycopersicum
<220> FEATURE:
<221> NAME/KEY: misc_feature
<222> LOCATION: (1)..(15)
<223> OTHER INFORMATION: Mutated region R4 of RLK gene

<400> SEQUENCE: 22
tctgtacctt gacct                                                    15

<210> SEQ ID NO 23
<211> LENGTH: 917
<212> TYPE: DNA
<213> ORGANISM: Solanum lycopersicum
<220> FEATURE:
<221> NAME/KEY: misc_feature
<222> LOCATION: (1)..(917)
<223> OTHER INFORMATION: cDNA sequence of mutated eIF4E gene
<220> FEATURE:
<221> NAME/KEY: misc_difference
<222> LOCATION: (451)..(471)
<223> OTHER INFORMATION: Mutated region I1

<400> SEQUENCE: 23
agtgctccac agtccacaga gcagcaaaaa tggcagcagc tgaaatggag agaacgatgt    60
cgtttgatgc agctgagaag ttgaaggccg ccgatggagg aggaggagag gtagacgatg   120
aacttgaaga aggtgaaatt gttgaagaat caaatgatac ggcatcgtat ttagggaaag   180
aaatcacagt gaagcatcca ttggagcatt catggacttt ttggtttgat aaccctacca   240
ctaaatctcg acaaactgct tggggaagct cacttcgaaa tgtctacact ttctccactg   300
ttgaagattt ttggggtgct acaataata tccatcaccc aagcaagtta attatgggag    360
cagactttca ttgttttaag cacaaaattg agccaaagtg ggaagatcct gtatgtgcca   420
atggagggac gtggaaaatg agtttttcga agggtaaatc tgatacccag ctggctgtat   480
acgctgctgg caatgattgg acatcaattc gatcatggag atgaaatttg tggagcagtt   540
gttagtgtcc gggctaaggg agaaaaaata gctttgtgga ccaagaatgc tgcaaatgaa   600
acagctcagg ttagcattgg taagcaatgg aagcagtttc tagattacag tgattcggtt   660
ggcttcatat ttcacgacga tgcaaagagg ctcgacagaa atgccaagaa tcgttacacc   720
gtatagttct tgatgcagtg tgggattgca agaaacacaa ttcgtactgg aaaggttggt   780
aggtactagt ttagtttctc atttgataag cttctggttt gagtaactcg tgtgttggtg   840
tttacacttt ctaatcgtgg aaaattgttt gatttgaatc catgcctcta tgtttcgtca   900
cataacaaaa cacaaat                                                 917

<210> SEQ ID NO 24
<211> LENGTH: 913
<212> TYPE: DNA
<213> ORGANISM: Solanum lycopersicum
<220> FEATURE:
<221> NAME/KEY: misc_feature
<222> LOCATION: (1)..(913)
<223> OTHER INFORMATION: cDNA sequence of mutated eIF4E gene
<220> FEATURE:
<221> NAME/KEY: misc_difference
<222> LOCATION: (451)..(467)
<223> OTHER INFORMATION: Mutated region I2

<400> SEQUENCE: 24
agtgctccac agtccacaga gcagcaaaaa tggcagcagc tgaaatggag agaacgatgt    60
```

```
cgtttgatgc agctgagaag ttgaaggccg ccgatggagg aggaggagag gtagacgatg      120
aacttgaaga aggtgaaatt gttgaagaat caaatgatac ggcatcgtat ttagggaaag      180
aaatcacagt gaagcatcca ttggagcatt catggacttt ttggtttgat aaccctacca      240
ctaaatctcg acaaactgct tggggaagct cacttcgaaa tgtctacact ttctccactg      300
ttgaagattt ttggggtgct tacaataata tccatcaccc aagcaagtta attatgggag      360
cagactttca ttgttttaag cacaaaattg agccaaagtg ggaagatcct gtatgtgcca      420
atggagggac gtggaaaatg agttttcga agggtaaatc tgatagctgg ctgtatacgc      480
tgctggcaat gattggacat caattcgatc atggagatga aatttgtgga gcagttgtta      540
gtgtccgggc taagggagaa aaaatagctt tgtggaccaa gaatgctgca atgaaacag      600 ctcaggttag cattggtaag caatggaagc agtttctaga ttacagtgat tcggttggct      660
tcatatttca cgacgatgca aagaggctcg acagaaatgc caagaatcgt tacaccgtat      720
agttcttgat gcagtgtggg attgcaagaa acacaattcg tactggaaag gttggtaggt      780
actagtttag tttctcattt gataagcttc tggtttgagt aactcgtgtg ttggtgttta      840
cactttctaa tcgtggaaaa ttgtttgatt tgaatccatg cctctatgtt tcgtcacata      900
acaaaacaca aat                                                        913

<210> SEQ ID NO 25
<211> LENGTH: 907
<212> TYPE: DNA
<213> ORGANISM: Solanum lycopersicum
<220> FEATURE:
<221> NAME/KEY: misc_feature
<222> LOCATION: (1)..(907)
<223> OTHER INFORMATION: cDNA sequence of mutated eIF4E gene
<220> FEATURE:
<221> NAME/KEY: misc_difference
<222> LOCATION: (451)..(467)
<223> OTHER INFORMATION: Mutated region I3

<400> SEQUENCE: 25
agtgctccac agtccacaga gcagcaaaaa tggcagcagc tgaaatggag agaacgatgt       60
cgtttgatgc agctgagaag ttgaaggccg ccgatggagg aggaggagag gtagacgatg      120
aacttgaaga aggtgaaatt gttgaagaat caaatgatac ggcatcgtat ttagggaaag      180
aaatcacagt gaagcatcca ttggagcatt catggacttt ttggtttgat aaccctacca      240
ctaaatctcg acaaactgct tggggaagct cacttcgaaa tgtctacact ttctccactg      300
ttgaagattt ttggggtgct tacaataata tccatcaccc aagcaagtta attatgggag      360
cagactttca ttgttttaag cacaaaattg agccaaagtg ggaagatcct gtatgtgcca      420
atggagggac gtggaaaatg agttttcga agggtaacag ctggctgtat acgctgctgg      480
caatgattgg acatcaattc gatcatggag atgaaatttg tggagcagtt gttagtgtcc      540
gggctaaggg agaaaaaata gctttgtgga ccaagaatgc tgcaaatgaa acagctcagg      600
ttagcattgg taagcaatgg aagcagtttc tagattacag tgattcggtt ggcttcatat      660
ttcacgacga tgcaaagagg ctcgacagaa atgccaagaa tcgttacacc gtatagttct      720
tgatgcagtg tgggattgca agaaacacaa ttcgtactgg aaaggttggt aggtactagt      780
ttagtttctc atttgataag cttctggttt gagtaactcg tgtgttggtg tttacacttt      840
ctaatcgtgg aaaattgttt gatttgaatc catgcctcta tgtttcgtca cataacaaaa      900
cacaaat                                                               907
```

<210> SEQ ID NO 26
<211> LENGTH: 913
<212> TYPE: DNA
<213> ORGANISM: Solanum lycopersicum
<220> FEATURE:
<221> NAME/KEY: misc_feature
<222> LOCATION: (1)..(913)
<223> OTHER INFORMATION: cDNA sequence of mutated eIF4E gene
<220> FEATURE:
<221> NAME/KEY: misc_difference
<222> LOCATION: (451)..(467)
<223> OTHER INFORMATION: Mutated region I4

<400> SEQUENCE: 26

```
agtgctccac agtccacaga gcagcaaaaa tggcagcagc tgaaatggag agaacgatgt       60
cgtttgatgc agctgagaag ttgaaggccg ccgatggagg aggaggagag gtagacgatg      120
aacttgaaga aggtgaaatt gttgaagaat caaatgatac ggcatcgtat ttagggaaag      180
aaatcacagt gaagcatcca ttggagcatt catggacttt ttggtttgat aaccctacca      240
ctaaatctcg acaaactgct tggggaagct cacttcgaaa tgtctacact ttctccactg      300
ttgaagattt tgggggtgct tacaataata tccatcaccc aagcaagtta attatgggag      360
cagactttca ttgttttaag cacaaaattg agccaaagtg ggaagatcct gtatgtgcca      420
atggagggac gtggaaaatg agttttttcga agggtaaatg tgatagctgg ctgtatacgc      480
tgctggcaat gattggacat caattcgatc atggagatga aatttgtgga gcagttgtta      540
gtgtccgggc taagggagaa aaaatagctt tgtggaccaa gaatgctgca aatgaaacag      600
ctcaggttag cattggtaag caatggaagc agtttctaga ttacagtgat tcggttggct      660
tcatatttca cgacgatgca aagaggctcg acagaaatgc caagaatcgt acaccgtat      720 agttcttgat gcagtgtggg attgcaagaa acacaattcg tactggaaag gttggtaggt      780
actagtttag tttctcattt gataagcttc tggtttgagt aactcgtgtg ttggtgttta      840
cactttctaa tcgtggaaaa ttgtttgatt tgaatccatg cctctatgtt tcgtcacata      900
acaaaacaca aat                                                         913
```

<210> SEQ ID NO 27
<211> LENGTH: 907
<212> TYPE: DNA
<213> ORGANISM: Solanum lycopersicum
<220> FEATURE:
<221> NAME/KEY: misc_feature
<222> LOCATION: (1)..(907)
<223> OTHER INFORMATION: cDNA sequence of mutated eIF4E gene
<220> FEATURE:
<221> NAME/KEY: misc_difference
<222> LOCATION: (451)..(461)
<223> OTHER INFORMATION: Mutated region I5

<400> SEQUENCE: 27

```
agtgctccac agtccacaga gcagcaaaaa tggcagcagc tgaaatggag agaacgatgt       60
cgtttgatgc agctgagaag ttgaaggccg ccgatggagg aggaggagag gtagacgatg      120
aacttgaaga aggtgaaatt gttgaagaat caaatgatac ggcatcgtat ttagggaaag      180
aaatcacagt gaagcatcca ttggagcatt catggacttt ttggtttgat aaccctacca      240
ctaaatctcg acaaactgct tggggaagct cacttcgaaa tgtctacact ttctccactg      300
ttgaagattt tgggggtgct tacaataata tccatcaccc aagcaagtta attatgggag      360
cagactttca ttgttttaag cacaaaattg agccaaagtg ggaagatcct gtatgtgcca      420
atggagggac gtggaaaatg agttttttcga agtgtaacag ctggctgtat acgctgctgg      480
```

```
caatgattgg acatcaattc gatcatggag atgaaatttg tggagcagtt gttagtgtcc    540
gggctaaggg agaaaaaata gctttgtgga ccaagaatgc tgcaaatgaa acagctcagg    600
ttagcattgg taagcaatgg aagcagtttc tagattacag tgattcggtt ggcttcatat    660
ttcacgacga tgcaaagagg ctcgacagaa atgccaagaa tcgttacacc gtatagttct    720
tgatgcagtg tgggattgca agaaacacaa ttcgtactgg aaaggttggt aggtactagt    780
ttagtttctc atttgataag cttctggttt gagtaactcg tgtgttggtg tttacactttt    840 ctaatcgtgg aaaattgttt gatttgaatc catgcctcta tgtttcgtca cataacaaaa    900
cacaaat                                                             907

<210> SEQ ID NO 28
<211> LENGTH: 913
<212> TYPE: DNA
<213> ORGANISM: Solanum lycopersicum
<220> FEATURE:
<221> NAME/KEY: misc_feature
<222> LOCATION: (1)..(913)
<223> OTHER INFORMATION: cDNA sequence of mutated eIF4E gene
<220> FEATURE:
<221> NAME/KEY: misc_difference
<222> LOCATION: (451)..(467)
<223> OTHER INFORMATION: Mutated region I6

<400> SEQUENCE: 28
agtgctccac agtccacaga gcagcaaaaa tggcagcagc tgaaatggag agaacgatgt    60
cgtttgatgc agctgagaag ttgaaggccg ccgatggagg aggaggagag gtagacgatg    120
aacttgaaga aggtgaaatt gttgaagaat caaatgatac ggcatcgtat ttagggaaag    180
aaatcacagt gaagcatcca ttggagcatt catggacttt ttggtttgat aaccctacca    240
ctaaatctcg acaaactgct tggggaagct cacttcgaaa tgtctacact ttctccactg    300
ttgaagattt ttgggggtgct acaataata tccatcaccc aagcaagtta attatgggag    360
cagactttca ttgttttaag cacaaaattg agccaaagtg ggaagatcct gtatgtgcca    420
atggagggac gtggaaaatg agttttttcga agggtaaatg taacagctgg ctgtatacgc    480
tgctggcaat gattggacat caattcgatc atggagatga aatttgtgga gcagttgtta    540
gtgtccgggc taagggagaa aaaatagctt gtggaccaa gaatgctgca atgaaacag     600 ctcaggttag cattggtaag caatggaagc agtttctaga ttacagtgat tcggttggct    660
tcatatttca cgacgatgca aagaggctcg acagaaatgc caagaatcgt acaccgtat     720 agttcttgat gcagtgtggg attgcaagaa acacaattcg tactggaaag gttggtaggt    780
actagtttag tttctcattt gataagcttc tggtttgagt aactcgtgtg ttggtgttta    840
cactttctaa tcgtggaaaa ttgtttgatt tgaatccatg cctctatgtt tcgtcacata    900
acaaaacaca aat                                                      913

<210> SEQ ID NO 29
<211> LENGTH: 3511
<212> TYPE: DNA
<213> ORGANISM: Solanum lycopersicum
<220> FEATURE:
<221> NAME/KEY: misc_feature
<222> LOCATION: (1)..(3511)
<223> OTHER INFORMATION: DNA sequence of mutated RLK gene
<220> FEATURE:
<221> NAME/KEY: misc_difference
<222> LOCATION: (790)..(804)
<223> OTHER INFORMATION: Mutated region R1
```

<400> SEQUENCE: 29

```
gttacaaaaa agagttgggg cctcctctac ttgtacaatc tcacaattca aattttattt      60
ctttataata atcaatccct tcgtattata tttatttact caaaacaaaa gaatatacac     120
accaaacgga ttaccaccc tcaaaccaaa tcctcatttt tgcctttctc actctaactg      180
agtgaaactg caaaccaaac agtaggtggg cgttagatta acgaagcaaa aatgcgtctt     240
ctttttttc ttcttcttct tatgcatttt actgactttt ctgccggtaa acaaccacgc      300
ttaccggaat accaggcttt gcttgccctg aaaactgcca ttaccgatga cccgcagtta     360
actcttgcct catggaacat ctccaccagt cactgtacgt ggaatggtgt cacgtgcgac     420
acgcatcgtc acgtgacctc tcttgatatt tctgggttta atcttaccgg tactcttccg     480
ccggaagttg gaaatcttcg tttcttacaa aatttgtctg ttgctgttaa ccagtttact     540
ggacctgtac ctgttgaaat ctcctttatt ccaaatctga gttaccttaa tctttctaat     600
aacatattcg ggatgaatt cccttcgcag ttaacacgtc tgcgtaacct ccaagtcctt      660
gacctttaca acaacaatat gaccggtgaa cttcccgttg aggtgtatca gatgactaaa     720
cttcgacatc tacacctagg cgggaacttt ttcagtggcc gcattcctcc ggagtatgga     780
agattcccgt ctgtaccttg cagtttcagg caatgcattg gtaggagaga taccaccgga     840
gattggaaac atcgctacac ttcagcagtt gtatgtagga tactacaata ccttcaccgg     900
tgggattcca ccggcaatag gaacttatc gcagctcctt cggttgatg ctgctaactg       960
tggactttcg gggaagattc caccggagat tgggaagctt cagaaccttg atacctctctt  1020
cctgcaagtg aattctctat ctggatcttt aactccggag ataggttatc tgaagagctt   1080
gaaatctttg gatctgtcga ataacatgtt ctctggcgag ataccgccga catttgcgga   1140
gcttaagaat atcactcttg ttaatctttt ccggaataag ctttatgggt caataccaga   1200
gttcatagag gacttgccgg aactagaggt gttgcaactt tgggaaaata actttactgg   1260
aagcattcct caggggttag gcacaaagag caagctcaaa actcttgatc tcagttccaa   1320
taaattaacg ggaaatttac ccccaaacat gtgctccggt aacaatctgc agacaattat   1380
cactctaggg aacttcttgt ttggcccaat tcctgaatct ttgggtaggt gtgaatcact   1440
taatcgtatt agaatgggag aaaattatct gaatgggtct attccaaaag ggctcttaag   1500
cttgccacat ctgtcacaag ttgaacttca gaataatatt ctcactgta catttcctga    1560
tatttcttcc aaatctaaca gtcttggcca gattatcctt tcaaataatc gcttaactgg   1620
acctttgcca ccaagcattg gaaactttgc tgtagcccaa aaattgcttc ttgatgggaa   1680
caaattttcg ggacgaattc cagctgaaat aggaaagctt caacagctat ccaaaattga   1740
tttcagtcat aacaacttgt ctggacccat tgctccggag attagccagt gcaagttgct   1800
gacttatgtt gatctcagca ggaaccaact ttcgggtgag attcctactg agatcacagg   1860
tatgagaata ctcaactact tgaatttatc gcgaaaccac ttagtgggaa gtattcctgc   1920
ccctatttct agtatgcaga gtttaacttc tgttgatttc tcgtataaca acttttctgg   1980
tttagttcct ggaaccgggc aatttagtta tttcaattac acctcatttc taggcaatcc   2040
agatctttgc ggaccctatt tgggcccttg caaagagggc gttgttgatg gggttagtca   2100
acctcaccaa cgaggagcct taacgccttc gatgaagctt ttacttgtta taggtttgct   2160
tgtctgttct attgtgtttg ctgttgctgc aattataaag gcccgatctt taaagaaggc   2220
aagtgaagct cgtgcctgga agctaactgc ttttcagcgc ctggatttta cttgtgatga   2280
tattttggat agcttgaagg aggataacgt tattggaaaa ggaggtgctg gtattgtcta   2340
```

```
caaggggta   atgcctagcg   gggaacatgt   agcggttaag   aggttgccag   ctatgagcag    2400
gggttcctct   catgatcatg   ggttcaatgc   agagatacag   actcttggga   ggatccgaca    2460
caggcacatt   gttagattat   tagggttttg   ctcgaatcat   gagacaaatc   ttttggttta    2520
cgagtacatg   cctaatggaa   gtcttgggga   aatgcttcat   ggcaagaaag   gcggtcattt    2580
acattgggat   accaggtata   agattgcctt   ggagtctgct   aagggtcttt   gctatctcca    2640
tcacgattgc   tctcctttga   tcctccatcg   tgatgtgaaa   tcaaacaaca   ttctgctgga    2700
ctccagcttt   gaagctcatg   ttgctgattt   tggacttgct   aagttcttgc   aagattcagg    2760
gacatcagaa   tgcatgtctg   ctattgctgg   ttcttatggg   tacattgctc   cagaatatgc    2820
ttacacactt   aaggttgatg   agaagagtga   tgtatatagc   ttcggtgtgg   tgctactaga    2880
actggtaagt   ggcaaaaaac   cagttggaga   atttggtgat   ggtgttgaca   tagtccaatg    2940
ggttaggaaa   atgactgatg   ggaaaaagga   tggagttctc   aagatccttg   acccaagact    3000
ctcaacggtt   cccctaatg   aggtgatgca   tgtcttctat   gtcgcattgt   tgtgtgtcga    3060
agagcaggct   gtggaacgtc   ccaccatgcg   agaggtagtg   caaatactaa   cggaacttcc    3120
caagccacca   ggtgcaaaat   cagatgactc   aaccgtcact   gatcagtcgc   ccccatcagc    3180
ctctgcatta   gagtccccaa   cctcaattcc   cggggacaca   aaagaccatc   atcaaccaac    3240
acctcaatca   cctccacctg   acctactcag   tatctaattt   gcaatgttct   tgaagtagga    3300
gtgttttatt   tagtttgatt   ctctagttct   attatgatca   attgtgctaa   gctttattcc    3360 tttgtttaa   aaaaattggg   tcttctagg   ctcgggggtt   tattctaact   ctaagatggg    3420
tttaatgctc   agaagttttc   ctcttgtaca   gtaagattgg   tagggttttc   aagtgtatta    3480
ttaaatggaa   aaaaattgcc   cttcatttgc   t                                      3511
```

<210> SEQ ID NO 30
<211> LENGTH: 3509
<212> TYPE: DNA
<213> ORGANISM: Solanum lycopersicum
<220> FEATURE:
<221> NAME/KEY: misc_feature
<222> LOCATION: (1)..(3509)
<223> OTHER INFORMATION: cDNA sequence of mutated RLK gene
<220> FEATURE:
<221> NAME/KEY: misc_difference
<222> LOCATION: (790)..(802)
<223> OTHER INFORMATION: Mutated region R2

<400> SEQUENCE: 30

```
gttacaaaaa   agagttgggg   cctcctctac   ttgtacaatc   tcacaattca   aattttattt     60
ctttataata   atcaatccct   tcgtattata   tttatttact   caaaacaaaa   gaatatacac    120
accaaacgga   ttacccaccc   tcaaaccaaa   tcctcatttt   tgcctttctc   actctaactg    180
agtgaaactg   caaaccaaac   agtaggtggg   cgttagatta   acgaagcaaa   aatgcgtctt    240
cttttttttc   ttcttcttct   tatgcatttt   actgactttt   ctgccggtaa   acaaccacgc    300
ttaccggaat   accaggcttt   gcttgccctg   aaaactgcca   ttaccgatga   cccgcagtta    360
actcttgcct   catggaacat   ctccaccagt   cactgtacgt   ggaatggtgt   cacgtgcgac    420
acgcatcgtc   acgtgacctc   tcttgatatt   tctgggttta   atcttaccgg   tactcttccg    480
ccggaagttg   gaaatcttcg   tttcttacaa   aatttgtctg   ttgctgttaa   ccagtttact    540
ggacctgtac   ctgttgaaat   ctcctttatt   ccaaatctga   gttaccttaa   tctttctaat    600
aacatattcg   ggatggaatt   cccttcgcag   ttaacacgtc   tgcgtaacct   ccaagtcctt    660
```

```
gacctttaca acaacaatat gaccggtgaa cttcccgttg aggtgtatca gatgactaaa    720
cttcgacatc tacacctagg cgggaacttt ttcagtggcc gcattcctcc ggagtatgga    780
agattcccgt ctaccttgca gtttcaggca atgcattggt aggagagata ccaccggaga    840
ttggaaacat cgctacactt cagcagttgt atgtaggata ctacaatacc ttcaccggtg    900
ggattccacc ggcaataggg aacttatcgc agctccttcg gtttgatgct gctaactgtg    960
gactttcggg gaagattcca ccggagattg gaagcttca gaaccttgat accctcttcc    1020
tgcaagtgaa ttctctatct ggatctttaa ctccggagat aggttatctg aagagcttga    1080
aatctttgga tctgtcgaat aacatgttct ctggcgagat accgccgaca tttgcggagc    1140
ttaagaatat cactcttgtt aatcttttcc ggaataagct ttatgggtca ataccagagt    1200
tcatagagga cttgccggaa ctagaggtgt tgcaactttg ggaaaataac tttactggaa    1260
gcattcctca ggggttaggc acaaagagca agctcaaaac tcttgatctc agttccaata    1320
aattaacggg aaatttaccc ccaaacatgt gctccggtaa caatctgcag acaattatca    1380
ctctagggaa cttcttgttt ggcccaattc ctgaatcttt gggtaggtgt gaatcactta    1440
atcgtattag aatgggagaa aattatctga atgggtctat tccaaaaggg ctcttaagct    1500
tgccacatct gtcacaagtt gaacttcaga ataatattct cactggtaca tttcctgata    1560
tttcttccaa atctaacagt cttggccaga ttatccttc aaataatcgc ttaactggac    1620
ctttgccacc aagcattgga aactttgctg tagcccaaaa attgcttctt gatgggaaca    1680
aattttcggg acgaattcca gctgaaatag gaaagcttca acagctatcc aaaattgatt    1740
tcagtcataa caacttgtct ggacccattg ctccggagat tagccagtgc aagttgctga    1800
cttatgttga tctcagcagg aaccaacttt cgggtgagat tcctactgag atcacaggta    1860
tgagaatact caactacttg aatttatcgc gaaaccactt agttgggagt attcctgccc    1920
ctatttctag tatgcagagt ttaacttctg ttgatttctc gtataacaac ttttctggtt    1980
tagttcctga aaccgggcaa tttagttatt caattacac ctcatttcta ggcaatccag    2040
atctttgcgg accctatttg ggcccttgca agagggcgt tgttgatggg gttagtcaac    2100
ctcaccaacg aggagcctta acgccttcga tgaagctttt acttgttata ggtttgcttg    2160
tctgttctat tgtgtttgct gttgctgcaa ttataaaggc ccgatcttta agaaggcaa    2220 gtgaagctcg tgcctggaag ctaactgctt tcagcgcct ggattttact tgtgatgata    2280
ttttggatag cttgaaggag gataacgtta ttggaaaagg aggtgctggt attgtctaca    2340 aggggggtaat gcctagcggg gaacatgtag cggttaagag gttgccagct atgagcaggg    2400
gttcctctca tgatcatggg ttcaatgcag agatacagac tcttgggagg atccgacaca    2460
ggcacattgt tagattatta gggttttgct cgaatcatga acaaatctt ttggtttacg    2520 agtacatgcc taatggaagt cttggggaaa tgcttcatgg caagaaaggc ggtcatttac    2580
attgggatac caggtataag attgccttgg agtctgctaa gggtctttgc tatctccatc    2640
acgattgctc tcctttgatc ctccatcgtg atgtgaaatc aaacaacatt ctgctggact    2700
ccagctttga agctcatgtt gctgattttg acttgctaa gttcttgcaa gattcaggga    2760
catcagaatg catgtctgct attgctggtt cttatgggta cattgctcca gaatatgctt    2820
acacacttaa ggttgatgag aagagtgatg tatatagctt cggtgtggtg ctactagaac    2880
tggtaagtgg caaaaaacca gttggagaat ttggtgatgg tgttgacata gtccaatggg    2940
ttaggaaaat gactgatggg aaaaaggatg gagttctcaa gatccttgac ccaagactct    3000
caacggttcc ccttaatgag gtgatgcatg tcttctatgt cgcattgttg tgtgtcgaag    3060
```

```
agcaggctgt ggaacgtccc accatgcgag aggtagtgca aatactaacg gaacttccca    3120
agccaccagg tgcaaaatca gatgactcaa ccgtcactga tcagtcgccc ccatcagcct    3180
ctgcattaga gtccccaacc tcaattcccg gggacacaaa agaccatcat caaccaacac    3240
ctcaatcacc tccacctgac ctactcagta tctaatttgc aatgttcttg aagtaggagt    3300 gtttattta gtttgattct ctagttctat tatgatcaat tgtgctaagc tttattcctt     3360
tgttttaaaa aaattgggtc tttctaggct cggggggttta ttctaactct aagatggtt    3420 taatgctcag aagttttcct cttgtacagt aagattggta gggttttcaa gtgtattatt    3480
aaatggaaaa aaattgccct tcatttgct                                     3509
```

<210> SEQ ID NO 31
<211> LENGTH: 3517
<212> TYPE: DNA
<213> ORGANISM: Solanum lycopersicum
<220> FEATURE:
<221> NAME/KEY: misc_feature
<222> LOCATION: (1)..(3517)
<223> OTHER INFORMATION: cDNA sequence of mutated RLK gene
<220> FEATURE:
<221> NAME/KEY: misc_difference
<222> LOCATION: (790)..(810)
<223> OTHER INFORMATION: Mutated region R3

<400> SEQUENCE: 31

```
gttacaaaaa agagttgggg cctcctctac ttgtacaatc tcacaattca aattttattt     60
ctttataata atcaatccct tcgtattata tttatttact caaaacaaaa gaatatacac    120
accaaacgga ttacccaccc tcaaaccaaa tcctcatttt tgcctttctc actctaactg    180
agtgaaactg caaccaaac agtaggtggg cgttagatta acgaagcaaa aatgcgtctt    240
cttttttttc ttcttcttct tatgcatttt actgactttt ctgccggtaa acaaccacgc    300
ttaccggaat accaggcttt gcttgccctg aaaactgcca ttaccgatga cccgcagtta    360
actcttgcct catggaacat ctccaccagt cactgtacgt ggaatggtgt cacgtgcgac    420
acgcatcgtc acgtgacctc tcttgatatt tctgggttta atcttaccgg tactcttccg    480
ccggaagttg gaaatcttcg tttcttacaa aatttgtctg ttgctgttaa ccagtttact    540
ggacctgtac ctgttgaaat ctccttattt ccaaatctga gttaccttaa tctttctaat    600
aacatattcg ggatggaatt cccttcgcag ttaacacgtc tgcgtaacct ccaagtcctt    660
gacctttaca caacaatat gaccggtgaa cttcccgttg aggtgtatca gatgactaaa    720
cttcgacatc tacacctagg cgggaacttt ttcagtggcc gcattcctcc ggagtatgga    780
agattcccgt ctactagagt accttgcagt ttcaggcaat gcattggtag gagagatacc    840
accggagatt ggaaacatcg ctacacttca gcagttgtat gtaggatact acaataccct    900
caccggtggg attccaccgg caataggaa cttatcgcag ctccttcggt ttgatgctgc     960
taactgtgga cttcggggga agattccacc ggagattggg aagcttcaga accttgatac   1020
cctcttcctg caagtgaatt ctctatctgg atctttaact ccggagatag gttatctgaa   1080
gagcttgaaa tctttggatc tgtcgaataa catgttctct ggcgagatac cgccgacatt   1140
tgcggagctt aagaatatca ctcttgttaa tcttttccgg aataagcttt atgggtcaat   1200
accagagttc atagaggact tgccggaact agaggtgttg caactttggg aaaataactt   1260
tactggaagc attcctcagg ggttaggcac aaagagcaag ctcaaaactc ttgatctcag   1320
ttccaataaa ttaacgggaa atttaccccc aaacatgtgc tccggtaaca atctgcagac   1380
```

```
aattatcact ctagggaact tcttgtttgg cccaattcct gaatctttgg gtaggtgtga    1440
atcacttaat cgtattagaa tgggagaaaa ttatctgaat gggtctattc caaaagggct    1500
cttaagcttg ccacatctgt cacaagttga acttcagaat aatattctca ctggtacatt    1560
tcctgatatt tcttccaaat ctaacagtct tggccagatt atcctttcaa ataatcgctt    1620
aactggacct ttgccaccaa gcattggaaa ctttgctgta gcccaaaaat tgcttcttga    1680
tgggaacaaa ttttcgggac gaattccagc tgaaatagga aagcttcaac agctatccaa    1740
aattgatttc agtcataaca acttgtctgg acccattgct ccggagatta gccagtgcaa    1800
gttgctgact tatgttgatc tcagcaggaa ccaactttcg ggtgagattc ctactgagat    1860
cacaggtatg agaatactca actacttgaa tttatcgcga aaccacttag ttgggagtat    1920
tcctgcccct atttctagta tgcagagttt aacttctgtt gatttctcgt ataacaactt    1980
ttctggttta gttcctggaa ccgggcaatt tagttatttc aattacacct catttctagg    2040
caatccagat ctttgcggac cctatttggg cccttgcaaa gagggcgttg ttgatggggt    2100
tagtcaacct caccaacgag gagccttaac gccttcgatg aagcttttac ttgttatagg    2160
tttgcttgtc tgttctattg tgtttgctgt tgctgcaatt ataaaggccc gatctttaaa    2220
gaaggcaagt gaagctcgtg cctggaagct aactgctttt cagcgcctgg attttacttg    2280
tgatgatatt ttggatagct tgaaggagga taacgttatt ggaaaaggag gtgctggtat    2340
tgtctacaag ggggtaatgc ctagcgggga acatgtagcg gttaagaggt tgccagctat    2400 gagcagggggt tcctctcatg atcatgggtt caatgcagag atacagactc ttgggaggat    2460
ccgacacagg cacattgtta gattattagg gttttgctcg aatcatgaga caaatctttt    2520
ggtttacgag tacatgccta atggaagtct tggggaaatg cttcatggca agaaaggcgg    2580
tcatttacat tgggatacca ggtataagat tgccttggag tctgctaagg gtctttgcta    2640
tctccatcac gattgctctc ctttgatcct ccatcgtgat gtgaaatcaa caacattct    2700 gctggactcc agctttgaag ctcatgttgc tgattttgga cttgctaagt tcttgcaaga    2760
ttcagggaca tcagaatgca tgtctgctat tgctggttct tatgggtaca ttgctccaga    2820
atatgcttac acacttaagg ttgatgagaa gagtgatgta tatagcttcg gtgtggtgct    2880
actagaactg gtaagtggca aaaaaccagt tggagaattt ggtgatggtg ttgacatagt    2940
ccaatgggtt aggaaaatga ctgatgggaa aaaggatgga gttctcaaga tccttgaccc    3000
aagactctca acggttcccc ttaatgaggt gatgcatgtc ttctatgtcg cattgttgtg    3060
tgtcgaagag caggctgtgg aacgtccac catgcgagag gtagtgcaaa tactaacgga    3120
acttcccaag ccaccaggtg caaaatcaga tgactcaacc gtcactgatc agtcgccccc    3180
atcagcctct gcattagagt ccccaacctc aattcccggg gacacaaaag accatcatca    3240
accaacacct caatcacctc cacctgacct actcagtatc taatttgcaa tgttcttgaa    3300
gtaggagtgt tttatttagt ttgattctct agttctatta tgatcaattg tgctaagctt    3360
tattcctttg ttttaaaaaa attgggtctt tctaggctcg ggggtttatt ctaactctaa    3420
gatgggttta atgctcagaa gttttcctct tgtacagtaa gattggtagg gttttcaagt    3480
gtattattaa atggaaaaaa attgcccttc atttgct                            3517
```

<210> SEQ ID NO 32
<211> LENGTH: 3511
<212> TYPE: DNA
<213> ORGANISM: Solanum lycopersicum
<220> FEATURE:
<221> NAME/KEY: misc_feature

```
<222> LOCATION: (1)..(3511)
<223> OTHER INFORMATION: cDNA sequence of mutated RLK gene
<220> FEATURE:
<221> NAME/KEY: misc_difference
<222> LOCATION: (790)..(804)
<223> OTHER INFORMATION: Mutated region R4

<400> SEQUENCE: 32
gttacaaaaa agagttgggg cctcctctac ttgtacaatc tcacaattca aattttattt      60
ctttataata atcaatccct tcgtattata tttatttact caaaacaaaa gaatatacac     120
accaaacgga ttacccaccc tcaaaccaaa tcctcatttt tgcctttctc actctaactg     180
agtgaaactg caaaccaaac agtaggtggg cgttagatta acgaagcaaa aatgcgtctt     240
cttttttttc ttcttcttct tatgcatttt actgactttt ctgccggtaa acaaccacgc     300
ttaccggaat accaggcttt gcttgccctg aaaactgcca ttaccgatga cccgcagtta     360
actcttgcct catggaacat ctccaccagt cactgtacgt ggaatggtgt cacgtgcgac     420
acgcatcgtc acgtgacctc tcttgatatt tctgggttta atcttaccgg tactcttccg     480
ccggaagttg gaaatcttcg tttcttacaa aatttgtctg ttgctgttaa ccagtttact     540
ggacctgtac ctgttgaaat ctcctttatt ccaaatctga gttaccttaa tctttctaat     600
aacatattcg ggatggaatt cccttcgcag ttaacacgtc tgcgtaacct ccaagtcctt     660
gacctttaca caacaatat gaccggtgaa cttcccgttg aggtgtatca gatgactaaa     720
cttcgacatc tacacctagg cgggaacttt ttcagtggcc gcattcctcc ggagtatgga     780
agattcccgt ctgtaccttg acctttcagg caatgcattg gtaggagaga taccaccgga     840
gattggaaac atcgctacac ttcagcagtt gtatgtagga tactacaata ccttcaccgg     900
tgggattcca ccggcaatag ggaacttatc gcagctcctt cggtttgatg ctgctaactg     960
tggactttcg gggaagattc caccggagat tgggaagctt cagaaccttg ataccctctt    1020
cctgcaagtg aattctctat ctggatcttt aactccggag ataggttatc tgaagagctt    1080
gaaatctttg gatctgtcga ataacatgtt ctctggcgag ataccgccga catttgcgga    1140
gcttaagaat atcactcttg ttaatctttt ccggaataag ctttatgggt caataccaga    1200
gttcatagag gacttgccgg aactagaggt gttgcaactt tgggaaaata actttactgg    1260
aagcattcct caggggttag gcacaaagag caagctcaaa actcttgatc tcagttccaa    1320
taaattaacg ggaaatttac ccccaaacat gtgctccggt aacaatctgc agacaattat    1380
cactctaggg aacttcttgt ttggcccaat tcctgaatct ttgggtaggt gtgaatcact    1440
taatcgtatt agaatgggag aaaattatct gaatgggtct attccaaaag ggctcttaag    1500
cttgccacat ctgtcacaag ttgaacttca gaataatatt ctcactggta catttcctga    1560
tatttcttcc aaatctaaca gtcttggcca gattatcctt tcaaataatc gcttaactgg    1620
accttttgcca ccaagcattg gaaactttgc tgtagcccaa aaattgcttc ttgatgggaa    1680
caaattttcg ggacgaattc cagctgaaat aggaaagctt caacagctat ccaaaattga    1740
tttcagtcat aacaacttgt ctggacccat tgctccggag attagccagt gcaagttgct    1800
gacttatgtt gatctcagca ggaaccaact ttcgggtgag attcctactg agatcacagg    1860
tatgagaata ctcaactact tgaatttatc gcgaaaccac ttagtggga gtattcctgc     1920
ccctatttct agtatgcaga gtttaacttc tgttgatttc tcgtataaca acttttctgg    1980
tttagttcct ggaaccgggc aatttagtta tttcaattac acctcatttc taggcaatcc    2040
agatctttgc ggaccctatt tgggcccttg caaagagggc gttgttgatg gggttagtca    2100
```

```
acctcaccaa cgaggagcct taacgccttc gatgaagctt ttacttgtta taggtttgct    2160
tgtctgttct attgtgtttg ctgttgctgc aattataaag gcccgatctt taaagaaggc    2220
aagtgaagct cgtgcctgga agctaactgc ttttcagcgc ctggatttta cttgtgatga    2280
tattttggat agcttgaagg aggataacgt tattggaaaa ggaggtgctg gtattgtcta    2340 caaggggta atgcctagcg gggaacatgt agcggttaag aggttgccag ctatgagcag    2400
gggttcctct catgatcatg ggttcaatgc agagatacag actcttggga ggatccgaca    2460
caggcacatt gttagattat tagggttttg ctcgaatcat gagacaaatc ttttggttta    2520
cgagtacatg cctaatggaa gtcttgggga aatgcttcat ggcaagaaag cggtcattt     2580 acattgggat accaggtata agattgcctt ggagtctgct aagggtcttt gctatctcca    2640
tcacgattgc tctcctttga tcctccatcg tgatgtgaaa tcaaacaaca ttctgctgga    2700
ctccagcttt gaagctcatg ttgctgattt tggacttgct aagttcttgc aagattcagg    2760
gacatcagaa tgcatgtctg ctattgctgg ttcttatggg tacattgctc cagaatatgc    2820
ttacacactt aaggttgatg agaagagtga tgtatatagc ttcggtgtgg tgctactaga    2880
actggtaagt ggcaaaaaac cagttggaga atttggtgat ggtgttgaca tagtccaatg    2940
ggttaggaaa atgactgatg ggaaaaagga tggagttctc aagatccttg acccaagact    3000
ctcaacggtt cccttaatg aggtgatgca tgtcttctat gtcgcattgt tgtgtgtcga    3060
agagcaggct gtggaacgtc ccaccatgcg agaggtagtg caaatactaa cggaacttcc    3120
caagccacca ggtgcaaaat cagatgactc aaccgtcact gatcagtcgc ccccatcagc    3180
ctctgcatta gagtccccaa cctcaattcc cggggacaca aaagaccatc atcaaccaac    3240
acctcaatca cctccacctg acctactcag tatctaattt gcaatgttct tgaagtagga    3300
gtgttttatt tagtttgatt ctcctagttct attatgatca attgtgctaa gctttattcc    3360
tttgttttaa aaaaattggg tctttctagg ctcgggggtt tattctaact ctaagatggg    3420
tttaatgctc agaagttttc ctcttgtaca gtaagattgg tagggttttc aagtgtatta    3480
ttaaatggaa aaaaattgcc cttcatttgc t                                   3511
```

<210> SEQ ID NO 33  
<211> LENGTH: 1737  
<212> TYPE: DNA  
<213> ORGANISM: Solanum lycopersicum  
<220> FEATURE:  
<221> NAME/KEY: misc_feature  
<222> LOCATION: (1)..(1737)  
<223> OTHER INFORMATION: cDNA sequence of deltaCOP gene on chromosome 1 (delta01 gene)  
<220> FEATURE:  
<221> NAME/KEY: misc_feature  
<222> LOCATION: (402)..(572)  
<223> OTHER INFORMATION: Exon 6  
<220> FEATURE:  
<221> NAME/KEY: misc_feature  
<222> LOCATION: (471)..(490)  
<223> OTHER INFORMATION: Target sequence
<400> SEQUENCE: 33

```
ccaaattggt tggtatagga aagcagcata catatattga gactgaaaat gtgcgatatg      60
tttatcagcc gatagaatct ctgtacttgc tccttgtgac caacaaacag agcaacattc     120
ttgaagattt ggagacactg aggctgctgt ctaaactagt gcctgaatat tcttattcac     180
tagatgagga aggaattggc aggacggctt ttgagcttat ttttgcattt gatgaagtga     240
tctctcttgg gcacaaggaa aatgttacag ttacacaagt caagcagtac tgtgaaatgg     300
```

```
agagtcacga ggagagatta cacaagttag tcttacagaa caagataaat gaaactaagg      360
atgtcatgaa gcgtaaagcc agtgaaattg acaaaagcaa gattgagagg aatagaggtg      420
acaaaggagg tttcatgtca ctgcaatcca tgagttctgg aagaattgat actggctttg      480
gcagcgactc aggcatatcc aacataggag gcaatggttc tggtggatttt gctctacccc      540 ctgatgtgga cacattttcc accaaatcca agggtcgtcc agctgcatct gctactgctc      600
caccgaaagg tcttggtatg caactgggta aacacagaa gaccaaccaa tttctggaat       660
ccctaaaagc tgagggtgag gtaattgtcg aggatgtgag gccaagcgtt ggtcaggcca      720
aaccagctgc tgctccacta actgatcccg tcacgttgac tgttgaagag aagataaatg      780
taacactaaa gcgtgatggt ggtctcagca atttttgtcgt ccagggtact ttgtctctcc     840
aaattctgaa ccaagaagat gcttttatcc aagtgcagat tgaaaccagt ggtaatccag      900
caatcctctt caaagcacac ccaaacatga acaaggagtt gtttgcaaat gaaaatattc      960
ttggccttaa agatcccaat aggtcatttc ccacagggca aggtggtgat ggtgttagtc     1020
ttttgaggtg gagaatgcaa agcacagatg agtcaatttt gcctttgaca attaactgct     1080
ggccttcagt ttctggaagt gaaacctatg tgaatatcga gtatgaaacc cccgcgcaga     1140
ttgatttaca aaatgttgta atttctgtac cccttccagc tctcagggag gctccaaatg     1200
tacaacagat tgatggagag tggaggtacg attccagaaa ttctgttttg gagtggtctg     1260
ttcttctcat tgacaattcg aaccgcagtg gatcactaga gtttgttgtt ccagctgctg     1320
atccatcagc attctttcca atttctgcac agtttacttc ttcgagaacc ttcagtgatg     1380
tgaaggttgt caacgtgctg cctctaaaag gtggggccac tcccaagcat tctcaaagaa     1440
cactgctggc cacggagagt taccaggttg tgtgaccaca aggacattat aaaattgtgc     1500
cgttacagca acattatag ggcttgtttt atttcatttt tgttcagact tttgtttgcc      1560
cttttccttg ttatccttttc ccaaagttct ttcatgtacg gagatggaat aactttgtta    1620
ggttgaactt agaagtcttt gtgcattttat agcgtacgcc gatcaactta cttttgcgca    1680
attgaattga accaaaattt gaagcttcac tgttttcttt atttgttcta ttatttc        1737

<210> SEQ ID NO 34
<211> LENGTH: 172
<212> TYPE: DNA
<213> ORGANISM: Solanum lycopersicum
<220> FEATURE:
<221> NAME/KEY: misc_feature
<222> LOCATION: (1)..(172)
<223> OTHER INFORMATION: Exon 6 of delta01 gene
<220> FEATURE:
<221> NAME/KEY: misc_feature
<222> LOCATION: (70)..(89)
<223> OTHER INFORMATION: Target sequence

<400> SEQUENCE: 34
attgagagga atagaggtga caaaggaggt ttcatgtcac tgcaatccat gagttctgga      60
agaattgata ctggctttgg cagcgactca ggcatatcca acataggagg caatggttct     120
ggtggatttg ctctaccccc tgatgtggac acattttcca ccaaatccaa gg             172

<210> SEQ ID NO 35
<211> LENGTH: 20
<212> TYPE: DNA
<213> ORGANISM: Solanum lycopersicum
<220> FEATURE:
<221> NAME/KEY: misc_feature
<222> LOCATION: (1)..(20)
<223> OTHER INFORMATION: Target sequence
```

```
<400> SEQUENCE: 35
actggctttg gcagcgactc                                                      20

<210> SEQ ID NO 36
<211> LENGTH: 1176
<212> TYPE: DNA
<213> ORGANISM: Solanum lycopersicum
<220> FEATURE:
<221> NAME/KEY: misc_feature
<222> LOCATION: (1)..(1176)
<223> OTHER INFORMATION: cDNA sequence of deltaCOP gene on chromosome 10
      (delta10 gene)
<220> FEATURE:
<221> NAME/KEY: misc_feature
<222> LOCATION: (106)..(274)
<223> OTHER INFORMATION: Exon2
<220> FEATURE:
<221> NAME/KEY: misc_feature
<222> LOCATION: (136)..(155)
<223> OTHER INFORMATION: Target sequence

<400> SEQUENCE: 36
atggagagcc atgaagagaa actgcataag ttagtcttac aaagcaagat taatgaaact         60
aaggatgtca tgaagcgcaa agccagtgag attgataaaa gcaagattga gaggaataga        120
ggtgaaaaag gaggtttcat gtctctgcaa tccatgggtt ctggaagaat ggataccggc        180
tttggcagta tacaaactt atctagttta ggaggcagtg ttctggatt tggaccaagc          240
actgatgtgg attcattttc caccaagtcc aagggtcgtc cagttgcatc tgctacaggc        300
cccccaaaag gtcttggtat gcagctaggt aaaacacaaa ggaccaacca gttttgcaa         360
tccctgaaag ctgagggtga agtcattgtc gaagatgtca gaccaagcat ggtccgtcc         420
aagccacctg ctccaccacc aactgaccct gtcaccctta ctattgaaga gaaaattaat        480
gtaacattaa agcgtgatgg aggtatcagc aacttcaatg tccagggtac cttatctctc        540
caaattctga accaagaaga tgggcttatc caagttcaga ttgaaaccag tggtaatcca        600
gccatccact tcaacacaca cccaaatatc aataaggagt tgttttctaa tgaaaatatt        660
ctaggcctca aagaacctag taggccttttt cctgctaatc aatctggtga tggagttagt       720
ctcttgagat ggagaatgca aagtgcagat gagtcgattt tacctttaac tattaactgc        780
tggccttcag tttctgggaa tgaaacctat gtgaatattg agtatgaaac accagcacaa        840
actgatctac agaatgttgt gatttttgta cctctcccag ctctcaggga tgccccacgt        900
atacagcaaa ttgatggaga gtggaggtat gattccagaa attctgttct ggagtggtct        960
gtagttctca tcgacaattc taatcgcagt ggatcactgg aatttgtggt tccggcagca       1020
gatcctgatg tgttcttccc gatttctgcc cgttttaccg cctcaagaac gttcagtgac       1080
ctgaaggttg ccaatattct gccattgaaa ggtgggtctc acccaagtt ctctcaaaga        1140
acgctgctgg cttccgagaa ctaccaagtc gtgtaa                                 1176

<210> SEQ ID NO 37
<211> LENGTH: 169
<212> TYPE: DNA
<213> ORGANISM: Solanum lycopersicum
<220> FEATURE:
<221> NAME/KEY: misc_feature
<222> LOCATION: (1)..(169)
<223> OTHER INFORMATION: Exon 2 of delta01 gene
<220> FEATURE:
<221> NAME/KEY: misc_feature
<222> LOCATION: (31)..(50)
<223> OTHER INFORMATION: Target sequence
```

<400> SEQUENCE: 37

```
attgagagga atagaggtga aaaaggaggt ttcatgtctc tgcaatccat gggttctgga      60
agaatggata ccggctttgg cagtgataca aacttatcta gtttaggagg cagtggttct     120
ggatttggac caagcactga tgtggattca ttttccacca agtccaagg                 169
```

<210> SEQ ID NO 38
<211> LENGTH: 20
<212> TYPE: DNA
<213> ORGANISM: Solanum lycopersicum
<220> FEATURE:
<221> NAME/KEY: misc_feature
<222> LOCATION: (1)..(20)
<223> OTHER INFORMATION: Target sequence

<400> SEQUENCE: 38

```
ttcatgtctc tgcaatccat                                                  20
```

<210> SEQ ID NO 39
<211> LENGTH: 768
<212> TYPE: DNA
<213> ORGANISM: Solanum lycopersicum
<220> FEATURE:
<221> NAME/KEY: misc_feature
<222> LOCATION: (1)..(768)
<223> OTHER INFORMATION: cDNA sequence of NSI gene
<220> FEATURE:
<221> NAME/KEY: misc_feature
<222> LOCATION: (209)..(393)
<223> OTHER INFORMATION: Exon 4
<220> FEATURE:
<221> NAME/KEY: misc_feature
<222> LOCATION: (283)..(302)
<223> OTHER INFORMATION: Target sequence

<400> SEQUENCE: 39

```
atgcaaactc tccacttagt atccacttct actgttgctt cttcttcttc ttcttcttcc      60
ctacccacta ttgtttctct taattgctgc cgttgtcaac cttcaaatca gttgccattt     120
cccaattcta atttgggttt tctgaaagtt aagaggcaac caaaagtttc taacttgaag     180
gctagctttt gggattccat cagatccggg tttggcaaga ataacataat acaggttata     240
gatacaccat ccagtgaaga agaagaggaa gaacctttgc ctgaggaatt tgttctagtt     300
gaaaagactc aacctgatgg aacagttgaa cagattatat tctcttctgg aggagatgtt     360
gatgtgtatg atctccaaga tttatgtgat aaggttggtt ggcctcgaag accactgtct     420
aagctagctg cagctctgaa aaatagctat atagttgcaa ctttgcattc taggaaattc     480
tcatcaggag aagaggggag tggagaaaag aagctgatag gcatggcccg tgcaacatca     540
gatcatgcat tcaatgcaac aatttgggat gttcttgttg atccttccta tcagggacaa     600
ggacttggaa aagttcttat cgagaaactg atacgaaccc ttctccaaag ggacatcgga     660
aatatttcac tgtttgcaga tagtaaagtt gtggaatttt acaggaatct tggttttgaa     720
cctgatccag agggaattaa gggaatgttc tggtaccccca tgtattag                 768
```

<210> SEQ ID NO 40
<211> LENGTH: 184
<212> TYPE: DNA
<213> ORGANISM: Solanum lycopersicum
<220> FEATURE:
<221> NAME/KEY: misc_feature
<222> LOCATION: (1)..(184)
<223> OTHER INFORMATION: Exon 4 of NSI gene
<220> FEATURE:

```
<221> NAME/KEY: misc_feature
<222> LOCATION: (74)..(93)
<223> OTHER INFORMATION: Target sequence

<400> SEQUENCE: 40
gtttggcaag aataacataa tacaggttat agatacacca tccagtgaag aagaagagga    60
agaacctttg cctgaggaat tgttctagt tgaaaagact caacctgatg gaacagttga   120
acagattata ttctcttctg gaggagatgt tgatgtgtat gatctccaag atttatgtga   180
taag                                                                184

<210> SEQ ID NO 41
<211> LENGTH: 20
<212> TYPE: DNA
<213> ORGANISM: Solanum lycopersicum
<220> FEATURE:
<221> NAME/KEY: misc_feature
<222> LOCATION: (1)..(20)
<223> OTHER INFORMATION: Target sequence

<400> SEQUENCE: 41
gaggaatttg ttctagttga                                                20

<210> SEQ ID NO 42
<211> LENGTH: 22
<212> TYPE: DNA
<213> ORGANISM: Artificial Sequence
<220> FEATURE:
<223> OTHER INFORMATION: Primer 7 for delta01 gene

<400> SEQUENCE: 42
cgcatgtcag ctatgctaaa tg                                             22

<210> SEQ ID NO 43
<211> LENGTH: 24
<212> TYPE: DNA
<213> ORGANISM: Artificial Sequence
<220> FEATURE:
<223> OTHER INFORMATION: Primer 8 for delta01 gene

<400> SEQUENCE: 43
gtagagcaaa tccaccagaa ccat                                           24

<210> SEQ ID NO 44
<211> LENGTH: 21
<212> TYPE: DNA
<213> ORGANISM: Artificial Sequence
<220> FEATURE:
<223> OTHER INFORMATION: Primer 9 for delta10 gene

<400> SEQUENCE: 44
atgaagcgca aagccagtga g                                              21

<210> SEQ ID NO 45
<211> LENGTH: 20
<212> TYPE: DNA
<213> ORGANISM: Artificial Sequence
<220> FEATURE:
<223> OTHER INFORMATION: Primer 10 for delta10 gene

<400> SEQUENCE: 45
atccacatca gtgcttggtc                                                20

<210> SEQ ID NO 46
<211> LENGTH: 22
```

```
<212> TYPE: DNA
<213> ORGANISM: Artificial Sequence
<220> FEATURE:
<223> OTHER INFORMATION: Primer 11 for NSI gene

<400> SEQUENCE: 46
caggttatag ataccatc ca                                                 22

<210> SEQ ID NO 47
<211> LENGTH: 19
<212> TYPE: DNA
<213> ORGANISM: Artificial Sequence
<220> FEATURE:
<223> OTHER INFORMATION: Primer 12 for NSI gene

<400> SEQUENCE: 47
taaatcaccg gaaagaaag                                                   19

<210> SEQ ID NO 48
<211> LENGTH: 18
<212> TYPE: DNA
<213> ORGANISM: Solanum lycopersicum
<220> FEATURE:
<221> NAME/KEY: misc_feature
<222> LOCATION: (1)..(18)
<223> OTHER INFORMATION: Mutated region D011 of deltaCOP gene on
      chromosome 1
<220> FEATURE:
<221> NAME/KEY: misc_feature
<222> LOCATION: (1)..(18)
<223> OTHER INFORMATION: Mutated region D011 of delta01 gene

<400> SEQUENCE: 48
actggctttg gcagcctc                                                    18

<210> SEQ ID NO 49
<211> LENGTH: 17
<212> TYPE: DNA
<213> ORGANISM: Solanum lycopersicum
<220> FEATURE:
<221> NAME/KEY: misc_feature
<222> LOCATION: (1)..(17)
<223> OTHER INFORMATION: Mutated region D012 of deltaCOP gene on
      chromosome 1
<220> FEATURE:
<221> NAME/KEY: misc_feature
<222> LOCATION: (1)..(17)
<223> OTHER INFORMATION: Mutated region D012 of delta01 gene

<400> SEQUENCE: 49
actggctttg gcagctc                                                     17

<210> SEQ ID NO 50
<211> LENGTH: 14
<212> TYPE: DNA
<213> ORGANISM: Solanum lycopersicum
<220> FEATURE:
<221> NAME/KEY: misc_feature
<222> LOCATION: (1)..(14)
<223> OTHER INFORMATION: Mutated region D013 of deltaCOP gene on
      chromosome 1
<220> FEATURE:
<221> NAME/KEY: misc_feature
<222> LOCATION: (1)..(14)
<223> OTHER INFORMATION: Mutated region D013 of delta01 gene

<400> SEQUENCE: 50
actggctttg actc                                                        14
```

```
<210> SEQ ID NO 51
<211> LENGTH: 19
<212> TYPE: DNA
<213> ORGANISM: Solanum lycopersicum
<220> FEATURE:
<221> NAME/KEY: misc_feature
<222> LOCATION: (1)..(19)
<223> OTHER INFORMATION: Mutated region D101 of deltaCOP gene on
      chromosome 10
<220> FEATURE:
<221> NAME/KEY: misc_feature
<222> LOCATION: (1)..(19)
<223> OTHER INFORMATION: Mutated region D101 of delta10 gene

<400> SEQUENCE: 51
ttcatgtctc tgcaatcat                                              19

<210> SEQ ID NO 52
<211> LENGTH: 16
<212> TYPE: DNA
<213> ORGANISM: Solanum lycopersicum
<220> FEATURE:
<221> NAME/KEY: misc_feature
<222> LOCATION: (1)..(16)
<223> OTHER INFORMATION: Mutated region D102 of deltaCOP gene on
      chromosome 10
<220> FEATURE:
<221> NAME/KEY: misc_feature
<222> LOCATION: (1)..(16)
<223> OTHER INFORMATION: Mutated region D102 of delta10 gene

<400> SEQUENCE: 52
ttcatgtctc tgccat                                                 16

<210> SEQ ID NO 53
<211> LENGTH: 21
<212> TYPE: DNA
<213> ORGANISM: Solanum lycopersicum
<220> FEATURE:
<221> NAME/KEY: misc_feature
<222> LOCATION: (1)..(21)
<223> OTHER INFORMATION: Mutated region N1 of NSI gene

<400> SEQUENCE: 53
gagtgaattt gttctagttg a                                           21

<210> SEQ ID NO 54
<211> LENGTH: 11
<212> TYPE: DNA
<213> ORGANISM: Solanum lycopersicum
<220> FEATURE:
<221> NAME/KEY: misc_feature
<222> LOCATION: (1)..(11)
<223> OTHER INFORMATION: Mutated region N2 of NSI gene

<400> SEQUENCE: 54
gagctagttg a                                                      11

<210> SEQ ID NO 55
<211> LENGTH: 1735
<212> TYPE: DNA
<213> ORGANISM: Solanum lycopersicum
<220> FEATURE:
<221> NAME/KEY: misc_feature
<222> LOCATION: (1)..(1735)
<223> OTHER INFORMATION: cDNA sequence of mutated delta01 gene
<220> FEATURE:
<221> NAME/KEY: misc_feature
<222> LOCATION: (471)..(488)
<223> OTHER INFORMATION: Mutated region D011
```

<400> SEQUENCE: 55

```
ccaaattggt tggtatagga aagcagcata catatattga gactgaaaat gtgcgatatg      60
tttatcagcc gatagaatct ctgtacttgc tccttgtgac caacaaacag agcaacattc     120
ttgaagattt ggagacactg aggctgctgt ctaaactagt gcctgaatat tcttattcac     180
tagatgagga aggaattggc aggacggctt ttgagcttat ttttgcattt gatgaagtga     240
tctctcttgg gcacaaggaa aatgttacag ttacacaagt caagcagtac tgtgaaatgg     300
agagtcacga ggagagatta cacaagttag tcttacagaa caagataaat gaaactaagg     360
atgtcatgaa gcgtaaagcc agtgaaattg acaaaagcaa gattgagagg aatagaggtg     420
acaaaggagg tttcatgtca ctgcaatcca tgagttctgg aagaattgat actggctttg     480
gcagcctcag gcatatccaa cataggaggc aatggttctg gtggatttgc tctacccct      540
gatgtggaca cattttccac caaatccaag ggtcgtccag ctgcatctgc tactgctcca     600
ccgaaaggtc ttggtatgca actgggtaaa acacagaaga ccaaccaatt tctggaatcc     660
ctaaaagctg agggtgaggt aattgtcgag gatgtgaggc caagcgttgg tcaggccaaa     720
ccagctgctg ctccactaac tgatcccgtc acgttgactg ttgaagagaa gataaatgta     780
acactaaagc gtgatggtgg tctcagcaat tttgtcgtcc agggtacttt gtctctccaa     840
attctgaacc aagaagatgc ttttatccaa gtgcagattg aaaccagtgg taatccagca     900
atcctcttca aagcacaccc aaacatgaac aaggagttgt ttgcaaatga aaatattctt     960
ggccttaaag atcccaatag gtcatttccc acagggcaag gtggtgatgg tgttagtctt    1020
ttgaggtgga gaatgcaaag cacagatgag tcaattttgc ctttgacaat taactgctgg    1080
ccttcagttt ctggaagtga aacctatgtg aatatcgagt atgaaacccc cgcgcagatt    1140
gatttacaaa atgttgtaat ttctgtaccc cttccagctc tcagggaggc tccaaatgta    1200
caacagattg atggagagtg gaggtacgat tccagaaatt ctgttttgga gtggtctgtt    1260
cttctcattg acaattcgaa ccgcagtgga tcactagagt ttgttgttcc agctgctgat    1320
ccatcagcat tctttccaat ttctgcacag tttacttctt cgagaacctt cagtgatgtg    1380
aaggttgtca acgtgctgcc tctaaaaggt ggggccactc ccaagcattc tcaaagaaca    1440
ctgctggcca cggagagtta ccaggttgtg tgaccacaag acattataa aattgtgccg    1500
ttacagcaaa cattataggg cttgttttat ttcattttg ttcagacttt tgtttgccct    1560
tttccttgtt atcctttccc aaagttcttt catgtacgga gatggaataa ctttgttagg    1620
ttgaacttag aaagtcttgt gcatttatag cgtacgccga tcaacttact tttgcgcaat    1680
tgaattgaac caaaatttga agcttcactg ttttctttat ttgttctatt atttc        1735
```

<210> SEQ ID NO 56
<211> LENGTH: 1734
<212> TYPE: DNA
<213> ORGANISM: Solanum lycopersicum
<220> FEATURE:
<221> NAME/KEY: misc_feature
<222> LOCATION: (1)..(1734)
<223> OTHER INFORMATION: cDNA sequence of mutated delta01 gene
<220> FEATURE:
<221> NAME/KEY: misc_feature
<222> LOCATION: (470)..(487)
<223> OTHER INFORMATION: Mutated region D012

<400> SEQUENCE: 56

```
ccaaattggt tggtatagga aagcagcata catatattga gactgaaaat gtgcgatatg      60
tttatcagcc gatagaatct ctgtacttgc tccttgtgac caacaaacag agcaacattc     120
```

```
ttgaagattt ggagacactg aggctgctgt ctaaactagt gcctgaatat tcttattcac    180
tagatgagga aggaattggc aggacggctt ttgagcttat ttttgcattt gatgaagtga    240
tctctcttgg gcacaaggaa aatgttacag ttacacaagt caagcagtac tgtgaaatgg    300
agagtcacga ggagagatta cacaagttag tcttacagaa caagataaat gaaactaagg    360
atgtcatgaa gcgtaaagcc agtgaaattg acaaaagcaa gattgagagg aatagaggtg    420
acaaaggagg tttcatgtca ctgcaatcca tgagttctgg aagaattgat actggctttg    480
gcagctcagg catatccaac ataggaggca atggttctgg tggatttgct ctacccctg     540 atgtggacac attttccacc aaatccaagg gtcgtccagc tgcatctgct actgctccac    600
cgaaaggtct tggtatgcaa ctgggtaaaa cacagaagac caaccaattt ctggaatccc    660
taaaagctga gggtgaggta attgtcgagg atgtgaggcc aagcgttggt caggccaaac    720
cagctgctgc tccactaact gatcccgtca cgttgactgt tgaagagaag ataaatgtaa    780
cactaaagcg tgatggtggt ctcagcaatt ttgtcgtcca gggtactttg tctctccaaa    840
ttctgaacca agaagatgct tttatccaag tgcagattga aaccagtggt aatccagcaa    900
tcctcttcaa agcacaccca aacatgaaca aggagttgtt tgcaaatgaa aatattcttg    960
gccttaaaga tcccaatagg tcatttccca cagggcaagg tggtgatggt gttagtcttt    1020
tgaggtggag aatgcaaagc acagatgagt caatttttgcc tttgacaatt aactgctggc    1080
cttcagtttc tggaagtgaa acctatgtga atatcgagta tgaaaccccc gcgcagattg    1140
atttacaaaa tgttgtaatt tctgtacccc ttccagctct cagggaggct ccaaatgtac    1200
aacagattga tggagagtgg aggtacgatt ccagaaattc tgttttggag tggtctgttc    1260
ttctcattga caattcgaac cgcagtggat cactagagtt tgttgttcca gctgctgatc    1320
catcagcatt ctttccaatt tctgcacagt ttacttcttc gagaaccttc agtgatgtga    1380
aggttgtcaa cgtgctgcct ctaaaaggtg gggccactcc caagcattct caaagaacac    1440
tgctggccac ggagagttac caggttgtgt gaccacaagg acattataaa attgtgccgt    1500
tacagcaaac attataggc ttgttttatt tcattttgt tcagacttt gtttgccctt    1560 ttccttgtta tcctttccca aagttctttc atgtacggag atggaataac tttgttaggt    1620
tgaacttaga aagtcttgtg catttatagc gtacgccgat caacttactt ttgcgcaatt    1680
gaattgaacc aaaatttgaa gcttcactgt tttctttatt tgttctatta tttc          1734
```

<210> SEQ ID NO 57
<211> LENGTH: 1731
<212> TYPE: DNA
<213> ORGANISM: Solanum lycopersicum
<220> FEATURE:
<221> NAME/KEY: misc_feature
<222> LOCATION: (1)..(1731)
<223> OTHER INFORMATION: cDNA sequence of mutated delta01 gene
<220> FEATURE:
<221> NAME/KEY: misc_feature
<222> LOCATION: (470)..(484)
<223> OTHER INFORMATION: Mutated region D013

<400> SEQUENCE: 57

```
ccaaattggt tggtatagga aagcagcata catatattga gactgaaaat gtgcgatatg     60
tttatcagcc gatagaatct ctgtacttgc tccttgtgac caacaaacag agcaacattc    120
ttgaagattt ggagacactg aggctgctgt ctaaactagt gcctgaatat tcttattcac    180
tagatgagga aggaattggc aggacggctt ttgagcttat ttttgcattt gatgaagtga    240
```

```
tctctcttgg gcacaaggaa aatgttacag ttacacaagt caagcagtac tgtgaaatgg      300
agagtcacga ggagagatta cacaagttag tcttacagaa caagataaat gaaactaagg      360
atgtcatgaa gcgtaaagcc agtgaaattg acaaaagcaa gattgagagg aatagaggtg      420
acaaaggagg tttcatgtca ctgcaatcca tgagttctgg aagaattgat actggctttg      480
actcaggcat atccaacata ggaggcaatg ttctggtgg atttgctcta cccctgatg        540 tggacacatt ttccaccaaa tccaagggtc gtccagctgc atctgctact gctccaccga      600
aaggtcttgg tatgcaactg ggtaaaacac agaagaccaa ccaatttctg gaatccctaa      660
aagctgaggg tgaggtaatt gtcgaggatg tgaggccaag cgttggtcag gccaaaccag      720
ctgctgctcc actaactgat cccgtcacgt tgactgttga agagaagata aatgtaacac      780
taaagcgtga tggtggtctc agcaattttg tcgtccaggg tactttgtct ctccaaattc      840
tgaaccaaga agatgctttt atccaagtgc agattgaaac cagtggtaat ccagcaatcc      900
tcttcaaagc acacccaaac atgaacaagg agttgtttgc aaatgaaaat attcttggcc      960
ttaaagatcc aataggtca tttcccacag ggcaaggtgg tgatggtgtt agtcttttga      1020
ggtggagaat gcaaagcaca gatgagtcaa ttttgccttt gacaattaac tgctggcctt      1080
cagtttctgg aagtgaaacc tatgtgaata tcgagtatga accccgcg cagattgatt       1140 tacaaaatgt tgtaatttct gtacccttc cagctctcag ggaggctcca aatgtacaac      1200
agattgatga gagtggagg tacgattcca gaaattctgt tttggagtgg tctgttcttc      1260
tcattgacaa ttcgaaccgc agtggatcac tagagtttgt tgttccagct gctgatccat      1320
cagcattctt tccaatttct gcacagttta cttcttcgag aaccttcagt gatgtgaagg      1380
ttgtcaacgt gctgcctcta aaaggtgggg ccactcccaa gcattctcaa agaacactgc      1440
tggccacgga gagttaccag gttgtgtgac cacaaggaca ttataaaatt gtgccgttac      1500
agcaaacatt atagggcttg tttatttca tttttgttca acttttgtt tgccctttc        1560 cttgttatcc tttcccaaag ttctttcatg tacggagatg gaataactt gttaggttga      1620 acttagaaag tcttgtgcat ttatagcgta cgccgatcaa cttactttg cgcaattgaa       1680 ttgaaccaaa atttgaagct tcactgtttt ctttatttgt tctattattt c              1731
```

<210> SEQ ID NO 58
<211> LENGTH: 1175
<212> TYPE: DNA
<213> ORGANISM: Solanum lycopersicum
<220> FEATURE:
<221> NAME/KEY: misc_feature
<222> LOCATION: (1)..(1175)
<223> OTHER INFORMATION: cDNA sequence of mutated delta10 gene
<220> FEATURE:
<221> NAME/KEY: misc_feature
<222> LOCATION: (135)..(154)
<223> OTHER INFORMATION: Mutated region D101

<400> SEQUENCE: 58

```
atggagagcc atgaagagaa actgcataag ttagtcttac aaagcaagat taatgaaact       60
aaggatgtca tgaagcgcaa agccagtgag attgataaaa gcaagattga gggaataga      120 ggtgaaaaag gaggtttcat gtctctgcaa tcatgggttc tggaagaatg gataccggct      180
ttggcagtga tacaaactta tctagtttag gaggcagtgg ttctggattt ggaccaagca      240
ctgatgtgga ttcattttcc accaagtcca agggtcgtcc agttgcatct gctacaggcc      300
ccccaaaagg tcttggtatg cagctaggta aaacacaaag gaccaaccag ttttgcaat      360 ccctgaaagc tgagggtgaa gtcattgtcg aagatgtcag accaagcatt ggtccgtcca      420
```

| | | | | |
|---|---|---|---|---|
| agccacctgc | tccaccacca | actgaccctg | tcacccttac | tattgaagag aaaattaatg | 480 |
| taacattaaa | gcgtgatgga | ggtatcagca | acttcaatgt | ccagggtacc ttatctctcc | 540 |
| aaattctgaa | ccaagaagat | gggcttatcc | aagttcagat | tgaaaccagt ggtaatccag | 600 |
| ccatccactt | caacacacac | ccaaatatca | ataaggagtt | gttttctaat gaaaatattc | 660 |
| taggcctcaa | agaacctagt | aggccttttc | ctgctaatca | atctggtgat ggagttagtc | 720 |
| tcttgagatg | gagaatgcaa | agtgcagatg | agtcgatttt | acctttaact attaactgct | 780 |
| ggccttcagt | ttctgggaat | gaaacctatg | tgaatattga | gtatgaaaca ccagcacaaa | 840 |
| ctgatctaca | gaatgttgtg | attttttgtac | ctctcccagc | tctcagggat gccccacgta | 900 |
| tacagcaaat | tgatggagag | tggaggtatg | attccagaaa | ttctgttctg gagtggtctg | 960 |
| tagttctcat | cgacaattct | aatcgcagtg | gatcactgga | atttgtggtt ccggcagcag | 1020 |
| atcctgatgt | gttcttcccg | atttctgccc | gttttaccgc | ctcaagaacg ttcagtgacc | 1080 |
| tgaaggttgc | caatattctg | ccattgaaag | gtgggtctcc | acccaagttc tctcaaagaa | 1140 |
| cgctgctggc | ttccgagaac | taccaagtcg | tgtaa | | 1175 |

```
<210> SEQ ID NO 59
<211> LENGTH: 1172
<212> TYPE: DNA
<213> ORGANISM: Solanum lycopersicum
<220> FEATURE:
<221> NAME/KEY: misc_feature
<222> LOCATION: (1)..(1172)
<223> OTHER INFORMATION: cDNA sequence of mutated delta10 gene
<220> FEATURE:
<221> NAME/KEY: misc_feature
<222> LOCATION: (135)..(151)
<223> OTHER INFORMATION: Mutated region D102

<400> SEQUENCE: 59
```

| | | | | |
|---|---|---|---|---|
| atggagagcc | atgaagagaa | actgcataag | ttagtcttac | aaagcaagat taatgaaact | 60 |
| aaggatgtca | tgaagcgcaa | agccagtgag | attgataaaa | gcaagattga gaggaataga | 120 |
| ggtgaaaaag | gaggtttcat | gtctctgcca | tgggttctgg | aagaatggat accggctttg | 180 |
| gcagtgatac | aaacttatct | agtttaggag | gcagtggttc | tggatttgga ccaagcactg | 240 |
| atgtggattc | attttccacc | aagtccaagg | gtcgtccagt | tgcatctgct acaggccccc | 300 |
| caaaaggtct | tggtatgcag | ctaggtaaaa | cacaaaggac | caaccagttt ttgcaatccc | 360 |
| tgaaagctga | gggtgaagtc | attgtcgaag | atgtcagacc | aagcattggt ccgtccaagc | 420 |
| cacctgctcc | accaactaac | gaccctgtca | cccttactat | tgaagagaaa attaatgtaa | 480 |
| cattaaagcg | tgatggaggt | atcagcaact | tcaatgtcca | gggtaccta tctctccaaa | 540 |
| ttctgaacca | agaagatggg | cttatccaag | ttcagattga | aaccagtggt aatccagcca | 600 |
| tccacttcaa | cacacaccca | aatatcaata | aggagttgtt | ttctaatgaa atattctag | 660 |
| gcctcaaaga | acctagtagg | cctttcctg | ctaatcaatc | tggtgatgga gttagtctct | 720 |
| tgagatggag | aatgcaaagt | gcagatgagt | cgattttacc | tttaactatt aactgctggc | 780 |
| cttcagtttc | tgggaatgaa | acctatgtga | atattgagta | tgaaaccaa gcacaaactg | 840 |
| atctacagaa | tgttgtgatt | tttgtacctc | tcccagctct | cagggatgcc ccacgtatac | 900 |
| agcaaattga | tggagagtgg | aggtatgatt | ccagaaattc | tgttctggag tggtctgtag | 960 |
| ttctcatcga | caattctaat | cgcagtggat | cactggaatt | gtggttccg gcagcagatc | 1020 |
| ctgatgtgtt | cttcccgatt | tctgcccgtt | ttaccgcctc | aagaacgttc agtgacctga | 1080 |

```
aggttgccaa tattctgcca ttgaaaggtg ggtctccacc caagttctct caaagaacgc   1140
tgctggcttc cgagaactac caagtcgtgt aa                                 1172
```

<210> SEQ ID NO 60
<211> LENGTH: 769
<212> TYPE: DNA
<213> ORGANISM: Solanum lycopersicum
<220> FEATURE:
<221> NAME/KEY: misc_feature
<222> LOCATION: (1)..(769)
<223> OTHER INFORMATION: cDNA sequence of mutated NSI gene
<220> FEATURE:
<221> NAME/KEY: misc_feature
<222> LOCATION: (283)..(303)
<223> OTHER INFORMATION: Mutated region N1

<400> SEQUENCE: 60

```
atgcaaactc tccacttagt atccacttct actgttgctt cttcttcttc ttcttcttcc    60
ctacccacta ttgttttctct taattgctgc cgttgtcaac cttcaaatca gttgccattt   120
cccaattcta atttgggttt tctgaaagtt aagaggcaac caaaagtttc taacttgaag   180
gctagctttt gggattccat cagatccggg tttggcaaga ataacataat acaggttata   240
gatacaccat ccagtgaaga agaagaggaa gaacctttgc ctgagtgaat tgttctagt    300 tgaaaagact caacctgatg aacagttgaa acagattata ttctcttctg gaggagatgt   360
tgatgtgtat gatctccaag atttatgtga taaggttggt tggcctcgaa gaccactgtc   420
taagctagct gcagctctga aaaatagcta tatagttgca actttgcatt ctaggaaatt   480
ctcatcagga gaagagggga gtggagaaaa gaagctgata ggcatggccc gtgcaacatc   540
agatcatgca ttcaatgcaa caatttggga tgttcttgtt gatccttcct atcagggaca   600
aggacttgga aaagttctta tcgagaaact gatacgaacc cttctccaaa gggacatcgg   660
aaatatttca ctgtttgcag atagtaaagt tgtggaattt tacaggaatc ttggttttga   720
acctgatcca gagggaatta agggaatgtt ctggtacccc atgtattag                769
```

<210> SEQ ID NO 61
<211> LENGTH: 759
<212> TYPE: DNA
<213> ORGANISM: Solanum lycopersicum
<220> FEATURE:
<221> NAME/KEY: misc_feature
<223> OTHER INFORMATION: cDNA sequence of mutated NSI gene
<220> FEATURE:
<221> NAME/KEY: misc_feature
<222> LOCATION: (283)..(293)
<223> OTHER INFORMATION: Mutated region N2

<400> SEQUENCE: 61

```
atgcaaactc tccacttagt atccacttct actgttgctt cttcttcttc ttcttcttcc    60
ctacccacta ttgttttctct taattgctgc cgttgtcaac cttcaaatca gttgccattt   120
cccaattcta atttgggttt tctgaaagtt aagaggcaac caaaagtttc taacttgaag   180
gctagctttt gggattccat cagatccggg tttggcaaga ataacataat acaggttata   240
gatacaccat ccagtgaaga agaagaggaa gaacctttgc ctgagctagt tgaaaagact   300
caacctgatg aacagttgaa acagattata ttctcttctg gaggagatgt tgatgtgtat   360
gatctccaag atttatgtga taaggttggt tggcctcgaa gaccactgtc taagctagct   420
gcagctctga aaaatagcta tatagttgca actttgcatt ctaggaaatt ctcatcagga   480
gaagagggga gtggagaaaa gaagctgata ggcatggccc gtgcaacatc agatcatgca   540
```

-continued

```
ttcaatgcaa caatttggga tgttcttgtt gatccttcct atcagggaca aggacttgga    600
aaagttctta tcgagaaact gatacgaacc cttctccaaa gggacatcgg aaatatttca    660
ctgtttgcag atagtaaagt tgtggaattt tacaggaatc ttggttttga acctgatcca    720
gagggaatta agggaatgtt ctggtacccc atgtattag                           759
```